US011777142B2

United States Patent
Li et al.

(10) Patent No.: US 11,777,142 B2
(45) Date of Patent: Oct. 3, 2023

(54) GELABLE SYSTEM CONTAINING ETHER COMPOUNDS, PREPARATION METHOD THEREFOR AND USE THEREOF

(71) Applicant: BEIJING NORMAL UNIVERSITY, Beijing (CN)

(72) Inventors: Lin Li, Beijing (CN); Fengquan Liu, Beijing (CN); Jianjun Zhou, Beijing (CN); Lu Wang, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 373 days.

(21) Appl. No.: 16/696,510

(22) Filed: Nov. 26, 2019

(65) Prior Publication Data

US 2020/0099096 A1 Mar. 26, 2020

Related U.S. Application Data

(63) Continuation-in-part of application No. PCT/CN2018/088494, filed on May 25, 2018.

(30) Foreign Application Priority Data

May 26, 2017 (CN) .......................... 201710385201.1
May 26, 2017 (CN) .......................... 201710385203.0
(Continued)

(51) Int. Cl.
   *H01M 10/0565* (2010.01)
   *H01G 11/56* (2013.01)
   (Continued)

(52) U.S. Cl.
   CPC ........ *H01M 10/0565* (2013.01); *H01G 11/56* (2013.01); *H01G 11/60* (2013.01);
   (Continued)

(58) Field of Classification Search
   CPC ........ B82Y 30/00; H01G 11/56; H01G 11/60; H01G 11/62; H01M 10/052;
   (Continued)

(56) References Cited

U.S. PATENT DOCUMENTS

| 4,609,600 A | * | 9/1986 | Heinze | .................. | H01M 10/05 429/339 |
| 2011/0052998 A1 | * | 3/2011 | Liang | .................... | H01M 4/581 429/300 |

(Continued)

FOREIGN PATENT DOCUMENTS

| CN | 1716681 A | 1/2006 |
| CN | 101622750 A | 1/2010 |

(Continued)

OTHER PUBLICATIONS

Machine Translation CN 106532115A (Year: 2017).*
(Continued)

*Primary Examiner* — Victoria H Lynch
(74) *Attorney, Agent, or Firm* — NKL Law; Allen Xue

(57) ABSTRACT

A gelable system is formed by mixing lithium salts and small-molecule ether compounds such as cyclic ether compounds or straight-chain ether compounds, optionally added with inorganic nanoparticles, additives, other solvents and/or electrolytes; a gel system or solid system is formed by interaction between them (such as the formation of new complexes or self-assembly, etc.), and by ring-opening polymerization or polycondensation of the small-molecule cyclic ether compounds, or by addition-fragmentation chain transfer polymerization of the small-molecule straight-chain ether compounds, etc. The gel system or solid system not only has better safety in use than common gel systems or solid systems, but also better adjustability of strength. The strength of the formed gel can be improved from the source by changing composition and type of raw materials. The (Continued)

improvement in the strength enables the gel system to be expanded into the solid system, thereby further extending the application range of the gel system.

1 Claim, 12 Drawing Sheets

(30) Foreign Application Priority Data

| | | | |
|---|---|---|---|
| May 26, 2017 | (CN) | .......................... | 201710386733.7 |
| May 26, 2017 | (CN) | .......................... | 201710386734.1 |
| May 26, 2017 | (CN) | .......................... | 201710386736.0 |
| May 26, 2017 | (CN) | .......................... | 201710386738.X |

(51) Int. Cl.
| | |
|---|---|
| *H01G 11/60* | (2013.01) |
| *H01G 11/62* | (2013.01) |
| *H01M 10/052* | (2010.01) |
| *H01M 10/0568* | (2010.01) |
| *H01M 10/0569* | (2010.01) |
| *B82Y 30/00* | (2011.01) |

(52) U.S. Cl.
CPC .......... *H01G 11/62* (2013.01); *H01M 10/052* (2013.01); *H01M 10/0568* (2013.01); *H01M 10/0569* (2013.01); *B82Y 30/00* (2013.01); *H01M 2300/0082* (2013.01); *H01M 2300/0085* (2013.01)

(58) Field of Classification Search
CPC .......... H01M 10/0525; H01M 10/0565; H01M 10/0567; H01M 10/0568; H01M 10/0569; H01M 12/06; H01M 2300/0082; H01M 2300/0085; H01M 4/38; H01M 4/382; Y02E 60/10
See application file for complete search history.

(56) References Cited

U.S. PATENT DOCUMENTS

| | | | | |
|---|---|---|---|---|
| 2015/0207176 | A1* | 7/2015 | Moganty | H01B 1/122 |
| | | | | 429/188 |
| 2016/0079641 | A1* | 3/2016 | Kim | H01M 10/052 |
| | | | | 429/300 |
| 2016/0233549 | A1* | 8/2016 | Tiruvannamalai | H01M 10/052 |
| 2017/0288266 | A1* | 10/2017 | Peng | H01M 10/0525 |

FOREIGN PATENT DOCUMENTS

| | | | | | |
|---|---|---|---|---|---|
| CN | 101939869 | A | | 1/2011 | |
| CN | 102119462 | A | | 7/2011 | |
| CN | 102130364 | A | | 7/2011 | |
| CN | 102208680 | A | | 10/2011 | |
| CN | 102610857 | A | | 7/2012 | |
| CN | 103811802 | A | | 5/2014 | |
| CN | 104885289 | A | | 9/2015 | |
| CN | 105206872 | A | | 12/2015 | |
| CN | 105529497 | A | | 4/2016 | |
| CN | 105789694 | A | | 7/2016 | |
| CN | 105811007 | A | | 7/2016 | |
| CN | 105914405 | A | | 8/2016 | |
| CN | 106532115 | A | * | 3/2017 | .......... H01M 10/052 |
| CN | 106575775 | A | | 4/2017 | |
| CN | 106663835 | A | | 5/2017 | |
| JP | 2000299129 | A | * | 10/2000 | ............ H01M 10/05 |
| JP | 2002343435 | A | | 11/2002 | |
| JP | 2005235684 | A | | 9/2005 | |
| JP | 2013194112 | A | | 9/2013 | |
| JP | 2014056822 | A | | 3/2014 | |
| JP | 2016039209 | A | | 3/2016 | |

OTHER PUBLICATIONS

NIH https://pubchem.ncbi.nlm.nih.gov/compound/1_3-Dioxolane (Year: 1994).*

Zhao et al., "A novel solid-state electrolyte based on a crown ether lithium salt complex", Journal of Materials Chemistry A, vol. 3, 2015, pp. 20541-20546 (Year: 2015).*

Dillon et al., "Ion Transport in Cryptand and Crown Ether Lithium Salt Complexes", Chem. Mater., 1999, pp. 3296-3301 (Year: 1999).*

Machine Translation JP2000299129A (Year: 2000).*

Abouimrane et al., "Plastic crystalline phases of crown ether: salt complexes and their utilization in lithium-metal batteries", Journal of Power Sources, 174(2007), pp. 1193-1196 (Year: 2007).*

Hwang, Seung Sik et al.; "Room temperature cross-linkable gel polymer electrolytes for lithium ion batteries by in situ cationic polymerization of divinyl ether"; Electrochemistry Communications; vol. 12; May 10, 2010; pp. 916-919.

Suo, Liumin et al.; "A new class of Solvent-in-Salt electrolyte for high-energy rechargeable metallic lithium batteries"; Nature Communications, vol. 4; Feb. 12, 2013; pp. 1-9.

* cited by examiner

GELABLE SYSTEM CONTAINING ETHER COMPOUNDS, PREPARATION METHOD THEREFOR AND USE THEREOF

CROSS-REFERENCE TO RELATED APPLICATIONS

The instant application is a continuation-in-part application of PCT international application No. PCT/CN2018/088494, filed on May 25, 2018, which claims the benefit of the Chinese patent application Nos. CN201710385201.1, CN201710385203.0, CN201710386733.7, CN201710386734.1, CN201710386736.0, and CN201710386738.X, all filed on May 26, 2017, the entire disclosures of which are hereby incorporated by reference.

TECHNICAL FIELD

The present invention belongs to the field of gel technology, and relates to a gelable system containing ether compounds, a preparation method therefor and use thereof.

BACKGROUND ART

In recent years, the dramatic decline in fossil energy caused by human activities and some of the energy to be exhausted, leading to environmental deterioration and unreasonable resource usage, have a significant impact on human life and production. In order to meet people's growing material and cultural needs, and meanwhile to ensure people's production and life safe and green, it is imperative to develop new safe and environmentally friendly energy systems.

Lithium-ion batteries can be not only used in portable electronic devices, such as digital cameras and portable computers, etc., but also widely applied in power tools and electric vehicles and other fields. However, the safety issues such as combustion, explosion, etc. limit their further development. The safety concerns related to lithium-ion batteries mainly involve dissolution of positive and negative materials, separator puncture, volatilization and leakage of liquid electrolytes, and so on. But the liquid electrolytes commonly used recently are all prepared from volatile liquids, which participate in all processes of electrochemical reactions. Therefore, the problems, such as leakage of volatile electrolytes, battery flammability, overpotential decomposition, etc., seriously restrict the safety of lithium-ion batteries.

In order to overcome the problems such as liquid electrolyte leakage, battery flammability, etc., inorganic solid electrolytes, polymer solid electrolytes, polymer gel electrolytes, and so on, have been extensively studied, wherein the inorganic solid electrolytes are a type of lithium salts having inorganic superionic conductivity, and the polymer solid electrolytes are conductive solids consisting of polymers and lithium salts; however, the conductivity of the current reported solid electrolytes is poor, which seriously affects the cycling performance of the prepared batteries.

Lithium-sulfur batteries as a kind of lithium batteries mainly use element sulfur as cathode of the batteries and lithium metal as anode. Because of abundant reserves of elemental sulfur in the earth, it has the advantages of low-cost and environmentally friendly, etc. Lithium-sulfur batteries using sulfur as cathode material have a relatively high material theoretical specific capacity and a relatively high battery theoretical specific energy, achieving 1672 mAh/g and 2600 Wh/kg, respectively. But lithium-sulfur batteries have many disadvantages which limit their commercialization, such as low utilization efficiency of the active materials, "shuttle effect" due to the dissolution of discharge intermediates in electrolytes, and so on.

Many researchers have designed a variety of cathode materials to overcome the shortcomings of lithium-sulfur batteries, such as porous carbon-supported sulfur, N-doped sulfur-carbon composites, etc., which inhibit "shuttle effect" of polysulfides to some extent, but the synthesis processes of the cathode are cumbersome and tedious, with low yields and poor reproducibility. Gel electrolytes and solid electrolytes can alleviate or even eliminate "shuttling effect" of polysulfides, thus increasing the utilization efficiency of active materials. In addition, gel electrolytes and solid electrolytes can avoid leakage of liquid electrolytes, thus eliminating potential safety hazards.

Gels are a semi-solid system between liquid and solid, exhibiting the advantages and characteristics of both liquid and solid, which make it one of the hotspots in the field of research and production life. Many researches have tried to design various materials into a gel state. It is well known that gel systems can be used in many fields, for example, the electrolytes for lithium batteries can be designed as gel electrolytes or solid electrolytes, thereby improving the leakage problem of liquid electrolytes and reducing potential safety hazards; gel systems can also be introduced into the human body for constructing artificial organs; or gel systems can be used in the fields such as building materials, etc.

Currently, there are two main types of the construction of general gel systems: one is to introduce one or more polymers directly into a solvent to form a network structure or an interpenetrating network structure, and the formed gel has relatively high strength; the other one is to introduce small molecule organogelators into a solvent, dissolve them in the solvent at a high temperature, and form a gel at room temperature or low temperature, and the strength of the gel is generally comparatively low. For the gel systems formed by the above two methods, whether they are used in the fields such as electrolytes for lithium-ion secondary batteries, or in the construction of artificial organs, etc., some problems may occur, for example, that it is inevitable to introduce polymer organogelators or relatively complex synthetic small molecule organogelators in raw materials, usually by using relatively tedious and long experimental methods, which are time-consuming, laborious, and raw material consuming, and moreover, that the differences exist between the products prepared from the gel systems which are not the same due to their formation from polymers with different molecular weights, etc. Furthermore, the gel systems currently reported are irreversible, that is, after the gels are destroyed, it is difficult to restore the original morphology and advantages, which also limits the use and promotion of the gels.

SUMMARY OF THE INVENTION

To overcome the deficiencies of the prior art, one of the objects of the present invention is to provide a gelable system comprising lithium salts and ether compounds selected from cyclic ether compounds and/or straight-chain ether compounds. The system also comprises other solvents and/or electrolytes, inorganic nanoparticles, additives, and so on.

The second object of the present invention is to provide a gel or a solid electrolyte prepared by gelation of the above gelable system, preparation method and use of the gel or solid electrolyte.

The objects of the present invention can be realized by the following technical solutions:

A gelable system comprising the following components: lithium salts and ether compounds, wherein the ether compounds are selected from at least one of cyclic ether compounds or straight-chain ether compounds; the mass fraction of the gelable polymer and/or the gelable prepolymer in the system is less than or equal to 1 wt %.

A gel obtained by gelation of the above gelable system, in the gelable system, the mass fraction of the lithium salts is greater than or equal to 2 wt % and less than 20 wt %, and that of the cyclic ether compounds is more than 80 wt % and less than or equal to 98 wt %; or, the mass fraction of the lithium salts is greater than or equal to 2 wt % and less than 20 wt %, and that of the straight-chain ether compounds is more than or equal to 80 wt % and less than or equal to 98 wt %.

A solid electrolyte obtained by gelation of the above gelable system, in the gelable system, the mass fraction of the lithium salts is greater than or equal to 20 wt % and less than or equal to 50 wt %, and that of the cyclic ether compounds is more than or equal to 50 wt % and less than or equal to 80 wt %; or, the mass fraction of the lithium salts is greater than or equal to 20 wt % and less than or equal to 75 wt %, and that of the straight-chain ether compounds is more than or equal to 25 wt % and less than or equal to 80 wt %.

A gel electrolyte comprises the above gel.

One of lithium batteries comprises the above gel electrolyte and/or the above solid electrolyte.

A use of the above gel, the above solid electrolyte or the above gel electrolyte, which can be used in the field of lithium batteries, preferably lithium-ion batteries, lithium-sulfur batteries, and lithium-air batteries.

Advantageous Effects of the Present Invention

1. The present invention provides a gelable system and a gel and/or a solid electrolyte prepared therefrom, a preparation method and use thereof. Applicants have found in the study that a gel system or a solid system is formed by mixing lithium salts and small-molecule ether compounds (such as cyclic ether compounds or straight-chain ether compounds), via the interaction between them (such as the formation of new complexes or self-assembly, etc.) and by ring-opening polymerization or polycondensation of the small-molecule cyclic ether compounds, or by addition-fragmentation chain transfer polymerization of the small-molecule straight-chain ether compounds, etc. The gel system or the solid system not only has better safety in use than common gel systems or solid systems, but also better adjustability of strength, which is to improve the strength of the formed gel from the source by changing composition and type of raw materials. The improvement in the strength enables the gel system to be expanded into the solid system, thereby further extending the application range of the gel system.

2. The strength, formation time (i.e., transition from a free-flowing liquid state to a non-flowable gel state and/or a solid electrolyte state), and transition temperatures (i.e., the lowest temperature from a non-flowable gel state and/or a solid electrolyte state to a free-flowing liquid state) of the gel and the solid electrolyte prepared by the gelable system of the present invention are adjustable, that is, the gel and the solid electrolyte of different strengths can be prepared to meet different needs according to specific requirements. The gel and the solid electrolyte exhibit strong impact resistance. When the gel and the solid electrolyte are used in the field of lithium batteries, it can not only effectively solve problems such as leakage of a liquid electrolyte solution, but also can enable lithium batteries to have a higher charge and discharge efficiency, better impact resistance, alleviate or even eliminate the "shuttling effect", and better suppress the growth of lithium dendrites to prevent short circuits due to puncturing separators or solid electrolytes, enduing the lithium batteries with better safety performance in use.

3. The gel and the solid electrolyte prepared by the gelable system of the present invention have relatively high transition temperatures and reversibility at the same time. If additives are added to the system, it can decrease the strength and the transition temperature of the gel or the solid electrolyte in the original system, and increase the plasticity and the ionic conductivity of the gel or the solid electrolytes, thus obtaining a gel or solid electrolyte having excellent properties. Therefore, by the addition of the additives it can widen the formation time, broaden the transition temperature range, and increase the ionic conductivity of the gel and the solid electrolyte, thus extending the applied ranges in various fields of the gel and the solid electrolyte. If inorganic nanoparticles are added to the system, it can further enhance the mechanical strengths of the gel and the solid systems, and improve the porosity of the electrolyte membranes, so that the electrolyte membranes can absorb more liquid electrolyte, thereby increasing transference number and conductivity of lithium ions in the gel or the solid electrolyte. When the gel or the solid electrolyte is used at a higher temperature than its transition temperature, the gel or the solid electrolyte may become flowable; however, when it is cooled down below the transition temperature, it exhibits reversibility that the gel or the solid electrolyte can be reformed and re-used. Because of its high transition temperature and reversibility, it can extend the service life and save costs, which makes it become a new green and environment-friendly gel material.

4. The preparation methods of the gel and the solid electrolyte of the present invention have simple procedures, mild reaction conditions, short reaction period, high product yield, low manufacture cost, which makes it is easy to realize industrialized production.

5. The gel and the solid electrolyte prepared by the gelable system of the present invention can exhibit a better gel state or a solid electrolyte state at a low temperature, that is, it can maintain a good gel state or a solid electrolyte state below the transition temperature of the gel or the solid electrolyte, and the strength of the gel and the solid electrolyte is better at a low temperature.

6. The gel or the solid electrolyte prepared by the gelable system of the present invention can be used in lithium batteries (such as lithium-ion batteries, lithium-sulfur batteries, and lithium-air batteries, etc.), and can still function normally at high or low temperatures.

DETAILED DESCRIPTION OF THE INVENTION

Figure 1:
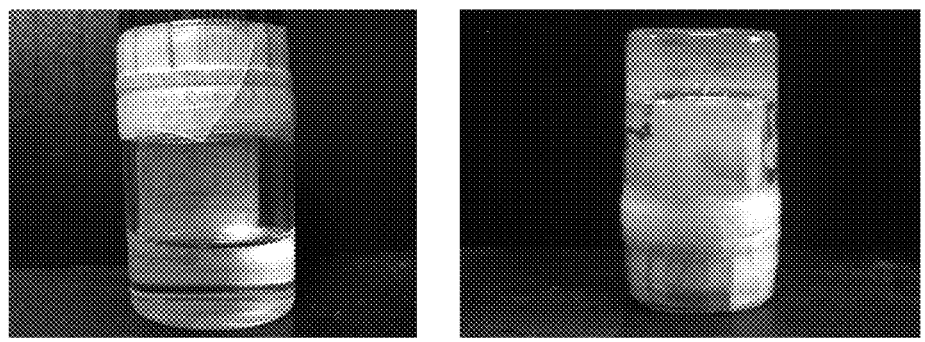
FIG. 1 is an optical photograph of the gel of Example 1-2.

[Gelable System Containing Lithium Salts and Cyclic Ether Compounds, Preparation Method and Use Thereof]

A first aspect of the present invention provides a gelable system, comprising the following components: lithium salts and ether compounds, wherein the ether compounds are selected from cyclic ether compounds; the mass fraction of the gelable polymer and/or the gelable prepolymer in the system is less than or equal to 1 wt %. In the gelable system, the total percent by mass of each component is 100 wt %.

In the present invention, the mass fraction of the lithium salts is greater than or equal to 2 wt % and less than or equal to 50 wt %, and that of the cyclic ether compounds is more than or equal to 50 wt % and less than or equal to 98 wt %.

Wherein, the mass fraction of the lithium salts is greater than or equal to 5 wt % and less than 20 wt %, and that of the cyclic ether compounds is more than 80 wt % and less than or equal to 95 wt %; or the mass fraction of the lithium salts is greater than or equal to 20 wt % and less than or equal to 30 wt %, and that of the cyclic ether compounds is more than or equal to 70 wt % and less than or equal to 80 wt %.

In the present invention, the cyclic ether compounds are selected from cyclic ether compounds containing one, two, three or more oxygen atoms. The cyclic ether compounds may be monocyclic ring, spiro ring, fused ring (such as a bicyclic ring) or bridged ring compounds.

A second aspect of the present invention provides a gel, which is obtained by gelation of the above gelable system, wherein the mass fraction of the lithium salts is greater than or equal to 2 wt % and less than 20 wt %, and that of the cyclic ether compounds is more than 80 wt % and less than or equal to 98 wt %.

Wherein, the mass fraction of the lithium salts is greater than or equal to 5 wt % and less than 20 wt %, and that of the cyclic ether compounds is more than 80 wt % and less than or equal to 95 wt %.

In the present invention, the transition temperature of the gel is 30 to 100° C., preferably 45 to 90° C.

In the present invention, the conductivity of the gel is $10^{-5}$ to $10^{-2}$ S/cm, preferably $10^{-5}$ to $5 \times 10^{-3}$ S/cm.

A third aspect of the present invention provides a method for preparing the above gel, comprising the following steps of: mixing cyclic ether compounds and lithium salts, and obtaining a cyclic ether compounds solution of the lithium salts under stirring, that is, obtaining the gelable system, continuously stirring the solution and obtaining the gel by gelation.

Wherein, the preparation method of the gel specifically comprises the following steps of: adding cyclic ether compounds in lithium salts, and obtaining a cyclic ether compounds solution of the lithium salts under stirring, that is, obtaining the gelable system, continuously stirring the solution and obtaining the gel by gelation.

In the present invention, the lithium salts and the cyclic ether compounds are pretreated to remove water; preferably, the lithium salts and the cyclic ether compounds are pretreated to remove water by using molecular sieves and/or vacuum drying.

In the present invention, the gelation process is completed under static conditions. The temperature for forming the gel is lower than the transition temperature of the gel, and the time for forming the gel is 30 seconds to 200 hours.

A fourth aspect of the present invention provides a solid electrolyte, which is obtained by gelation of the above gelable system, wherein the mass fraction of the lithium salts is greater than or equal to 20 wt % and less than or equal to 50 wt %, and that of the cyclic ether compounds is more than or equal to 50 wt % and less than or equal to 80 wt %.

Wherein, the mass fraction of the lithium salts is greater than or equal to 20 wt % and less than or equal to 30 wt %, and that of the cyclic ether compounds is more than or equal to 70 wt % and less than or equal to 80 wt %.

In the present invention, the transition temperature of the solid electrolyte is 60 to 150° C., preferably 70 to 110° C.

In the present invention, the conductivity of the solid electrolyte is $10^{-7}$ to $10^{-3}$ S/cm, preferably $10^{-7}$ to $10^{-5}$ S/cm.

A fifth aspect of the present invention provides a method for preparing the above solid electrolyte, comprising the following steps of:

mixing cyclic ether compounds and lithium salts, and obtaining a cyclic ether compounds solution of the lithium salts under stirring, that is, obtaining the gelable system, continuously stirring the solution and obtaining the solid electrolyte by gelation.

Wherein, the method for preparing the above solid electrolyte specifically comprises the following steps of: adding cyclic ether compounds in lithium salts, and obtaining a cyclic ether compounds solution of the lithium salts under stirring, that is, obtaining the gelable system, continuously stirring the solution and obtaining the solid electrolyte by gelation.

In the present invention, the lithium salts and the cyclic ether compounds are pretreated to remove water; preferably, the lithium salts and the cyclic ether compounds are pretreated to remove water by using molecular sieves and/or vacuum drying.

In the present invention, the gelation process is completed under static conditions. The temperature for forming the solid electrolyte is lower than the transition temperature of the solid electrolyte, and the time for forming the solid electrolyte is 30 minutes to 200 hours.

A sixth aspect of the present invention provides a gel electrolyte, comprising the above gel.

A seventh aspect of the present invention provides one of lithium batteries, comprising the above gel electrolyte and/or the above solid electrolyte.

A eighth aspect of the present invention provides a use of the above gel, the above solid electrolyte or the above gel electrolyte, which can be used in the field of lithium batteries, for example, lithium-ion batteries, lithium-sulfur batteries, and lithium-air batteries, etc.

[Gelable System Containing Lithium Salts, Electrolytes or their Solvents Used in Lithium-Ion Batteries, and Cyclic Ether Compounds, Preparation Method and Use Thereof]

A ninth aspect of the present invention provides a gelable system used in lithium-ion batteries, comprising the following components: lithium salts used in lithium-ion batteries, ether compounds, and electrolytes or their solvents used in lithium-ion batteries, wherein the ether compounds are selected from cyclic ether compounds; in addition, the mass fraction of the gelable polymer and/or the gelable prepolymer in the system is less than or equal to 1 wt %.

In the gelable system used in lithium-ion batteries, the total percent by mass of each component is 100 wt %.

In the present invention, in the gelable system used in lithium-ion batteries, the mass fraction of the lithium salts used in lithium-ion batteries is greater than or equal to 5 wt % and less than or equal to 60 wt %, that of the cyclic ether compounds is more than or equal to 20 wt % and less than or equal to 90 wt %, and that of the electrolytes or their solvents used in lithium-ion batteries is greater than or equal to 5 wt % and less than or equal to 75 wt %.

Wherein, in the gelable system used in lithium-ion batteries, the mass fraction of the lithium salts used in lithium-ion batteries is greater than or equal to 10 wt % and less than or equal to 40 wt %, that of the cyclic ether compounds is more than or equal to 20 wt % and less than or equal to 60 wt %, and that of the electrolytes or their solvents used in lithium-ion batteries is greater than or equal to 20 wt % and less than or equal to 60 wt %.

Wherein, in the gelable system used in lithium-ion batteries, the mass fraction of the lithium salts used in lithium-ion batteries is greater than or equal to 10 wt % and less than or equal to 40 wt %, that of the cyclic ether compounds is more than 60 wt % and less than or equal to 85 wt %, and that of the electrolytes or their solvents used in lithium-ion batteries is greater than or equal to 5 wt % and less than or equal to 30 wt %.

A tenth aspect of the present invention provides a gel, which is obtained by gelation of the above gelable system used in lithium-ion batteries, wherein the mass fraction of the lithium salts used in lithium-ion batteries is greater than or equal to 5 wt % and less than or equal to 60 wt %, that of the cyclic ether compounds is more than or equal to 20 wt % and less than or equal to 60 wt %, and that of the electrolytes or their solvents used in lithium-ion batteries is greater than or equal to 20 wt % and less than or equal to 75 wt %.

Wherein, in the gelable system used in lithium-ion batteries, the mass fraction of the lithium salts used in lithium-ion batteries is greater than or equal to 10 wt % and less than or equal to 40 wt %, that of the cyclic ether compounds is more than or equal to 20 wt % and less than or equal to 60 wt %, and that of the electrolytes or their solvents used in lithium-ion batteries is greater than or equal to 20 wt % and less than or equal to 60 wt %.

In the present invention, the transition temperature of the gel is 40 to 90° C., preferably 60 to 75° C.

In the present invention, the conductivity of the gel is $10^{-6}$ to $10^{-1}$ S/cm, preferably $10^{-5}$ to $5\times10^{-2}$ S/cm.

An eleventh aspect of the present invention provides a method for preparing the above gel, comprising the following steps of:

1) adding lithium salts used in lithium-ion batteries to electrolytes or their solvents used in lithium-ion batteries, and obtaining a mixed solution containing the lithium salts after uniformly stirring;

2) adding cyclic ether compounds to the above mixed solution, and obtaining a mixture system under stirring, that is, obtaining the gelable system used in lithium-ion batteries, continuously stirring the above solution and obtaining the gel by gelation.

In the present invention, in the step 2), the gelation process is completed under static conditions. The temperature for forming the gel is lower than the transition temperature of the gel, and the time for forming the gel is 30 seconds to 300 hours.

In the present invention, the electrolytes or their solvents used in lithium-ion batteries, the lithium salts used in lithium-ion batteries, and the cyclic ether compounds are pretreated to remove water; preferably, the electrolytes or their solvents used in lithium-ion batteries, the lithium salts used in lithium-ion batteries, and the cyclic ether compounds are pretreated to remove water by using molecular sieves and/or vacuum drying.

A twelfth aspect of the present invention provides a solid electrolyte, which is obtained by gelation of the above gelable system used in lithium-ion batteries, wherein the mass fraction of the lithium salts used in lithium-ion batteries is greater than or equal to 5 wt % and less than or equal to 60 wt %, that of the cyclic ether compounds is more than 60 wt % and less than or equal to 90 wt %, and that of the electrolytes or their solvents used in lithium-ion batteries is greater than or equal to 5 wt % and less than or equal to 30 wt %.

Wherein, in the gelable system used in lithium-ion batteries, the mass fraction of the lithium salts used in lithium-ion batteries is greater than or equal to 10 wt % and less than or equal to 40 wt %, that of the cyclic ether compounds is more than 60 wt % and less than or equal to 85 wt %, and that of the electrolytes or their solvents used in lithium-ion batteries is greater than or equal to 5 wt % and less than or equal to 30 wt %.

In the present invention, the transition temperature of the solid electrolyte is 65 to 130° C., preferably 75 to 120° C.

In the present invention, the conductivity of the solid electrolyte is $10^{-7}$ to $10^{-3}$ S/cm, preferably $10^{-6}$ to $10^{-3}$ S/cm.

A thirteenth aspect of the present invention provides a method for preparing the above solid electrolyte, comprising the following steps of:

1) adding lithium salts used in lithium-ion batteries to electrolytes or their solvents used in lithium-ion batteries, and obtaining a mixed solution containing the lithium salts after uniformly stirring;

2) adding cyclic ether compounds to the above mixed solution, and obtaining a mixture system under stirring, that is, obtaining the gelable system used in lithium-ion batteries, continuously stirring the above solution and obtaining the solid electrolyte by gelation.

In the present invention, in the step 2), the gelation process is completed under static conditions. The temperature for forming the solid electrolyte is lower than the transition temperature of the solid electrolyte, and the time for forming the solid electrolyte is 30 minutes to 150 hours.

In the present invention, the electrolytes or their solvents used in lithium-ion batteries, the lithium salts used in lithium-ion batteries, and the cyclic ether compounds are pretreated to remove water; preferably, the electrolytes or their solvents used in lithium-ion batteries, the lithium salts used in lithium-ion batteries, and the cyclic ether compounds are pretreated to remove water by using molecular sieves and/or vacuum drying.

A fourteenth aspect of the present invention provides a gel electrolyte, comprising the above gel.

A fifteenth aspect of the present invention provides a lithium-ion battery, comprising the above gel electrolyte and/or the above solid electrolyte.

A sixteenth aspect of the present invention provides a use of the above gel, the above solid electrolyte or the above gel electrolyte, which can be used in the field of lithium-ion batteries, etc.

[Gelable System Containing Lithium Salts, Electrolytes or their Solvents Used in Lithium-Sulfur Batteries, and Cyclic Ether Compounds, Preparation Method and Use Thereof]

A seventeenth aspect of the present invention provides a gelable system used in lithium-sulfur batteries, comprising the following components: lithium salts, ether compounds, and electrolytes or their solvents used in lithium-sulfur batteries, wherein the ether compounds are selected from cyclic ether compounds; in addition, the mass fraction of the gelable polymer and/or the gelable prepolymer in the system is less than or equal to 1 wt %.

In the gelable system used in lithium-sulfur batteries, the total percent by mass of each component is 100 wt %.

In the present invention, in the gelable system used in lithium-sulfur batteries, the mass fraction of the lithium salts is greater than 5 wt % and less than or equal to 60 wt %, that of the cyclic ether compounds is greater than or equal to 20 wt % and less than or equal to 90 wt %, and that of the electrolytes or their solvents used in lithium-sulfur batteries is greater than or equal to 5 wt % and less than or equal to 75 wt %.

Wherein, in the gelable system used in lithium-sulfur batteries, the mass fraction of the lithium salts is greater than or equal to 10 wt % and less than or equal to 40 wt %, that of the cyclic ether compounds is more than or equal to 20 wt % and less than or equal to 60 wt %, and that of the electrolytes or their solvents used in lithium-sulfur batteries is greater than or equal to 20 wt % and less than or equal to 60 wt %.

Wherein, in the gelable system used in lithium-sulfur batteries, the mass fraction of the lithium salts is greater than or equal to 10 wt % and less than or equal to 40 wt %, that of the cyclic ether compounds is more than 60 wt % and less than or equal to 85 wt %, and that of the electrolytes or their solvents used in lithium-sulfur batteries is greater than 5 wt % and less than 30 wt %.

A eighteenth aspect of the present invention provides a gel, which is obtained by gelation of the above gelable system used in lithium-sulfur batteries, wherein the mass fraction of the lithium salts is greater than 5 wt % and less than or equal to 60 wt %, that of the cyclic ether compounds is greater than or equal to 20 wt % and less than or equal to 60 wt %, and that of the electrolytes or their solvents used in lithium-sulfur batteries is greater than or equal to 20 wt % and less than or equal to 75 wt %.

Wherein, in the gelable system used in lithium-sulfur batteries, the mass fraction of the lithium salts is greater than or equal to 10 wt % and less than or equal to 40 wt %, that of the cyclic ether compounds is more than or equal to 20 wt % and less than or equal to 60 wt %, and that of the above electrolytes or their solvents used in lithium-sulfur batteries is greater than or equal to 20 wt % and less than or equal to 60 wt %.

In the present invention, the transition temperature of the gel is 40 to 95° C., preferably 45 to 85° C.

In the present invention, the conductivity of the gel is $10^{-5}$ to $10^{-1}$ S/cm, preferably $10^{-5}$ to $10^{-2}$ S/cm.

A nineteenth aspect of the present invention provides a method for preparing the above gel, comprising the following steps of:

1) adding lithium salts to electrolytes or their solvents used in lithium-sulfur batteries, and obtaining a mixed solution containing the lithium salts after uniformly stirring;

2) adding cyclic ether compounds to the above mixed solution, and obtaining a mixture system under stirring, that is, obtaining the gelable system used in lithium-sulfur batteries, continuously stirring the above solution and obtaining the gel by gelation.

In the present invention, in the step 2), the gelation process is completed under static conditions. The temperature for forming the gel is lower than the transition temperature of the gel, and the time for forming the gel is 30 seconds to 300 hours.

In the present invention, the electrolytes or their solvents used in lithium-sulfur batteries, the lithium salts and the cyclic ether compounds are pretreated to remove water; preferably, the electrolytes or their solvents used in lithium-sulfur batteries, the lithium salts and the cyclic ether compounds are pretreated to remove water by using molecular sieves and/or vacuum drying.

A twentieth aspect of the present invention provides a solid electrolyte, which is obtained by gelation of the above gelable system used in lithium-sulfur batteries, wherein the mass fraction of the lithium salts is greater than or equal to 5 wt % and less than or equal to 60 wt %, that of the cyclic ether compounds is more than 60 wt % and less than or equal to 90 wt %, and that of the electrolytes or their solvents used in lithium-sulfur batteries is greater than or equal to 5 wt % and less than or equal to 30 wt %.

Wherein, in the gelable system used in lithium-sulfur batteries, the mass fraction of the lithium salts is greater than or equal to 10 wt % and less than or equal to 40 wt %, that of the cyclic ether compounds is more than 60 wt % and less than or equal to 85 wt %, and that of the electrolytes or their solvents used in lithium-sulfur batteries is greater than or equal to 5 wt % and less than or equal to 30 wt %.

In the present invention, the transition temperature of the solid electrolyte is 60 to 130° C., preferably 80 to 110° C.

In the present invention, the conductivity of the solid electrolyte is $10^{-7}$ to $10^{-3}$ S/cm, preferably $10^{-6}$ to $10^{-4}$ S/cm.

A twenty-first aspect of the present invention provides a method for preparing the above solid electrolyte, comprising the following steps of:

1) adding lithium salts to electrolytes or their solvents used in lithium-sulfur batteries, and obtaining a mixed solution containing the lithium salts after uniformly stirring;

2) adding cyclic ether compounds to the above mixed solution, and obtaining a mixture system under stirring, that is, obtaining the gelable system used in lithium-sulfur batteries, continuously stirring the above solution and obtaining the solid electrolyte by gelation.

In the present invention, in the step 2), the gelation process is completed under static conditions. The temperature for forming the solid electrolyte is lower than the transition temperature of the solid electrolyte, and the time for forming the solid electrolyte is 30 minutes to 100 hours.

In the present invention, the electrolytes or their solvents used in lithium-sulfur batteries, the lithium salts and the cyclic ether compounds are pretreated to remove water; preferably, the electrolytes or their solvents used in lithium-sulfur batteries, the lithium salts and the cyclic ether compounds are pretreated to remove water by using molecular sieves and/or vacuum drying.

A twenty-second aspect of the present invention provides a gel electrolyte, comprising the above gel.

A twenty-third aspect of the present invention provides a lithium-sulfur battery, comprising the above gel electrolyte and/or the above solid electrolyte.

A twenty-fourth aspect of the present invention provides a use of the above gel, the above solid electrolyte or the above gel electrolyte, which can be used in the field of lithium-sulfur batteries, etc.

[Gelable System Containing Lithium Salts, Inorganic Nanoparticles and Cyclic Ether Compounds, Preparation Method and Use Thereof]

A twenty-fifth aspect of the present invention provides a gelable system, comprising the following components: lithium salts, ether compounds and inorganic nanoparticles; the ether compounds are selected from cyclic ether compounds; in addition, the mass fraction of the gelable polymer and/or the gelable prepolymer in the system is less than or equal to 1 wt %.

In the gelable system, the total percent by mass of each component is 100 wt %.

In the present invention, in the gelable system, the mass fraction of the lithium salts is greater than 5 wt % and less than or equal to 60 wt %, that of the cyclic ether compounds is more than or equal to 20 wt % and less than or equal to 95 wt %, and that of the inorganic nanoparticles is more than 0 wt % and less than or equal to 30 wt %.

Wherein, in the gelable system, the mass fraction of the lithium salts is greater than or equal to 10 wt % and less than or equal to 40 wt %, that of the cyclic ether compounds is more than or equal to 20 wt % and less than or equal to 60 wt %, and that of the inorganic nanoparticles is more than 0 wt % and less than or equal to 15 wt %.

Wherein, in the gelable system, the mass fraction of the lithium salts is greater than 10 wt % and less than or equal to 40 wt %, that of the cyclic ether compounds is more than 60 wt % and less than or equal to 90 wt %, and that of the inorganic nanoparticles is more than 0 wt % and less than or equal to 20 wt %.

In the present invention, the gelable system also comprises the other solvents and/or electrolytes, which include at least one of electrolytes used in lithium-sulfur batteries, solvents for the electrolytes used in lithium-sulfur batteries, electrolytes used in lithium-ion batteries, solvents for the electrolytes used in lithium-ion batteries.

In the present invention, in the gelable system, the mass fraction of the other solvents and/or electrolytes is greater than or equal to 0 wt % and less than or equal to 75 wt %. Preferably, in the gelable system, the mass fraction of the other solvents and/or electrolytes is greater than or equal to 5 wt % and less than or equal to 60 wt %.

A twenty-sixth aspect of the present invention provides a gel, which is obtained by gelation of the above gelable system, wherein, in the gelable system, the mass fraction of the lithium salts is greater than 5 wt % and less than or equal to 60 wt %, that of the cyclic ether compounds is more than or equal to 20 wt % and less than or equal to 60 wt %, that of the inorganic nanoparticles is more than 0 wt % and less than or equal to 30 wt %, and that of the other solvents and/or electrolytes is greater than or equal to 0 wt % and less than or equal to 70 wt %.

Wherein, in the gelable system, the mass fraction of the lithium salts is greater than or equal to 10 wt % and less than or equal to 40 wt %, that of the cyclic ether compounds is more than or equal to 20 wt % and less than or equal to 60 wt %, that of the inorganic nanoparticles is more than 0 wt % and less than or equal to 15 wt %, and that of the other solvents and/or electrolytes is greater than or equal to 5 wt % and less than or equal to 60 wt %.

In the present invention, the transition temperature of the gel is 40 to 170° C., preferably 45 to 105° C.

In the present invention, the conductivity of the gel is $10^{-5}$ to $10^{-1}$ S/cm, preferably $10^{-5}$ to $8\times10^{-2}$ S/cm.

A twenty-seventh aspect of the present invention provides a method for preparing the above gel, comprising the following steps of:

mixing inorganic nanoparticles, lithium salts and cyclic ether compounds, and obtaining a cyclic ether compounds solution of the lithium salts containing the inorganic nanoparticles under stirring, that is, obtaining the gelable system, continuously stirring the above solution and obtaining the gel by gelation.

Preferably, the preparation method of the gel specifically comprises the following steps of:

1) adding inorganic nanoparticles to cyclic ether compounds, and preparing a homogenously dispersed mixed solution;

2) adding the prepared mixed solution to lithium salts, and obtaining a cyclic ether compounds solution of the lithium salts containing the inorganic nanoparticles under stirring, that is, obtaining the gelable system, continuously stirring the solution and obtaining the gel by gelation.

More preferably, the preparation method of the gel specifically comprises the following steps of:

mixing inorganic nanoparticles, lithium salts, cyclic ether compounds, the other solvents and/or an electrolyte, and obtaining a cyclic ether compounds solution of the lithium salts containing the inorganic nanoparticles under stirring, that is, obtaining the gelable system, continuously stirring the above solution and obtaining the gel by gelation.

Further more preferably, the preparation method of the gel specifically comprises the following steps of:

1') adding inorganic nanoparticles to cyclic ether compounds, and preparing a homogenously dispersed mixed solution;

2') dissolving lithium salts in the other solvents and/or electrolytes, preparing a lithium salts solution;

3') adding the mixed solution prepared in the step 1') to the lithium salts solution prepared in the step 2'), and obtaining a cyclic ether compounds solution of the lithium salts dissolved in the other solvents and/or electrolytes containing the inorganic nanoparticles under stirring, that is, obtaining the gelable system, continuously stirring the solution and obtaining the gel by gelation.

In the present invention, the lithium salts, the cyclic ether compounds, the inorganic nanoparticles, the other solvents and/or electrolytes are pretreated to remove water; preferably, the lithium salts, the cyclic ether compounds, the inorganic nanoparticles, the other solvents and/or electrolytes are pretreated to remove water by using molecular sieves and/or vacuum drying.

In the present invention, the gelation process is completed under static conditions. The temperature for forming the gel is lower than the transition temperature of the gel, and the time for forming the gel is 30 seconds to 300 hours.

A twenty-eighth aspect of the present invention provides a solid electrolyte, which is obtained by gelation of the above gelable system, wherein, in the gelable system, the mass fraction of the lithium salts is greater than 5 wt % and less than or equal to 60 wt %, that of the cyclic ether compounds is more than 60 wt % and less than or equal to 95 wt %, that of the inorganic nanoparticles is more than 0 wt % and less than or equal to 30 wt %, and that of the other solvents and/or electrolytes is greater than or equal to 0 wt % and less than or equal to 75 wt %.

Wherein, in the gelable system, the mass fraction of the lithium salts is greater than 10 wt % and less than or equal to 40 wt %, that of the cyclic ether compounds is more than 60 wt % and less than or equal to 90 wt %, that of the inorganic nanoparticles is more than 0 wt % and less than or equal to 20 wt %, and that of the other solvents and/or electrolytes is greater than or equal to 5 wt % and less than or equal to 60 wt %.

In the present invention, the transition temperature of the solid electrolyte is 70 to 180° C., preferably 72 to 145° C.

In the present invention, the conductivity of the solid electrolyte is $10^{-7}$ to $10^{-2}$ S/cm, preferably $10^{-6}$ to $2\times10^{-3}$ S/cm.

A twenty-ninth aspect of the present invention provides a method for preparing the above solid electrolyte, comprising the following steps of:

mixing inorganic nanoparticles, lithium salts and cyclic ether compounds, and obtaining a cyclic ether compounds solution of the lithium salts containing the inorganic nanoparticles under stirring, that is, obtaining the gelable system, continuously stirring the above solution and obtaining the solid electrolyte by gelation.

Preferably, the preparation method of the solid electrolyte specifically comprises the following steps of:

a) adding inorganic nanoparticles to cyclic ether compounds, and preparing a homogenously dispersed mixed solution;

b) adding the prepared mixed solution to lithium salts, and obtaining a cyclic ether compounds solution of the lithium salts containing the inorganic nanoparticles under stirring, that is, obtaining the gelable system, continuously stirring the solution and obtaining the solid electrolyte by gelation.

More preferably, the preparation method of the solid electrolyte specifically comprises the following steps of:

mixing inorganic nanoparticles, lithium salts, cyclic ether compounds, the other solvents and/or electrolytes, and obtaining a cyclic ether compounds solution of the lithium salts containing the inorganic nanoparticles under stirring, that is, obtaining the gelable system, continuously stirring the above solution and obtaining the solid electrolyte by gelation.

Further more preferably, the preparation method of the solid electrolyte specifically comprises the following steps of:

a') adding inorganic nanoparticles to cyclic ether compounds, and preparing a homogenously dispersed mixed solution;

b') dissolving lithium salts in the other solvents and/or electrolytes, preparing a lithium salts solution;

c') adding the mixed solution prepared in the step a') to the lithium salts solution prepared in the step b'), and obtaining a cyclic ether compounds solution of the lithium salts dissolved in the other solvents and/or electrolytes containing the inorganic nanoparticles under stirring, that is, obtaining the gelable system, continuously stirring the solution and obtaining the solid electrolyte by gelation.

In the present invention, the lithium salts, the cyclic ether compounds, the inorganic nanoparticles, the other solvents and/or electrolytes are pretreated to remove water; preferably, the lithium salts, the cyclic ether compounds, the inorganic nanoparticles, the other solvents and/or electrolytes are pretreated to remove water by using molecular sieves and/or vacuum drying.

In the present invention, the gelation process is completed under static conditions. The temperature for forming the solid electrolyte is lower than the transition temperature of the solid electrolyte, and the time for forming the solid electrolyte is 30 minutes to 150 hours.

A thirtieth aspect of the present invention provides a gel electrolyte, comprising the above gel.

A thirty-first aspect of the present invention provides one of lithium batteries, comprising the above gel electrolyte and/or the above solid electrolyte.

A thirty-second aspect of the present invention provides a use of the above gel, or the above solid electrolyte, which can be used in the field of lithium batteries, building materials, etc.

A thirty-third aspect of the present invention provides a use of the above gel electrolyte, which can be used in the field of lithium batteries, etc. Preferably the lithium batteries include at least one of lithium-ion batteries, lithium-sulfur batteries, and lithium-air batteries.

[Gelable System Containing Lithium Salts, Additives and Cyclic Ether Compounds, Preparation Method and Use Thereof]

A thirty-fourth aspect of the present invention provides a gelable system, comprising the following components: lithium salts, ether compounds and additives, wherein the ether compounds are selected from cyclic ether compounds; the additives are selected from one or more of polyesters or blends thereof; the mass fraction of the gelable polymer and/or the gelable prepolymer in the system is ≤1 wt %.

In the gelable system, the total percent by mass of each component is 100 wt %.

In the present invention, in the gelable system, the mass fraction of the lithium salts is greater than or equal to 5 wt % and less than or equal to 60 wt %, that of the cyclic ether compounds is more than or equal to 20 wt % and less than or equal to 90 wt %, and that of the additives is greater than or equal to 5 wt % and less than or equal to 60 wt %.

Wherein, in the gelable system, the mass fraction of the lithium salts is greater than or equal to 10 wt % and less than or equal to 40 wt %, that of the cyclic ether compounds is more than or equal to 20 wt % and less than or equal to 60 wt %, and that of the additives is greater than 20 wt % and less than or equal to 60 wt %.

Wherein, in the gelable system, the mass fraction of the lithium salts is greater than or equal to 10 wt % and less than or equal to 40 wt %, that of the cyclic ether compounds is more than 60 wt % and less than or equal to 90 wt %, and that of the additives is greater than or equal to 5 wt % and less than or equal to 20 wt %.

In the present invention, the gelable system also comprises the other solvents and/or electrolytes, which include at least one of electrolytes used in lithium-sulfur batteries, solvents for the electrolytes used in lithium-sulfur batteries, electrolytes used in lithium-ion batteries, solvents for the electrolytes used in lithium-ion batteries.

In the present invention, in the gelable system, the mass fraction of the other solvents and/or electrolytes is greater than or equal to 0 wt % and less than or equal to 60 wt %. Preferably, in the gelable system, the mass fraction of the other solvents and/or electrolytes is greater than 0 wt % and less than or equal to 25 wt %.

In the present invention, the gelable system further comprises inorganic nanoparticles.

In the present invention, in the gelable system, the mass fraction of the inorganic nanoparticles is more than or equal to 0 wt % and less than or equal to 30 wt %. Preferably, in the gelable system, the mass fraction of the inorganic nanoparticles is more than 0 wt % and less than or equal to 15 wt %.

A thirty-fifth aspect of the present invention provides a gel, which is obtained by gelation of the above gelable system, wherein, in the gelable system, the mass fraction of the lithium salts is greater than or equal to 5 wt % and less than or equal to 60 wt %, that of the cyclic ether compounds is more than or equal to 20 wt % and less than or equal to 60 wt %, that of the additives is greater than or equal to 5 wt % and less than or equal to 60 wt %, that of the other solvents and/or electrolytes is greater than or equal to 0 wt % and less than or equal to 60 wt %, and that of the inorganic nanoparticles is more than or equal to 0 wt % and less than or equal to 30 wt %.

Wherein, in the gelable system, the mass fraction of the lithium salts is greater than or equal to 10 wt % and less than or equal to 40 wt %, that of the cyclic ether compounds is more than or equal to 20 wt % and less than or equal to 60 wt %, that of the additives is greater than or equal to 20 wt % and less than or equal to 60 wt %, that of the other solvents and/or electrolytes is greater than 0 wt % and less than or equal to 30 wt %, and that of the inorganic nanoparticles is more than 0 wt % and less than or equal to 15 wt %.

In the present invention, the transition temperature of the gel is 30 to 150° C., preferably 40 to 100° C.

In the present invention, the conductivity of the gel is $10^{-4}$ to $10^{-1}$ S/cm, preferably $10^{-3}$ to $5 \times 10^{-2}$ S/cm.

A thirty-sixth aspect of the present invention provides a method for preparing the above gel, comprising the following steps of:

mixing additives, lithium salts and cyclic ether compounds, and obtaining a cyclic ether compounds solution of the lithium salts containing the additives under stirring, that is, obtaining the gelable system, continuously stirring the above solution and obtaining the gel by gelation.

Preferably, the preparation method of the gel specifically comprises the following steps of:

1) adding additives to cyclic ether compounds, and preparing a homogenously mixed solution;

2) adding the prepared homogenously mixed solution to lithium salts, and obtaining a cyclic ether compounds solution of the lithium salts containing the additives under stirring, that is, obtaining the gelable system, continuously stirring the solution and obtaining the gel by gelation.

Preferably, the preparation method of the gel specifically comprises the following steps of:

mixing additives, lithium salts, cyclic ether compounds, the other solvents and/or electrolytes and/or inorganic nanoparticles, and obtaining a cyclic ether compounds solution of the lithium salts containing the additives under stirring, that is, obtaining the gelable system, continuously stirring the above solution and obtaining the gel by gelation.

More preferably, the preparation method of the gel comprises the following steps of: 1') adding additives and optional inorganic nanoparticles to cyclic ether compounds, and preparing a homogenously dispersed mixed solution;

2') dissolving lithium salts in the other solvents and/or electrolytes, preparing the lithium salts solution;

3') adding the mixed solution prepared in the step 1') to the lithium salts solution prepared in the step 2'), and obtaining a cyclic ether compounds solution of the lithium salts dissolved in the other solvents and/or electrolytes containing the additives and the optional inorganic nanoparticles under stirring, that is, obtaining the gelable system, continuously stirring the solution and obtaining the gel by gelation.

Further more preferably, the preparation method of the gel specifically comprises the following steps of:

1") adding additives and inorganic nanoparticles to cyclic ether compounds, and preparing a homogenously dispersed mixed solution;

2") adding the mixed solution prepared in the step 1") to lithium salts, and obtaining a cyclic ether compounds solution of the lithium salts containing the additives and the inorganic nanoparticles under stirring, that is, obtaining the gelable system, continuously stirring the solution and obtaining the gel by gelation.

In the present invention, the lithium salts, the cyclic ether compounds, the additives, the inorganic nanoparticles, the other solvents and/or electrolytes are pretreated to remove water; preferably, the lithium salts, the cyclic ether compounds, the additives, the inorganic nanoparticles, the other solvents and/or electrolytes are pretreated to remove water by using molecular sieves and/or vacuum drying.

In the present invention, the temperature for forming the gel is lower than the transition temperature of the gel, and the time for forming the gel is 5 minutes to 500 hours.

A thirty-seventh aspect of the present invention provides a solid electrolyte, which is obtained by gelation of the above gelable system, wherein, in the gelable system, the mass fraction of the lithium salts is greater than or equal to 5 wt % and less than or equal to 60 wt %, that of the cyclic ether compounds is more than 60 wt % and less than or equal to 90 wt %, that of the additives is greater than or equal to 5 wt % and less than or equal to 60 wt %, that of the other solvents and/or electrolytes is greater than or equal to 0 wt % and less than or equal to 60 wt %, and that of the inorganic nanoparticles is more than or equal to 0 wt % and less than or equal to 30 wt %.

Wherein, in the gelable system, the mass fraction of the lithium salts is greater than or equal to 10 wt % and less than or equal to 40 wt %, that of the cyclic ether compounds is more than 60 wt % and less than or equal to 90 wt %, that of the additives is greater than or equal to 5 wt % and less than or equal to 20 wt %, that of the other solvents and/or electrolytes is greater than 0 wt % and less than or equal to 15 wt %, and that of the inorganic nanoparticles is more than 0 wt % and less than or equal to 15 wt %.

In the present invention, the transition temperature of the solid electrolyte is 70 to 170° C., preferably 80 to 120° C.

In the present invention, the conductivity of the solid electrolyte is $10^{-7}$ to $10^{-3}$ S/cm, preferably $10^{-5}$ to $10^{-3}$ S/cm.

A thirty-eighth aspect of the present invention provides a method for preparing the above solid electrolyte, comprising the following steps of:

mixing additives, lithium salts and cyclic ether compounds, and obtaining a cyclic ether compounds solution of the lithium salts containing the additives under stirring, that is, obtaining the gelable system, continuously stirring the above solution and obtaining the solid electrolyte by gelation.

Preferably, the preparation method of the solid electrolyte specifically comprises the following steps of:

1) adding additives to cyclic ether compounds, and obtaining a uniformly mixed solution;

2) adding the above prepared uniformly mixed solution to lithium salts, and obtaining a cyclic ether compounds solution of the lithium salts containing the additives under stirring, that is, obtaining the gelable system, continuously stirring the above solution and obtaining the solid electrolyte by gelation.

Preferably, the preparation method of the solid electrolyte specifically comprises the following steps of:

mixing additives, lithium salts and cyclic ether compounds, the other solvents and/or electrolytes and/or inorganic nanoparticles, and obtaining a cyclic ether compounds solution of the lithium salts containing the additives under stirring, that is, obtaining the gelable system, continuously stirring the above solution and obtaining the solid electrolyte by gelation.

Further more preferably, the preparation method of the solid electrolyte specifically comprises the following steps of:

1') adding additives and optional inorganic nanoparticles to cyclic ether compounds, and preparing a homogenously dispersed mixed solution;

2') dissolving lithium salts in the other solvents and/or electrolytes, preparing the lithium salts solution;

3') adding the mixed solution prepared in the step 1') to the lithium salts solution prepared in the step 2'), and obtaining a cyclic ether compounds solution of the lithium salts dissolved in the other solvents and/or electrolytes containing the additives and the optional inorganic nanoparticles under stirring, that is, obtaining the gelable system, continuously stirring the solution and obtaining the solid electrolyte by gelation.

Further more preferably, the preparation method of the solid electrolyte specifically comprises the following steps of:

1") adding additives and inorganic nanoparticles to cyclic ether compounds, and preparing a homogenously dispersed mixed solution;

2") adding the mixed solution prepared in the step 1") to lithium salts, and obtaining a cyclic ether compounds solution of the lithium salts containing the additives and the inorganic nanoparticles under stirring, that is, obtaining the gelable system, continuously stirring the solution and obtaining the solid electrolyte by gelation.

In the present invention, the lithium salts, the cyclic ether compounds, the additives, the inorganic nanoparticles, the other solvents and/or electrolytes are pretreated to remove water;

preferably, the lithium salts, the cyclic ether compounds, the additives, the inorganic nanoparticles, the other solvents and/or electrolytes are pretreated to remove water by using molecular sieves and/or vacuum drying.

In the present invention, the temperature for forming the solid electrolyte is lower than the transition temperature of the solid electrolyte, and the time for forming the solid electrolyte is 50 minutes to 200 hours.

A thirty-ninth aspect of the present invention provides a gel electrolyte, comprising the above gel.

A fortieth aspect of the present invention provides one of lithium batteries, comprising the above gel electrolyte and/or the above solid electrolyte.

A forty-first aspect of the present invention provides a use of the above gel, the above solid electrolyte, or the above gel electrolyte, which can be used in the field of lithium batteries, etc. Preferably, the lithium batteries include at least one of lithium-ion batteries, lithium-sulfur batteries, and lithium-air batteries.

[Gelable System Containing Lithium Salts and Straight-Chain Ether Compounds, Preparation Method and Use Thereof]

A forty-second aspect of the present invention provides a gelable system, comprising the following components: lithium salts and ether compounds, wherein the ether compounds are selected from straight-chain ether compounds; the mass fraction of the gelable polymer and/or the gelable prepolymer in the system is less than or equal to 1 wt %.

In the gelable system, the total percent by mass of each component is 100 wt %.

In the present invention, the mass fraction of the lithium salts is greater than or equal to 2 wt % and less than or equal to 75 wt %, and that of the straight-chain ether compounds is more than or equal to 25 wt % and less than or equal to 98 wt %.

Wherein, the mass fraction of the lithium salts is greater than or equal to 5 wt % and less than 20 wt %, and that of the straight-chain ether compounds is more than 80 wt % and less than or equal to 95 wt %; or the mass fraction of the lithium salts is greater than or equal to 20 wt % and less than or equal to 30 wt %, and that of the straight-chain ether compounds is more than or equal to 70 wt % and less than or equal to 80 wt %.

In the present invention, the gelable system also comprises the other solvents and/or electrolytes, which include at least one of electrolytes used in lithium-sulfur batteries, solvents for the electrolytes used in lithium-sulfur batteries, electrolytes used in lithium-ion batteries, solvents for the electrolytes used in lithium-ion batteries.

In the present invention, in the gelable system, the mass fraction of the other solvents and/or electrolytes is greater than or equal to 0 wt % and less than or equal to 75 wt %. Preferably, in the gelable system, the mass fraction of the other solvents and/or electrolytes is greater than 0 wt % and less than or equal to 60 wt %.

In the present invention, the gelable system further comprises inorganic nanoparticles.

In the present invention, in the gelable system, the mass fraction of the inorganic nanoparticles is more than or equal to 0 wt % and less than or equal to 30 wt %. Preferably, in the gelable system, the mass fraction of the inorganic nanoparticles is more than 0 wt % and less than or equal to 20 wt %.

A forty-third aspect of the present invention provides a gel, which is obtained by gelation of the above gelable system, wherein, the mass fraction of the lithium salts is greater than or equal to 2 wt % and less than 20 wt %, that of the straight-chain ether compounds is more than or equal to 80 wt % and less than or equal to 98 wt %, that of the other solvents and/or electrolytes is greater than or equal to 0 wt % and less than or equal to 75 wt %, and that of the inorganic nanoparticles is more than or equal to 0 wt % and less than or equal to 30 wt %.

Preferably, the mass fraction of the lithium salts is greater than or equal to 5 wt % and less than 20 wt %, that of the straight-chain ether compounds is more than 80 wt % and less than or equal to 95 wt %, that of the other solvents and/or electrolytes is greater than 0 wt % and less than or equal to 60 wt %, and that of the inorganic nanoparticles is more than 0 wt % and less than or equal to 20 wt %.

In the present invention, the transition temperature of the gel is 40 to 170° C., preferably 55 to 130° C., more preferably 55 to 85° C., In the present invention, the conductivity of the gel is $10^{-5}$ to $10^{-1}$ S/cm, preferably $10^{-5}$ to $5\times10^{-2}$ S/cm.

A forty-fourth aspect of the present invention provides a method for preparing the above gel, comprising the following steps of:

mixing straight-chain ether compounds, lithium salts, the optional other solvents and/or electrolytes, and optional inorganic nanoparticles, and obtaining a straight-chain ether compounds solution of the lithium salts under stirring, that is, obtaining the gelable system, continuously stirring the above solution and obtaining the gel by gelation.

Preferably, the preparation method of the gel specifically comprises the following steps of:

adding straight-chain ether compounds to lithium salts, obtaining a straight-chain ether compounds solution of the lithium salts under stirring, and optionally adding the other solvents and/or electrolytes and/or inorganic nanoparticles to the straight-chain ether compounds solution of the lithium salts, that is, obtaining the gelable system, continuously stirring the above solution and obtaining the gel by gelation.

In the present invention, the lithium salts, the straight-chain ether compounds, the optional other solvents and/or electrolytes, and the optional inorganic nanoparticles are pretreated to remove water; preferably, the lithium salts, the straight-chain ether compounds, the optional other solvents and/or electrolytes, and the optional inorganic nanoparticles are pretreated to remove water by using molecular sieves and/or vacuum drying.

In the present invention, the gelation process is completed under static conditions. The temperature for forming the gel is lower than the transition temperature of the gel, and the time for forming the gel is 30 seconds to 300 hours.

A forty-fifth aspect of the present invention provides a solid electrolyte, which is obtained by gelation of the above gelable system, wherein, the mass fraction of the lithium salts is greater than or equal to 20 wt % and less than or equal to 75 wt %, that of the straight-chain ether compounds is more than or equal to 25 wt % and less than or equal to 80 wt %, that of the other solvents and/or electrolytes is greater than or equal to 0 wt % and less than or equal to 75 wt %, and that of the inorganic nanoparticles is more than or equal to 0 wt % and less than or equal to 30 wt %.

Preferably, the mass fraction of the lithium salts is greater than or equal to 20 wt % and less than or equal to 30 wt %, that of the straight-chain ether compounds is more than or equal to 70 wt % and less than or equal to 80 wt %, that of the other solvents and/or electrolyte is greater than 0 wt % and less than or equal to 60 wt %, and that of the inorganic nanoparticles is more than 0 wt % and less than or equal to 20 wt %.

In the present invention, the transition temperature of the solid electrolyte is 70 to 140° C., preferably 75 to 110° C.

In the present invention, the conductivity of the solid electrolyte is $10^{-7}$ to $10^{-3}$ S/cm, preferably $10^{-6}$ to $10^{-3}$ S/cm, more preferably $10^{-5}$ to $10^{-3}$ S/cm.

A forty-sixth aspect of the present invention provides a method for preparing the above solid electrolyte, comprising the following steps of:

mixing straight-chain ether compounds, lithium salts, the optional other solvents and/or electrolytes, and optional inorganic nanoparticles, and obtaining a straight-chain ether compounds solution of the lithium salts under stirring, that is, obtaining the gelable system, continuously stirring the above solution and obtaining the solid electrolyte by gelation.

Preferably, the preparation method of the solid electrolyte specifically comprises the following steps of:

adding straight-chain ether compounds to lithium salts, obtaining a straight-chain ether compounds solution of the lithium salts under stirring, and optionally adding the other solvents and/or electrolytes and/or inorganic nanoparticles to the straight-chain ether compounds solution of the lithium salts, that is, obtaining the gelable system, continuously stirring the above solution and obtaining the solid electrolyte by gelation.

In the present invention, the lithium salts, the straight-chain compounds, the optional other solvents and/or electrolytes, and the optional inorganic nanoparticles are pretreated to remove water; preferably, the lithium salts, the straight-chain compounds, the optional other solvents and/or electrolytes, and the optional inorganic nanoparticles are pretreated to remove water by using molecular sieves and/or vacuum drying.

In the present invention, the gelation process is completed under static conditions. The temperature for forming the solid electrolyte is lower than the transition temperature of the solid electrolyte, and the time for forming the solid electrolyte is 30 minutes to 200 hours.

A forty-seventh aspect of the present invention provides a gel electrolyte, comprising the above gel.

A forty-eighth aspect of the present invention provides one of lithium batteries, comprising the above gel electrolyte and/or the above solid electrolyte.

A forty-ninth aspect of the present invention provides a use of the above gel, the above solid electrolyte, or the above gel electrolyte, which can be used in the field of lithium batteries, etc.

Preferably, the lithium batteries include at least one of lithium-ion batteries, lithium-sulfur batteries, lithium-air batteries.

[Cyclic Ether Compounds]

The gelable system of the present invention contains ether compounds, which are selected from cyclic ether compounds. The cyclic ether compounds are selected from $C_2$ to $C_{20}$ cycloalkanes having at least one oxygen atom (i.e., 2 to 20 carbon atoms in a ring structure), or $C_3$ to $C_{20}$ cycloalkenes having at least one oxygen atom (i.e., 3 to 20 carbon atoms in a ring structure), which contain at least one carbon-carbon double bond.

In the present invention, the cycloalkanes or cycloalkenes are monocyclic rings, fused rings (such as bicyclic rings), spiro rings or bridged rings; when the cycloalkanes or cycloalkenes are spiro rings or bridged rings and contain two or more oxygen atoms, the oxygen atoms can be in one ring or in multiple rings.

In the present invention, the cyclic ether compounds are selected from $C_2$ to $C_{20}$ monocycloalkanes having at least one oxygen atom, preferably $C_3$ to $C_{20}$ monocycloalkenes having at least one oxygen atom, for example, one of the following first class compounds:

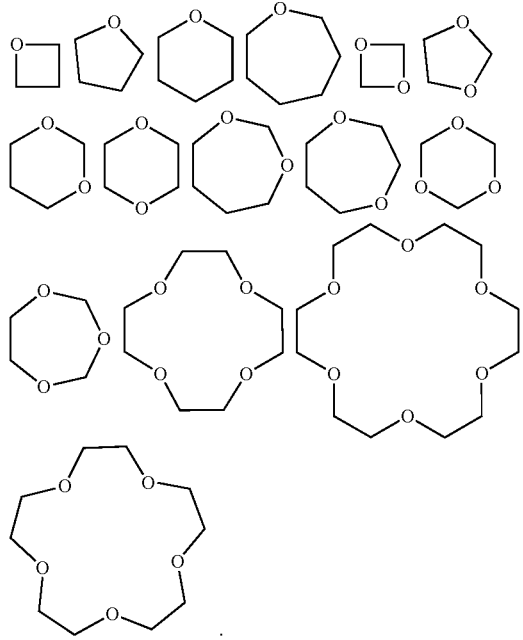

In the present invention, the cyclic ether compounds are selected from $C_4$ to $C_{20}$ fused cycloalkanes having at least one oxygen atom, for example, one of the following second class compounds:

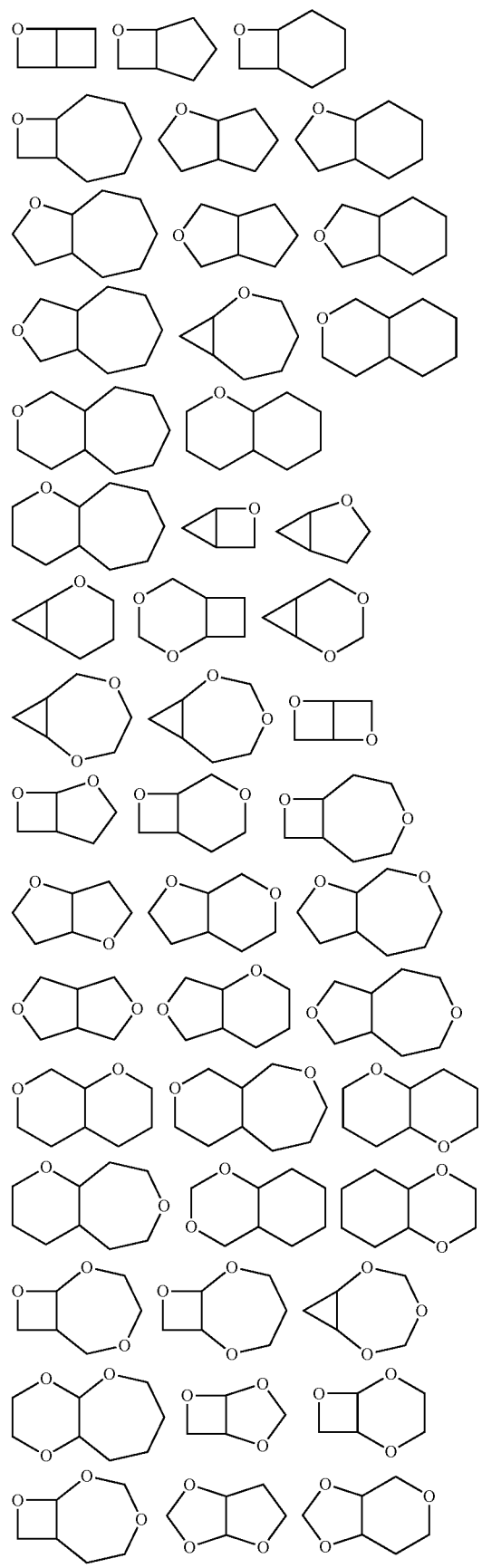

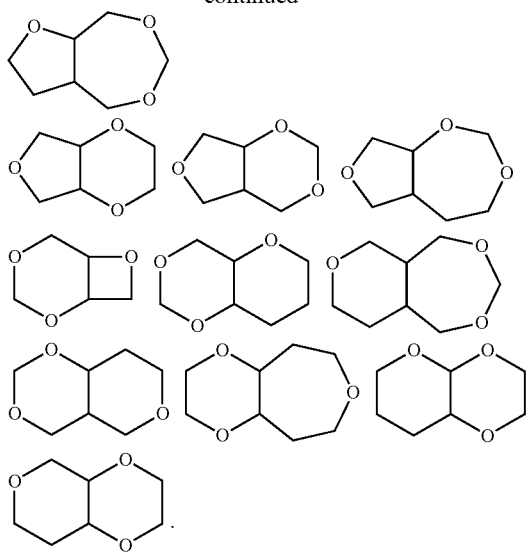

In the present invention, the cyclic ether compounds are selected from $C_4$ to $C_{20}$ bridged cycloalkanes having at least one oxygen atom, for example, one of the following third class compounds:

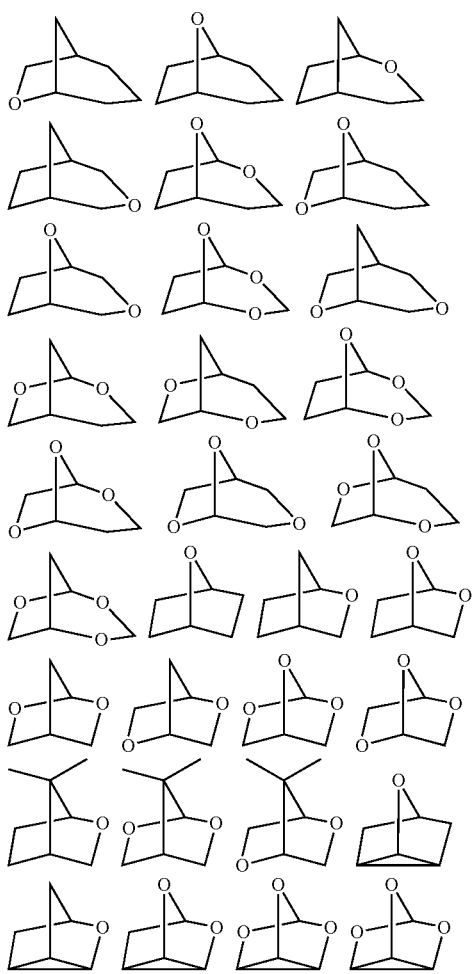

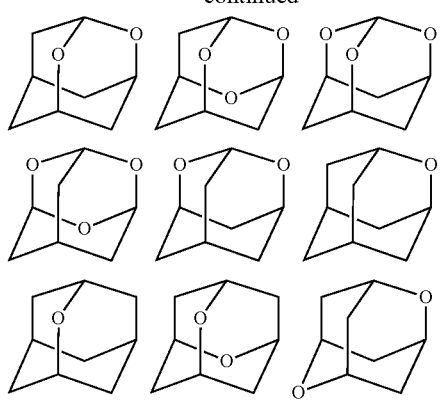

In the present invention, the cyclic ether compounds are selected from $C_4$ to $C_{20}$ spiro cycloalkanes having at least one oxygen atom, for example, one of the following fourth class compounds:

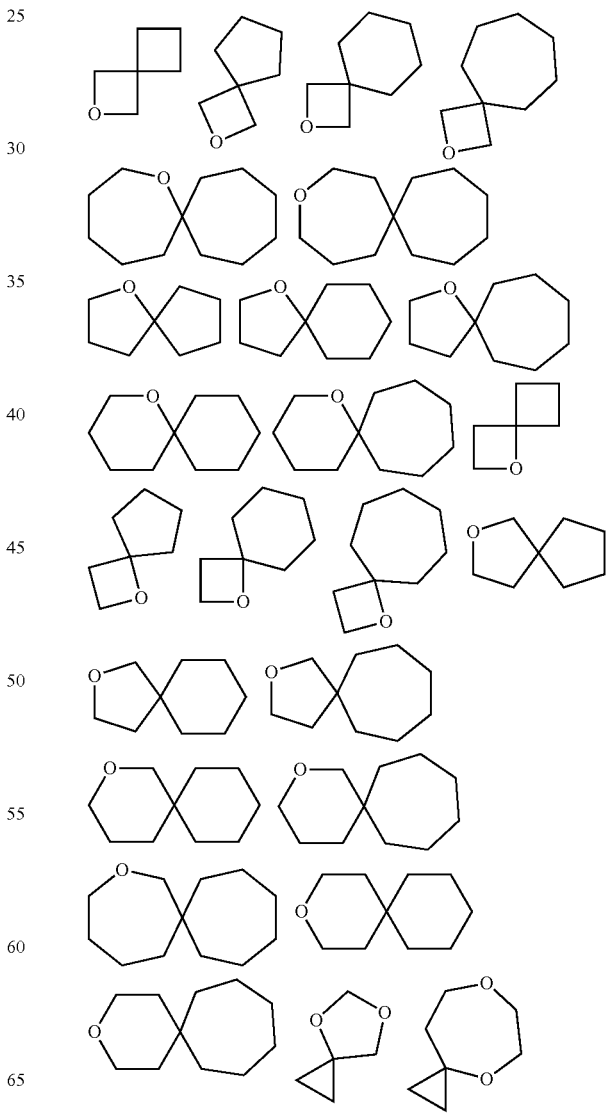

-continued

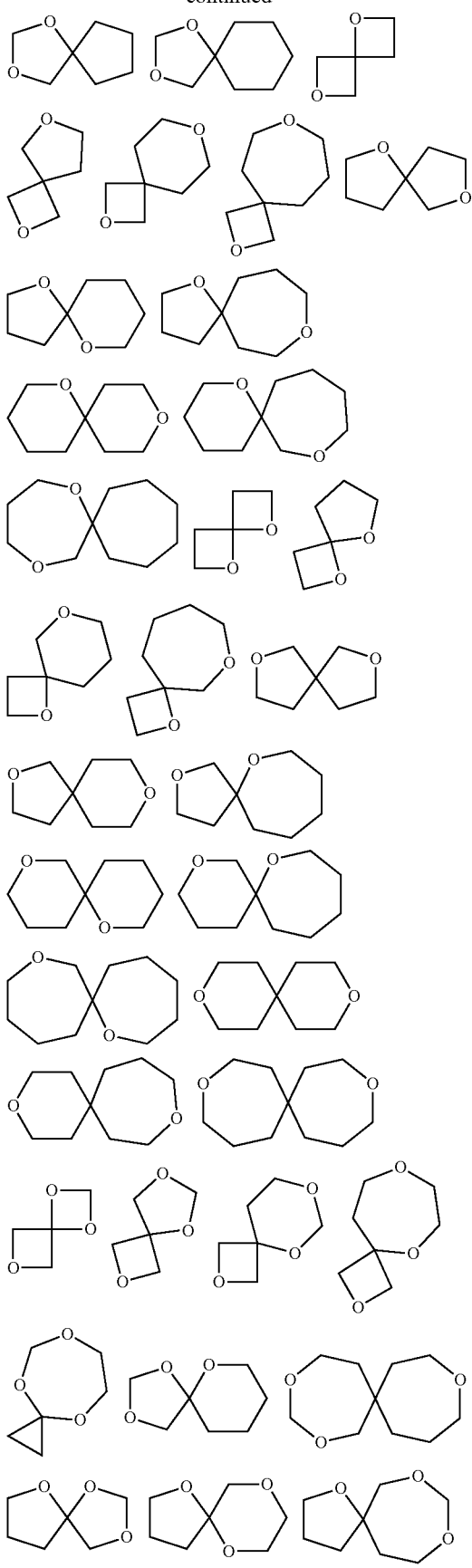
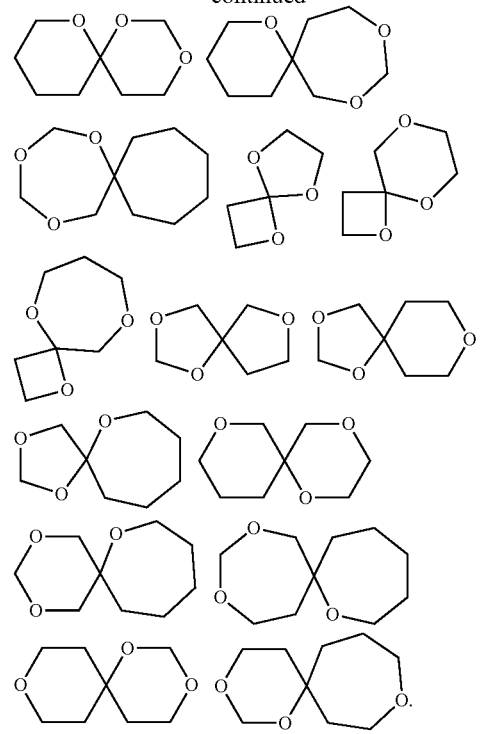

In the present invention, the stable compounds, which have at least one C—C bond in the ring structures in the above four classes of compounds replaced by the C=C bond, are the above $C_3$ to $C_{20}$ cycloalkenes having at least one oxygen atom, which are one of the preferred cyclic ether compounds of the present invention.

In the present invention, when the cycloalkanes or cycloalkenes are monocyclic or fused rings, the carbon atoms in the rings may be substituted by one or more R1 groups; when the cycloalkanes or cycloalkenes are bridged rings, the carbon atoms not on the bridge may be substituted by one or more R1 groups; when the cycloalkanes or cycloalkenes are spiro rings, the carbon atoms in the rings may be substituted by one or more R1 groups. The R1 group is selected from the group consisting of alkyl, alkenyl, alkynyl, alkoxy, alkylthio, haloalkyl, cycloalkyl, cycloalkyloxy, cycloalkylsulfide, heterocyclyl, heterocyclyloxy, heterocyclylthio, aryl, aryloxy, heteroaryl, heteroaryloxy, hydroxy, thiol, nitro, carboxyl, amino, ester, halogen, acyl, aldehyde.

In the present invention, the cyclic ether compounds containing an oxygen atom are selected from substituted or unsubstituted oxetane, substituted or unsubstituted tetrahydrofuran, substituted or unsubstituted tetrahydropyran; the number of the substituents may be one or more; the substituent is the above R1 group.

In the present invention, the cyclic ether compounds containing an oxygen atom are selected from the group consisting of 3,3-dichloromethyloxetane, 2-chloromethyloxetane, 2-chloromethylpropylene oxide, 1,3-epoxycyclohexane, 1,4-epoxycyclohexane, tetrahydrofuran, 2-methyltetrahydrofuran, 3-methyltetrahydrofuran, tetrahydropyran, 2-methyltetrahydropyran, oxacycloheptane, oxacyclooctane, oxonane or oxacyclodecane.

In the present invention, the cyclic ether compounds containing two oxygen atoms are selected from substituted or unsubstituted 1,3-dioxolane (DOL), substituted or unsubstituted 1,4-dioxane; the number of the substituents may be one or more; the substituent is the above R1 group.

In the present invention, the cyclic ether compounds containing three oxygen atoms are selected from substituted or unsubstituted trioxymethylene; the number of the substituents may be one or more; and the substituent is the above R1 group.

In the present invention, the ether compounds containing more oxygen atoms are selected from the group consisting of substituted or unsubstituted 18-crown-6, substituted or unsubstituted 12-crown-4, substituted or unsubstituted 24-crown-8; the number of the substituents may be one or more; the substituent is the above R1 group.

[Straight-Chain Ether Compounds]

The gelable system of the present invention contains ether compounds, which are selected from straight-chain ether compounds. The general formula of the straight-chain ether compounds is as shown in Formula (1):

$$R_1-O-(R_2-O)_n-R_3 \quad \text{Formula (1)}$$

wherein, n is an integer greater than 0; $R_2$ is selected from a straight-chain or branched $C_1$-$C_6$ alkylene group, a straight-chain or branched $C_2$-$C_6$ alkenylene group; and H on the carbon atom of $R_2$ may be substituted by at least one of the following groups: alkenyl, alkynyl, alkoxy, alkylthio, cycloalkyl, cycloalkyloxy, cycloalkylthio, heterocyclyl, heterocyclyloxy, heterocyclylthio, aryl, aryloxy, heteroaryl, heteroaryloxy, hydroxy, thiol, nitro, carboxy, amino, ester, halogen, acyl, aldehyde;

$R_1$ and $R_3$ are the same or different, and each of $R_1$ and $R_3$, independently, is selected from one or more of a hydrogen atom, an alkyl group, a cycloalkyl group, a heterocyclyl group, an alkenyl group, an alkynyl group; and H on the carbon atom of $R_1$ and $R_3$ may be substituted by at least one of the following groups: alkenyl, alkynyl, alkoxy, alkylthio, cycloalkyl, cycloalkyloxy, cycloalkylthio, heterocyclyl, heterocyclyloxy, heterocyclylthio, aryl, aryloxy, hydroxy, thiol, nitro, carboxy, amino, ester, halogen, acyl, aldehyde.

Wherein, n is an integer between 1 and 6; $R_2$ is selected from a straight-chain or branched $C_1$-$C_4$ alkylene group, a straight-chain or branched $C_2$-$C_6$ alkenylene group; and $R_1$ and $R_3$ are the same or different, and each of $R_1$ and $R_3$, independently, is selected from a straight-chain or branched $C_1$-$C_6$ alkyl group.

Wherein, $R_2$ is selected from the group consisting of methyl, ethyl, propyl, isopropyl, butyl, isobutyl, and vinyl; and $R_1$ and $R_3$ are the same or different, and each of $R_1$ and $R_3$, independently, is selected from the group consisting of methyl, ethyl, and propyl.

Wherein, the straight-chain ether compounds are selected from one or more groups consisting of ethylene glycol dimethyl ether, ethylene glycol diethyl ether, ethylene glycol methyl ethyl ether, 1,4-butanediol dimethyl ether, 1,4-butanediol diethyl ether, 1,4-butanediol methyl ethyl ether, etc.

In the present invention, the straight-chain ether compounds are, for example, one of the following compounds:

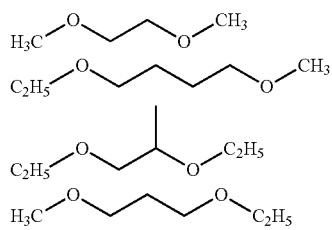

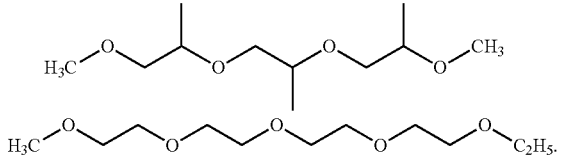

[Other Solvents and/or Electrolytes]

In the present invention, the other solvents and/or electrolytes include at least one of electrolytes used in lithium-sulfur batteries, solvents for the electrolytes used in lithium-sulfur batteries, electrolytes used in lithium-ion batteries, solvents for the electrolytes used in lithium-ion batteries.

In the present invention, the electrolytes used in lithium-ion batteries are selected from a ester mixture solution containing lithium salts used in lithium-ion batteries, for example, a mixture solution of ethylene carbonate (EC) and dimethyl carbonate (DMC) containing 1 M lithium hexafluorophosphate ($LiPF_6$), wherein the volume ratio of the ethylene carbonate (EC) to the dimethyl carbonate (DMC) is 1:1.

In the present invention, the solvents for the electrolytes used in lithium-ion batteries is at least one selected from the group consisting of cyclic non-aqueous organic solvents for electrolytes used in lithium-ion batteries and chain non-aqueous organic solvents for electrolytes used in lithium-ion batteries.

In the present invention, the cyclic non-aqueous organic solvents are at least one selected from the group consisting of ethylene carbonate (EC), propylene carbonate (PC), fluoroethylene carbonate (FEC), γ-butyrolactone (GBL), ethylene sulfite (ES), propylene sulfite (PS), sulfolane (SL), glycerol carbonate (GC).

In the present invention, the chain non-aqueous organic solvents are at least one selected from the group consisting of diethyl carbonate (DEC), dimethyl carbonate (DMC), ethylmethyl carbonate (EMC), methylpropyl carbonate (MPC), dipropyl carbonate (DPC), ethylpropyl carbonate (EPC), ethyl acetate (EA), propyl acetate (PA), ethyl propionate (EP), ethyl butyrate (EB), methyl butyrate (MB), dimethyl sulfite (DMS), diethyl sulfite (DES), ethylmethyl sulfite (EMS), dimethyl sulfone (MSM), dimethyl sulfoxide (DMSO).

In the present invention, the electrolytes used in the lithium-sulfur batteries are selected from a ether mixture solution containing lithium salts, for example, a mixture solution of 1,3-dioxolane (DOL) and ethylene glycol dimethyl ether (DME) containing 1 M lithium bis(trifluoromethanesulfonyl)imide (LiTFSI), wherein the volume ratio of the 1,3-dioxolane (DOL) to the ethylene glycol dimethyl ether (DME) is 1:1.

In the present invention, the solvents for the electrolytes used in lithium-sulfur batteries is one or more selected from the group consisting of 1,3-dioxolane, 1,2-dimethoxyethane, triethylene glycol dimethyl ether, tetraethylene glycol dimethyl ether, fluoroethylene carbonate, polyethylene glycol borate, 1,1', 2,2'-tetrafluoroethyl-2,2',3,3'-tetrafluoropropylene ether.

[Inorganic Nanoparticles]

In the present invention, the inorganic nanoparticles are one or more selected from the group consisting of silica, alumina, silicon nitride, zinc oxide, titanium dioxide, silicon carbide, silicate, calcium carbonate, barium sulfate, clay, ferroferric oxide, cerium oxide, nano carbon materials, ferric oxide, etc.; preferably, the inorganic nanoparticles are one or more selected from the group consisting of silica, alumina, titanium dioxide, zinc oxide.

[Lithium Salts]

In the present invention, the lithium salts are one or more selected from the group consisting of lithium hexafluorophosphate, lithium tetrafluoroborate, lithium hexafluoroarsenate, lithium perchlorate, lithium trifluoromethanesulfonate, lithium perfluorobutanesulfonate, lithium bis(trifluoromethanesulfonyl)imide, lithium bis(fluorosulfonyl)imide, lithium aluminate, lithium chloroaluminate, lithium fluorosulfonimide, lithium chloride and lithium iodide;

Preferably, when used in lithium-ion batteries, the lithium salts are selected from one or both of lithium hexafluorophosphate, lithium perchlorate, etc.

Preferably, when used in lithium-sulfur batteries, the lithium salts are one or more selected from the group consisting of lithium hexafluorophosphate, lithium hexafluoroarsenate, lithium perchlorate, lithium trifluoromethanesulfonate, lithium bis(trifluoromethanesulfonyl)imide, lithium bis(fluorosulfonyl)imide, lithium fluorosulfonimide, lithium chloride, etc.

[Additives]

In the present invention, the additives are one or more selected from polyesters or their blends. Wherein, the polyesters are obtained by polycondensation of polybasic acids or acid anhydrides with polyhydric alcohols.

Wherein, the polybasic acids are selected from the group consisting of dibasic acids, tribasic acids or higher polybasic acids, and the polyhydric alcohols are selected from the group consisting of diols, triols or higher polyols.

In a preferred embodiment, the polybasic acids are selected from one or two or three or more than three of the following polybasic acids which are substituted or unsubstituted: oxalic acid, malonic acid, succinic acid, butenedioic acid, glutaric acid, adipic acid, pimelic acid, suberic acid, sebacic acid, azelaic acid, tricarballylic acid; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, alkoxy, etc.

In a preferred embodiment, the acid anhydrides are selected from one or two or three or more than three of the following anhydrides which are substituted or unsubstituted: oxalic anhydride, malonic anhydride, succinic anhydride, maleic anhydride, glutaric anhydride, adipic anhydride, pimelic anhydride, sebacic anhydride, azelaic anhydride, hexahydrophthalic anhydride, tetrahydrophthalic anhydride; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, alkoxy, etc.

In a preferred embodiment, the polyhydric alcohols are selected from one or more of the following polyhydric alcohols which are substituted or unsubstituted: propanediol, butanediol, pentanediol, hexanediol, heptanediol, octanediol, nonanediol, decanediol, polyethylene glycol, glycerol; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, alkoxy, etc.

In a preferred embodiment, the polyhydric alcohols are selected from polyethylene glycol, or a combination of polyethylene glycol and one or more of the following polyols: propanediol, butanediol, pentanediol, hexanediol, heptanediol, octanediol, nonanediol, decanediol.

In a preferred embodiment, the polymerization degree of the polyethylene glycol is from 100 to 1000, preferably from 150 to 800, still more preferably from 200 to 600. Wherein, the weight ratio of the polyethylene glycol to the other polyhydric alcohols is 1:(0 to 1), preferably 1:(0 to 0.9), and more preferably 1:(0 to 0.8).

Terms and Definitions

Unless otherwise specified, the definitions of groups and terms given in the specification of the present application, including their definitions as examples, exemplary definitions, preferred definitions, definitions listed in the tables, definitions of specific compounds in the examples, etc., can be combined and merged arbitrarily between each other. The definitions of groups and compound structures after such combinations and merges are intended to be within the scope of protection of the present application.

The term "gel" in the present invention has a meaning well known in the art, and the term "gelation" also has a meaning well known in the art.

The gelable polymers and/or gelable prepolymers in the present invention mean the polymers and/or prepolymers which can form gel or can be gelled under certain conditions. Without limitation, the gelable polymers and/or gelable prepolymers of the present invention can be one or more selected from the group consisting of poly(ethylene oxide) (PEO), poly(ethylene glycol) (PEG), poly(vinylidene fluoride) (PVDF), polyvinyl chloride (PVC), polystyrene (PS), polyacrylonitrile (PAN), poly(vinyl acetate) (PVAC), polyvinylpyrrolidone (PVP), poly(divinyl sulfide) (PVS), poly(trimethylene carbonate) (PTMC), poly(methyl methacrylate) (PMMA), poly(ethylene glycol dimethacrylate) (PEGDM), polyoxypropylene (PPO), polydimethylsiloxane (PDMSO) or its prepolymer, or its copolymer, or its blend.

For the numerical range given in the specification, when the numerical range is defined as an "integer", it should be understood that the two endpoints of the range and each integer within the range are given. For example, "an integer of 0 to 10" should be understood as meaning each integer of 0, 1, 2, 3, 4, 5, 6, 7, 8, 9, and 10. When the numerical range is defined as a "number", it should be understood that the two endpoints of the range, each integer within the range and each fraction within the range are given. For example, "a number of 0 to 10" should be understood as meaning not only every integer of 0, 1, 2, 3, 4, 5, 6, 7, 8, 9, and 10, but also at least a sum of each integer with 0.1, 0.2, 0.3, 0.4, 0.5, 0.6, 0.7, 0.8, 0.9, respectively.

As used herein, "halogen" refers to fluoro, chloro, bromo and iodo.

As used herein, "alkyl" used alone or as a suffix or prefix in the present invention is intended to include a branched and straight-chain saturated aliphatic hydrocarbon having 1 to 20 carbon atoms, preferably 1 to 6 carbon atoms (or a specific number if a specific number of carbon atoms is provided). For example, "$C_{1-6}$ alkyl" denotes a straight-chain and branched alkyl group having 1, 2, 3, 4, 5 or 6 carbon atoms. Exemplary alkyl groups include, but are not limited to, methyl, ethyl, n-propyl, isopropyl, n-butyl, isobutyl, sec-butyl, tert-butyl, pentyl, and hexyl.

As used herein, "haloalkyl" or "alkyl halide" as used alone or as a suffix or prefix in the present invention is intended to include a branched and straight-chain saturated aliphatic hydrocarbon having at least one halogen substituent and 1 to 20 carbon atoms, preferably 1 to 6 carbon atoms (or a specific number if a specific number of carbon atoms is provided). For example, "$C_{1-10}$ haloalkyl" denotes a haloalkyl group having 0, 1, 2, 3, 4, 5, 6, 7, 8, 9, 10 carbon atoms. Exemplary haloalkyl groups include, but are not limited to, fluoromethyl, difluoromethyl, trifluoromethyl, chlorofluoromethyl, 1-fluoroethyl, 3-fluoropropyl, 2-chloropropyl, 3,4-difluorobutyl, etc.

As used herein, "alkenyl" used alone or as a suffix or prefix in the present invention is intended to include a branched and straight-chain aliphatic hydrocarbon including alkenyl or alkene having 2 to 20 carbon atoms, preferably 2 to 6 carbon atoms (or a specific number if a specific number of carbon atoms is provided). For example, "$C_{2-6}$ alkenyl" denotes an alkenyl group having 2, 3, 4, 5 or 6 carbon atoms. Exemplary alkenyl groups include, but are not limited to, vinyl, allyl, 1-propenyl, 1-butenyl, 2-butenyl, 3-butenyl, 2-methylbut-2-enyl, 3-methylbut-1-enyl, 1-pentenyl, 3-pentenyl and 4-hexenyl.

As used herein, "alkynyl" used alone or as a suffix or prefix in the present invention is intended to include a branched and straight-chain aliphatic hydrocarbon including alkynyl or alkyne having 2 to 20 carbon atoms, preferably 2 to 6 carbon atoms (or a specific number if a specific number of carbon atoms is provided), such as ethynyl, propynyl (e.g., 1-propynyl, 2-propynyl), 3-butynyl, pentynyl, hexynyl, and 1-methylpent-2-ynyl.

The term "aryl" as used herein refers to an aromatic cyclic structure composed of 5 to 20 carbon atoms. For example, an aromatic cyclic structure containing 5, 6, 7 and 8 carbon atoms can be a monocyclic aromatic group such as a phenyl group; a cyclic structure containing 8, 9, 10, 11, 12, 13 or 14 carbon atoms can be polycyclic such as naphthyl. The aromatic ring can replace the above substituents at one or more ring positions. The term "aryl" also includes a polycyclic ring system having two or more rings, wherein two or more carbons are shared by two adjacent rings (the ring is a "fused ring"), wherein at least one of these rings is aromatic and the other rings can be, for example, cycloalkyl, cycloalkenyl, cycloalkynyl, aryl and/or heterocyclyl groups. Exemplary polycyclic rings include, but are not limited to, 2,3-dihydro-1,4-benzodioxine and 2,3-dihydro-1-benzofuran.

The term "cycloalkyl" as used herein is intended to include a saturated cyclic group having a specified number of carbon atoms. These terms can include fused or bridged polycyclic systems. The cycloalkyl group has 3 to 40 carbon atoms in its ring structure. In one embodiment, the cycloalkyl group has 3, 4, 5 or 6 carbon atoms in its ring structure. For example, "$C_{3-6}$ cycloalkyl" represents a group such as cyclopropyl, cyclobutyl, cyclopentyl or cyclohexyl.

As used herein, "heteroaryl" refers to a heteroaromatic heterocycle having at least one ring hetero atom (e.g., sulfur, oxygen or nitrogen). The heteroaryl groups include monocyclic systems and polycyclic systems (e.g., having 2, 3 or 4 fused rings). Exemplary heteroaryl groups include, but are not limited to, pyridyl, pyrimidinyl, pyrazinyl, pyridazinyl, triazinyl, furyl, quinolyl, isoquinolyl, thienyl, imidazolyl, thiazolyl, indolyl, pyrrolyl, oxazolyl, benzofuranyl, benzothienyl, benzothiazolyl, isoxazolyl, pyrazolyl, triazolyl, tetrazolyl, indazolyl, 1,2,4-thiadiazolyl, isothiazolyl, benzothienyl, purinyl, carbazolyl, benzimidazolyl, benzoxazolyl, azabenzoxazolyl, imidazothiazolyl, benzo[1,4]dioxacyclohexenyl, benzo [1,3] dioxacyclopentenyl, etc. In some embodiments, a heteroaryl group has 3 to 40 carbon atoms and in other embodiments 3 to 20 carbon atoms. In some embodiments, a heteroaryl group contains 3 to 14, 4 to 14, 3 to 7, or 5 to 6 ring atoms. In some embodiments, a heteroaryl group has 1 to 4, 1 to 3 or 1 to 2 heteroatoms. In some embodiments, a heteroaryl group has 1 heteroatom.

Unless otherwise specified, as used herein, the term "heterocyclyl" refers to a saturated, unsaturated or partially saturated monocyclic, bicyclic or tricyclic ring containing 3 to 20 atoms, wherein 1, 2, 3, 4 or 5 ring atoms are selected from nitrogen, sulfur or oxygen, and unless otherwise specified, can be connected with carbon or nitrogen, wherein the —$CH_2$— group is optionally replaced by —C(O)—; and unless stated to the contrary, the nitrogen atom or the sulfur atom in a ring is optionally oxidized to the corresponding N-oxide or S-oxide, or the nitrogen atom in a ring optionally quaternized; wherein —NH in the ring is optionally replaced by acetyl, formyl, methyl or a methylsulfonyl group; and the ring is optionally substituted with one or more halogens. It should be understood that when the total number of S atoms and O atoms in the heterocyclyl group is greater than 1, these heteroatoms are not adjacent to each other. If the heterocyclyl group is bicyclic or tricyclic, at least one of the rings can be optionally heteroaromatic or aromatic, provided that at least one of the rings is non-heteroaromatic. If the heterocyclyl group is monocyclic, it should not be aromatic. Exemplary heterocyclyl groups include, but are not limited to, piperidinyl, N-acetylpiperidinyl, N-methylpiperidinyl, N-formylpiperazinyl, N-methyl sulfonylpiperazinyl, homopiperazinyl, piperazinyl, azetidinyl, oxetanyl, morpholinyl, tetrahydroisoquinolinyl, tetrahydroquinolyl, indanyl, tetrahydropyranyl, dihydro-2H-pyranyl, tetrahydrofuranyl, tetrahydrothiopyranyl, tetrahydrothiopyran-1-oxide, tetrahydrothiopyran-1,1-dioxide, 1H-pyridin-2-one and 2,5-dioxoimidazolidinyl.

Hereinafter, the present invention is further described in detail with reference to the specific embodiments. It should be understood that the examples are not intended to limit the scope of the present invention. In addition, it should be understood that after reading the content of the present invention, a person skilled in the art can make various changes and modifications to the present invention, and these equivalents are also deemed to fall under the scope of the present invention.

[Test Methods]

The conductivities in the examples were obtained using a Interface 1000-model electrochemical workstation of Gamry company, and the test scanning frequency was 1.0 Hz to 100 kHz. The battery testing in the examples was carried out on the LAND batteries test system.

[Materials and Reagents]

In the examples, the lithium salts were treated to remove water by vacuum drying at 40° C. for more than 10 hours prior to use. The cyclic ether compounds were treated by molecular sieves to remove water prior to use. The liquids including the electrolytes used in lithium-ion batteries or their solvents were dried by molecular sieves to remove water prior to use. The liquids including the electrolytes used in lithium-sulfur batteries or their solvents were treated by molecular sieves to remove water prior to use. The additives were treated to remove water by vacuum drying at 45° C. for more than 24 hours prior to use.

The conventional electrolytes for lithium-ion batteries used in the present examples were selected from a mixed solution of ethylene carbonate and dimethyl carbonate containing 1 M lithium hexafluorophosphate, wherein, the volume ratio of the ethylene carbonate to the dimethyl carbonate is 1:1.

The conventional electrolytes for lithium-sulfur batteries used in the present examples were selected from ether mixture solution containing lithium salts, for example, a mixture solution of 1,3-dioxolane and ethylene glycol dimethyl ether containing 1 M lithium bis(trifluoromethanesulfonyl)imide, wherein, the volume ratio of the 1,3-dioxolane to the ethylene glycol dimethyl ether is 1:1.

The inorganic nanoparticles were treated to remove water by vacuum drying at 60° C. for more than 10 hours prior to use.

[Compositions of the Batteries in the Following Examples]

The cathode materials were at least one selected from the group consisting of lithium cobalt oxide, lithium nickel oxide, lithium manganese oxide, ternary material nickel cobalt manganese oxide, nano positive electrode materials (e.g., nanocrystalline spinel $LiMn_2O_4$, barium magnesium manganese ore-type $MnO_2$ nanofibers, polypyrrole-coated spinel-type $LiMn_2O_4$ nanotubes, polypyrrole/$V_2O_5$ nanocomposite, etc.), blended electrodes, vanadium oxide, layered compounds (such as aniline modified iron oxychloride, etc.).

The anode materials were at least one selected from the group consisting of metallic anode materials (such as metallic lithium, lithium alloy, etc.), inorganic non-metallic anode materials (such as carbon materials, silicon materials, and other non-metallic composite materials, etc.).

The separators were selected from the group consisting of a solid electrolyte membrane prepared by the gelable system of the present invention or polyolefin porous membrane, such as at least one of polyethylene microporous membrane, polypropylene microporous membrane, a triple-layer composite separator.

Preparation of positive electrode for lithium-ion batteries: uniformly mixing a positive electrode material with conductive graphite, acetylene black (super p) conductive agent and polyvinylidene fluoride (PVDF) binder in a mass ratio of 85:5:5:5, and preparing the mixture into a slurry using N-methyl-pyrrolidone (NMP), which was uniformly coated on an aluminum foil, dried in a vacuum oven at 120° C. for 24 hours, and ready for use;

Preparation of positive electrode for lithium-sulfur batteries: uniformly mixing a positive electrode material with acetylene black (super p) conductive agent and polyvinylidene fluoride (PVDF) binder in a mass ratio of 8:1:1, and preparing the mixture into a slurry using N-methyl-pyrrolidone (NMP), which is uniformly coated on an aluminum foil, dried in a vacuum oven at 60° C. for 24 hours, and ready for use.

Example 1-0

(1) Preparation of Gelable System and Solid Electrolyte

Weighing 0.5 g of solid lithium tetrafluoroborate in a reagent bottle, adding 1.6 mL of 1,3-dioxolane, and dissolving lithium salts completely under magnetic stirring to prepare a lithium tetrafluoroborate/1,3-dioxolane solution containing 23 wt % lithium salts and obtain a gelable system; letting stand for a while to obtain a solid electrolyte. The test results show that the formation time of the solid electrolyte is 6 hours, the formation temperature of the solid electrolyte is room temperature, the transition temperature of the solid electrolyte is 60° C., and the conductivity of the solid electrolyte is $1.06 \times 10^{-5}$ S/cm.

When the prepared solid electrolyte was heated above 60° C., the solid electrolyte began to become viscous. When the reagent bottle was inverted, the downward flow of the solid electrolyte was observed, indicating that the transition temperature of the solid electrolyte was reached. When the temperature dropped below 60° C., the solid electrolyte was formed again, indicating that the prepared solid electrolyte had good reversibility.

Figure 26:
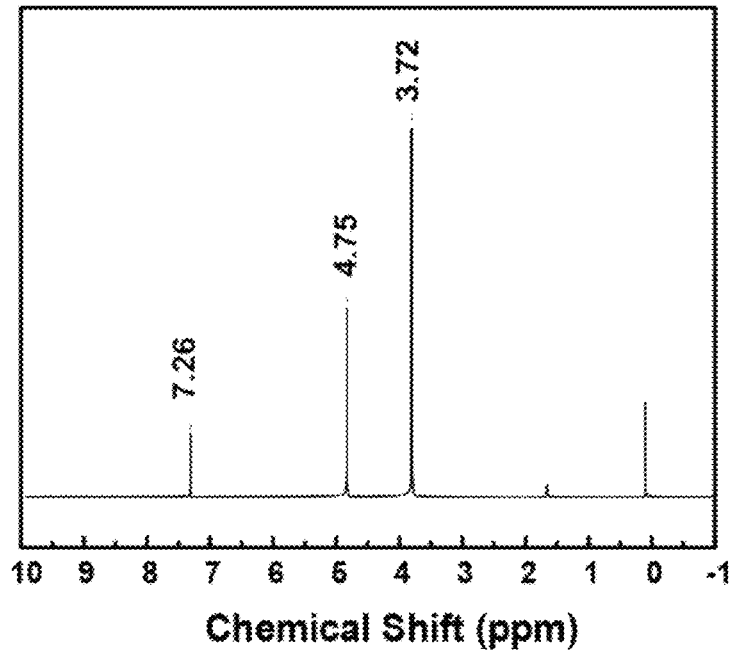
FIG. 26 is an NMR spectrum of the substance purified from the solid electrolyte obtained in Example 1-0.

The solid electrolyte was completely dissolved in a solvent (such as deionized water), and then precipitated in ethanol. The obtained polymer was dissolved in deuterated chloroform, and determined by proton NMR. The test results are shown in FIG. 26, shown as follows: the chemical shift of 3.72 ppm is attributed to the polymer segment —O—$CH_2$—$CH_2$—O—, the chemical shift of 4.75 ppm is attributed to the polymer segment —O—$CH_2$—O—, and the integral area of the two polymer segments is 2:1, which is the same as the ratio of the two segments in the repeating unit (—$CH_2$—O—$CH_2$—$CH_2$—O—), indicating that the target polymer has been successfully obtained in the electrolyte system.

Figure 27:
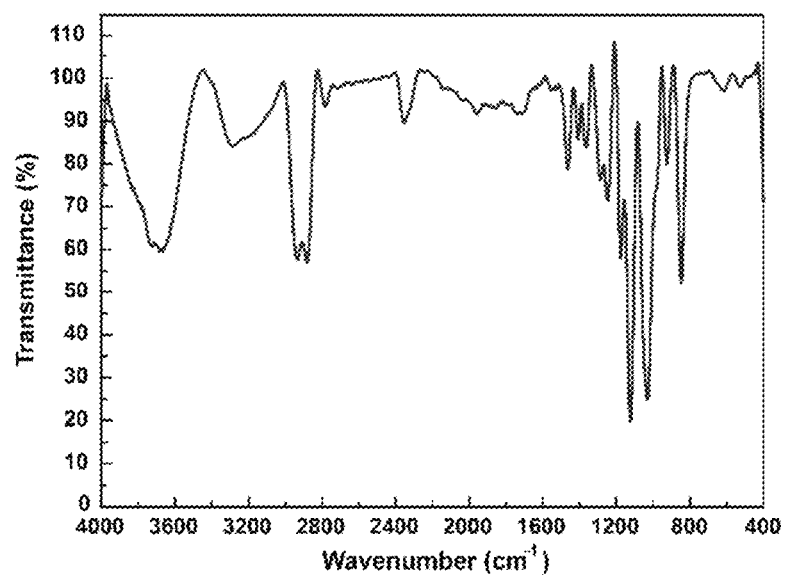
FIG. 27 is an IR spectrum of the substance purified from the solid electrolyte obtained in Example 1-0.

Similarly, the solid electrolyte was completely dissolved in a solvent (such as deionized water), and then precipitated in ethanol. The obtained polymer was grinded and uniformly mixed with an appropriate amount of KBr powder, compressed into tablets, and characterized by infrared spectroscopy. It can be seen from FIG. 27 that the peak at 1100 $cm^{-1}$ corresponds to the stretching vibration of —$CH_2$—, and the peak at 2900 $cm^{-1}$ corresponds to the stretching vibration of —$CH_2$—, which further demonstrates the structure of the compound.

(2) Preparation of Batteries

The solid electrolyte prepared above was applied to coin cell batteries, and the electrochemical performance of the coin cell batteries was tested using the LAND batteries test system (the test results are shown in Table 1). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system becomes the solid electrolyte.

Example 1-1

(1) Preparation of Gelable System and Solid Electrolyte

Weighing 0.5 g of solid lithium tetrafluoroborate in a reagent bottle, adding 1.6 mL of tetrahydropyran, and dissolving lithium salts completely under magnetic stirring to prepare a lithium tetrafluoroborate/tetrahydropyran solution containing 23 wt % lithium salts and obtain a gelable system; letting stand still for a while to obtain a solid electrolyte. The test results show that the formation time of the solid electrolyte is 6 hours, the formation temperature of the solid electrolyte is room temperature, the transition temperature of the solid electrolyte is 90° C., and the ionic conductivity of the solid electrolyte is $1.06 \times 10^{-6}$ S/cm.

When the prepared solid electrolyte was heated above 90° C., the solid electrolyte began to become viscous. When the reagent bottle was inverted, the downward flow of the solid electrolyte was observed, indicating that the transition temperature of the solid electrolyte was reached. When the temperature dropped below 90° C., the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 1). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system becomes the solid electrolyte.

Example 1-2

(1) Preparation of Gelable System and Gel (Used as a Gel Electrolyte for Batteries)

Weighing 0.7 g of solid lithium hexafluoroarsenate in a reagent bottle, adding 5.0 mL of 1,4-dioxane, and under magnetic stirring preparing a lithium hexafluoroarsenate/1,4-dioxane solution containing 12 wt % lithium salts and obtaining a gelable system; continuously stir, letting stand still for a while to obtain a gel. The test results show that the formation time of the gel is 24 hours, the formation temperature of the gel is room temperature, the transition temperature of the gel is 65° C., and the ionic conductivity of the gel is $5.27 \times 10^{-4}$ S/cm.

FIG. 1 is an optical photograph of the gel of Example 1-2, shown that the colorless transparent gel can be prepared by using the above ratio of the lithium salts and the cyclic ether compounds; in addition, when the reagent bottle is inverted below the transition temperature, the gel exhibits no flow phenomenon.

When the prepared gel was heated above 65° C., the gel began to become viscous. When the reagent bottle was inverted, the downward flow of the gel was observed, indicating that the transition temperature of the gel was reached. When the temperature dropped below 65° C., the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 1). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system becomes the gel electrolyte.

Example 1-3

(1) Preparation of Gelable System and Solid Electrolyte

Weighing 0.45 g of solid lithium fluorosulfonimide and 0.45 g of solid lithium perchlorate ($LiClO_4$) in a reagent bottle, adding 3.6 mL of 2-methyltetrahydropyran, and under magnetic stirring preparing a fluorosulfonimide lithium+$LiClO_4$/2-methyltetrahydropyran solution containing 20 wt % lithium salts and obtaining a gelable system; continuously stir, letting stand still for a while to obtain a solid electrolyte. The test results show that the formation time of the solid electrolyte is 12 hours, the formation temperature of the solid electrolyte is room temperature, the transition temperature of the solid electrolyte is 80° C., and the ionic conductivity of the solid electrolyte is $3.26 \times 10^{-6}$ S/cm.

Figure 2:
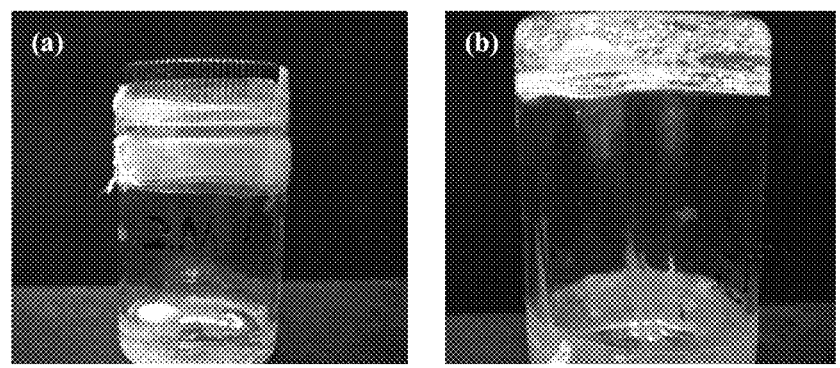
FIG. 2 is an optical photograph of the solid electrolyte of Example 1-3.

FIG. 2 is an optical photograph of the solid electrolyte of Example 1-3, shown that the solid electrolyte can be prepared by using the above ratio of the lithium salts and the cyclic ether compounds; in addition, when the reagent bottle is inverted below the transition temperature, the solid electrolyte exhibits no flow phenomenon.

When the prepared solid electrolyte was heated above 80° C., the solid electrolyte began to become viscous. When the reagent bottle was inverted, the downward flow of the solid electrolyte was observed, indicating that the transition temperature of the solid electrolyte was reached. When the temperature dropped below 80° C., the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 1). Wherein, the method for preparing the coin cell batteries was: placing separator between positive electrodes and negative electrodes, filling the gelable system prepared in the step (1) in the space between the three parts, packing and compacting, assembling into CR-2032 coin cell batteries, and letting stand still until the gelable system becomes the solid electrolyte.

Example 1-4

(1) Preparation of Gelable System and Gel (Used as a Gel Electrolyte)

Weighing 0.2 g of solid lithium perfluorobutanesulfonate and 0.2 g of solid lithium bis(fluorosulfonyl)imide in a reagent bottle, adding 8.0 mL of 1,3-dioxolane (DOL), and under magnetic stirring preparing a lithium perfluorobutanesulfonate+lithium bis(fluorosulfonyl)imide/DOL solution containing 5 wt % lithium salts and obtaining a gelable system; continuously stir until the lithium salts was completely dissolved, letting stand still for a while to obtain a gel. The test results show that the formation time of the gel is 20 hours, the formation temperature of the gel is room temperature, the transition temperature of the gel is 45° C., and the ionic conductivity of the gel is $6.14 \times 10^{-3}$ S/cm.

When the prepared gel was heated above 45° C., the gel began to become viscous. When the reagent bottle was inverted, the gel was observed to flow to the bottle mouth, indicating that the transition temperature of the gel was reached. When the temperature dropped below 45° C., the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 1). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system becomes the gel electrolyte.

Example 1-5

(1) Preparation of Gelable System and Gel (Used as a Gel Electrolyte)

Weighing 0.3 g of solid lithium chloride, 0.3 g of solid lithium bis(trifluoromethanesulfonyl)imide and 0.2 g of solid lithium perchlorate in a reagent bottle, adding 10.0 mL of tetrahydrofuran, and under magnetic stirring preparing a lithium chloride+lithium bis(trifluoromethanesulfonyl)imide+lithium perchlorate/tetrahydrofuran solution containing 7.4 wt % lithium salts and obtaining a gelable system; continuously stir until the lithium salts were completely dissolved, letting stand still for a while to form a gel. The test results show that the formation time of the gel is 14 hours, the formation temperature of the gel is room temperature, the transition temperature of the gel is 63° C., and the ionic conductivity of the gel is $3.52 \times 10^{-3}$ S/cm.

When the prepared gel was heated above 63° C., the gel began to become viscous. When the reagent bottle was inverted, the downward flow of the gel was observed, indicating that the transition temperature of the gel was reached. When the temperature dropped below 63° C., the gel was formed again, indicating that the prepared gel had good reversibility.

Figure 3:
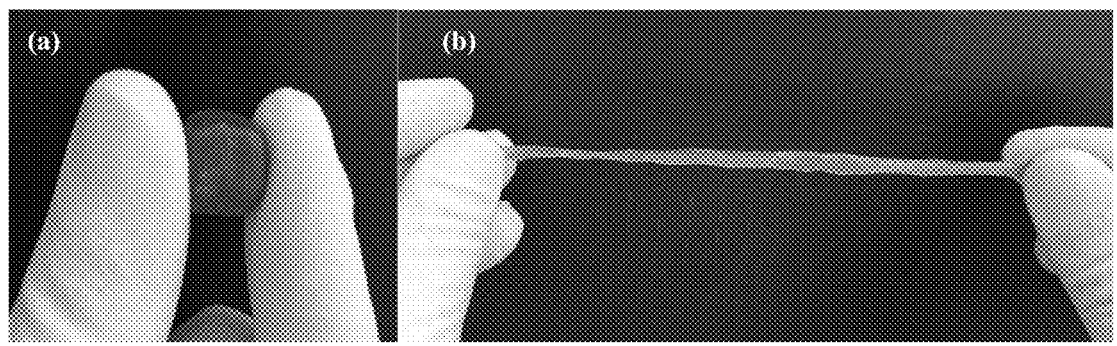
FIG. 3 is an optical photograph of the stretchable gel of Example 1-5.

FIG. 3 is an optical photograph of the gel of Example 1-5, shown that the gel can be prepared by using the above ratio of the lithium salts and the cyclic ether compounds; and the gel has good tensile properties and plasticity, which can be stretched and twisted into any shape without, does not automatically recover, and needs external force to restore plasticity.

Figure 31:
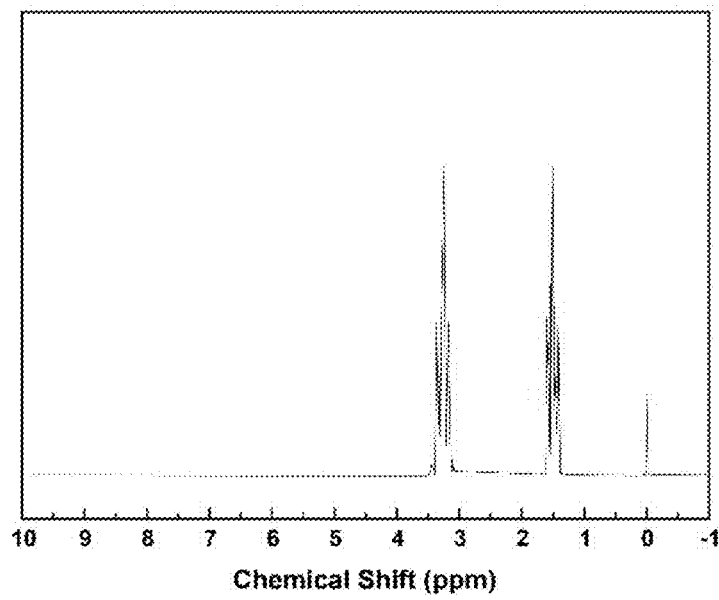
FIG. 31 is an NMR spectrum of the substance purified from the gel electrolyte obtained in Example 1-5.

The gel electrolyte was completely dissolved in a solvent (such as deionized water), and then precipitated in ethanol. The obtained polymer was dissolved in deuterated chloroform, and determined by proton NMR. The test results are present in FIG. 31, shown as follows: the chemical shift of 1.51 ppm is attributed to the polymer segment —O—CH$_2$—CH$_2$— (two H attached to C in bold), the chemical shift of 3.37 ppm is attributed to the polymer segment —O—CH$_2$—CH$_2$— (two H attached to C in bold), and the integral area of the two polymer segments is 1:1, which is the same as the ratio of the two segments in the repeating unit (—O—CH$_2$—CH$_2$—CH$_2$—CH$_2$—O—), indicating that the target polymer has been successfully obtained in the electrolyte system.

(2) Preparation of Batteries

The gel prepared above used as a gel electrolyte was applied to coin cell batteries, and the electrochemical performance of the coin cell batteries was tested using the LAND batteries test system (the test results are shown in Table 1). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system becomes the gel electrolyte.

Example 1-6

(1) Preparation of Gelable System and Gel (Used as a Gel Electrolyte)

Weighing 0.2 g of solid lithium hexafluorophosphate and 0.2 g of solid lithium perfluorobutanesulfonate in a reagent bottle, adding 4.0 mL of 1,4-epoxycyclohexane, and dissolving the lithium salts completely under magnetic stirring to prepare a lithium hexafluorophosphate+lithium perfluorobutanesulfonate/1,4-epoxycyclohexane solution containing 10 wt % lithium salts and obtain a gelable system; letting stand still for a while to obtain a gel. The test results show that the formation time of the gel is 12 hours, the formation temperature of the gel is room temperature, the transition temperature of the gel is 67° C., and the ionic conductivity of the gel is $1.05 \times 10^{-4}$ S/cm.

When the prepared gel was heated above 67° C., the gel began to become viscous. When the reagent bottle was inverted, the downward flow of the gel was observed, indicating that the transition temperature of the gel was reached. When the temperature dropped below 67° C., the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 1). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system becomes the gel electrolyte.

Example 1-7

(1) Preparation of Gelable System and Gel (Used as a Gel Electrolyte)

Weighing 1.2 g of solid trioxymethylene, 0.15 g of solid lithium bis(fluorosulfonyl)imide and 0.1 g of solid lithium perfluorobutanesulfonate in a reagent bottle, adding 3.0 mL of 1,4-dioxane (water removed by using molecular sieves before use), and dissolving the lithium salts and trioxymethylene completely under magnetic stirring to prepare a lithium bis(fluorosulfonyl)imide+lithium perfluorobutanesulfonate/1,4-dioxane+trioxymethylene solution containing 6 wt % lithium salts; letting stand still for a while to obtain a gel. The test results show that the formation time of the gel is 26 hours, the formation temperature of the gel is room temperature, the transition temperature of the gel is 82° C., and the ionic conductivity of the gel is $4.18 \times 10^{-3}$ S/cm.

When the prepared gel was heated above 82° C., the gel began to become viscous. When the reagent bottle was inverted, the downward flow of the gel was observed, indicating that the transition temperature of the gel was reached. When the temperature dropped below 82° C., the gel was formed again, indicating that the prepared gel had good reversibility.

(2) Preparation of Batteries

The gel prepared above used as a gel electrolyte was applied to batteries, and the electrochemical performance of the batteries was tested using the LAND batteries test system (the test results are shown in Table 1). Wherein, the method for preparing the batteries was: placing a separator between positive electrodes and negative electrodes, injecting the gelable system prepared in the step (1), packing and compacting, assembling into batteries, and letting stand still until the gelable system becomes the gel electrolyte.

Example 1-8

(1) Preparation of Gelable System and Gel (Used as a Gel Electrolyte)

Weighing 0.15 g of solid lithium fluorosulfonimide, 0.2 g of solid lithium perfluorobutanesulfonate in a reagent bottle, adding 1.5 mL of 3-methyltetrahydrofuran and 1.5 mL of 1,3-epoxycyclohexane, and dissolving the lithium salts completely under magnetic stirring to prepare a lithium fluorosulfonimide+lithium perfluorobutanesulfonate/3-methyltetrahydrofuran+1,3-epoxycyclohexane solution containing 12 wt % lithium salts and obtain a gelable system; letting stand still for a while to obtain a gel. The test results show that the formation time of the gel is 12 hours, the formation temperature of the gel is room temperature, the transition temperature of the gel is 55° C., and the ionic conductivity of the gel is $3.74 \times 10^{-4}$ S/cm.

When the prepared gel was heated above 55° C., the gel began to become viscous. When the reagent bottle was inverted, the downward flow of the gel was observed, indicating that the transition temperature of the gel was reached. When the temperature dropped below 55° C., the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 1). Wherein, the method for preparing the coin cell batteries was: replacing the conventional polyvinylidene fluoride (PVDF) binder by the gelable system in the above step (1), beating the active material and the conductive agent together during the preparation of positive plates and negative plates which were coated to become the electrodes, placing a separator between the positive electrodes and negative electrodes, filling the gelable electrolyte prepared in the step (1), packing and compacting, assembling into batteries, and letting stand until the gelable system becomes the gel electrolyte.

Example 1-9

(1) Preparation of Gelable System and Gel (Used as a Gel Electrolyte)

Weighing 0.15 g of solid lithium hexafluorophosphate and 0.2 g of solid lithium bis(oxalate) borate in a reagent bottle, adding 1.0 g of urea, 0.5 g of trioxymethylene and 1.5 mL of 1,3-epoxycyclohexane, and dissolving the lithium salts completely under magnetic stirring to prepare a lithium hexafluorophosphate+lithium bis(oxalate) borate/trioxymethylene+1,3-epoxycyclohexane solution containing 12 wt % lithium salts and obtain a gelable system; letting stand still for a while to obtain a gel. The test results show that the formation time of the gel is 10 hours, the formation temperature of the gel is room temperature, the transition temperature of the gel is 62° C., and the ionic conductivity of the gel is $3.88 \times 10^{-4}$ S/cm.

When the prepared gel was heated above 62° C., the gel began to become viscous. When the reagent bottle was inverted, the downward flow of the gel was observed, indicating that the transition temperature of the gel was reached. When the temperature dropped below 62° C., the gel was formed again, indicating that the prepared gel had good reversibility.

(2) Preparation of Batteries

The gel prepared above used as a gel electrolyte was applied to 1 Ah lithium manganate punch pack batteries, and the electrochemical performance of the punch pack batteries was tested using the LAND batteries test system (the test results are shown in Table 1). Wherein, the method for preparing the punch pack batteries was: placing a separator between positive electrodes and negative electrodes, winding, leaving an injection port when sealing, injecting the gelable system prepared in the step (1), vacuum packing, assembling into punch pack batteries, and letting stand still until the gelable system becomes the gel electrolyte.

TABLE 1

Performance parameters of batteries prepared by gels or solid electrolytes in Examples 1-0 to 1-9

| Number | Application | Battery performance | |
|---|---|---|---|
| | | Initial specific capacity | Residual specific capacity after 50 cycles |
| Example 1-0 | lithium-sulfur battery | 1118 mAh · g$^{-1}$ | 707 mAh · g$^{-1}$ |
| Example 1-1 | lithium-sulfur battery | 1204 mAh · g$^{-1}$ | 711 mAh · g$^{-1}$ |
| Example 1-2 | lithium-sulfur battery | 1352 mAh · g$^{-1}$ | 720 mAh · g$^{-1}$ |
| Example 1-3 | lithium-sulfur battery | 1097 mAh · g$^{-1}$ | 733 mAh · g$^{-1}$ |
| Example 1-4 | lithium-sulfur battery | 1174 mAh · g$^{-1}$ | 721 mAh · g$^{-1}$ |
| Example 1-5 | lithium-ion battery | 129 mAh · g$^{-1}$ | 133 mAh · g$^{-1}$ |
| Example 1-6 | lithium-ion battery | 127 mAh · g$^{-1}$ | 130 mAh · g$^{-1}$ |
| Example 1-7 | lithium-ion battery | 132 mAh · g$^{-1}$ | 135 mAh · g$^{-1}$ |
| Example 1-8 | lithium-ion battery | 131 mAh · g$^{-1}$ | 134 mAh · g$^{-1}$ |
| Example 1-9 | lithium manganate punch pack battery | 991.6 mAh | 994.1 mAh |

Figure 4:
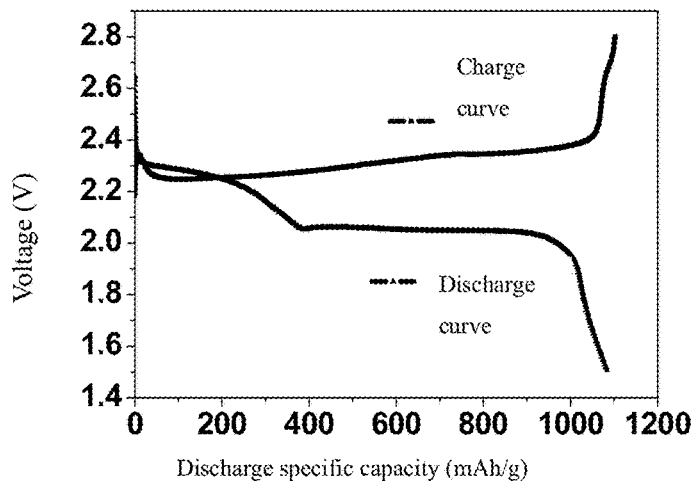
FIG. 4 is a graph showing the initial charge and discharge of the lithium-sulfur battery assembled with the gel electrolyte obtained in Example 1-4 as the electrolyte.

FIG. 4 is a graph showing the initial charge and discharge of the lithium-sulfur battery assembled with the gel electrolyte obtained in Example 1-4 as the electrolyte. As shown in the figure, when the gel electrolyte is used as an electrolyte for a lithium-sulfur battery, the lithium-sulfur battery can be normally charged and discharged, in which the active material is fully active, thus obtaining a relatively high specific capacity.

Figure 5:
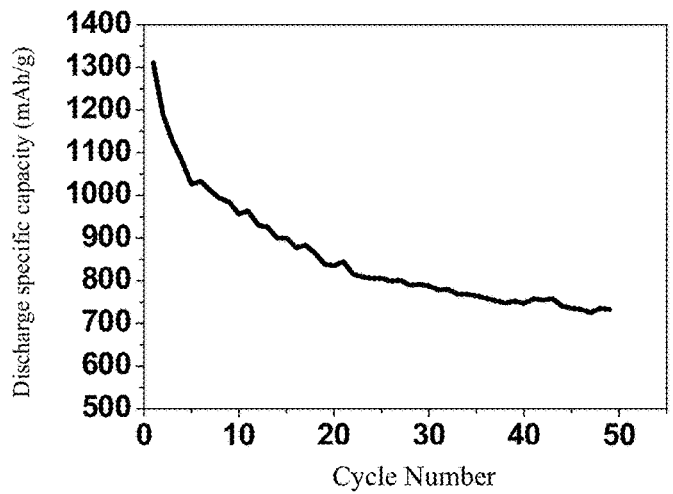
FIG. 5 is a graph showing the cycling performance of the lithium-sulfur battery assembled with the gel electrolyte obtained in Example 1-4 as the electrolyte.

FIG. 5 is a graph showing the cycling performance of the lithium-sulfur battery assembled with the gel electrolyte obtained in Example 1-4 as the electrolyte. As shown in the figure, when the gel electrolyte is used as the electrolyte for the lithium-sulfur battery, the lithium-sulfur battery can significantly alleviate the "shuttling effect", thereby increasing the utilization efficiency of the active material and further improving the cycling performance of the battery.

Figure 28:
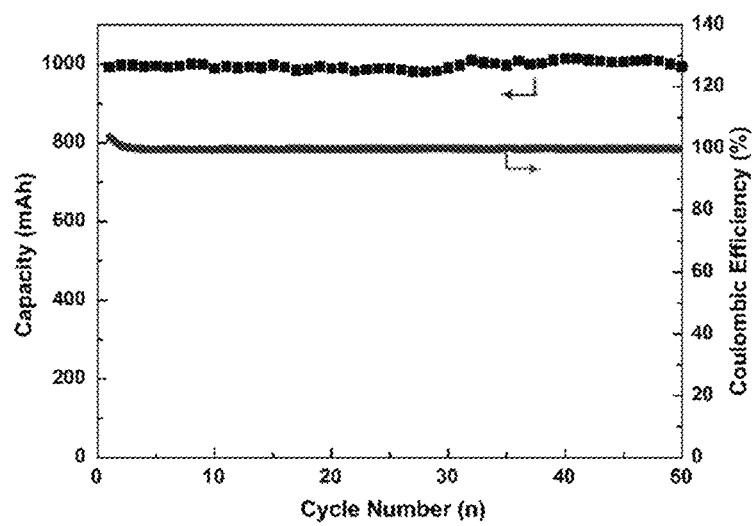
FIG. 28 is graphs showing the cycling performance and the corresponding Coulombic efficiency of the lithium manganese oxide punch pack battery (1 Ah) assembled with the gel electrolyte obtained in Example 1-9 as the electrolyte.

FIG. 28 is graphs showing the cycling performance and the corresponding Coulombic efficiency of the lithium manganese oxide punch pack battery (1 Ah) assembled with the gel electrolyte obtained in Example 1-9 as the electrolyte. As shown in the figure, the gel electrolyte can deliver its full capacity in the punch pack battery, which is close to the theoretical capacity and remains basically unchanged after 50 cycles, and the Coulombic efficiency is always close to 100% during cycling, exhibiting superior cycling stability.

Example 2-1

(1) Preparation of Gelable System and Gel (Used as a Gel Electrolyte for Batteries)

Weighing 0.9 g of solid lithium hexafluorophosphate in a reagent bottle, adding 1.5 mL of dimethyl carbonate (DMC), stirring well, then completely dissolving lithium hexafluorophosphate, adding 1.5 mL of 1,4-epoxyoctane, and sufficiently mixing under magnetic stirring to obtain a gelable system; letting stand still for a while to form a gel. In the gel system, the mass fraction of the lithium salts used in lithium-ion batteries is 23 wt %; the mass fraction of the cyclic ether compounds is 38 wt %; and the mass fraction of the electrolytes or their solvents used in lithium-ion batteries is 39 wt %. After testing, the performance parameters of the gel are listed in Table 2.

When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 2). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 2-2

(1) Preparation of Gelable System and Gel (Used as a Gel Electrolyte for Batteries)

Weighing 0.3 g of solid lithium perchlorate and 0.3 g of solid lithium tetrafluoroborate in a reagent bottle, adding 1.0 mL of a mixed carbonate solvent (a mixed solution of diethyl carbonate (DEC) and ethylene carbonate (EC) in a volume ratio of 1:1), dissolving the lithium salts completely under magnetic stirring, then adding 1.5 mL of 2-methyltetrahydropyran to the above mixture, and obtaining a gelable system after sufficiently mixing; letting stand still for a while to form a gel. In the gel system, the mass fraction of the lithium salts used in lithium-ion batteries is 19 wt %; the mass fraction of the cyclic ether compounds is 48 wt %; and the mass fraction of the electrolytes or their solvents used in lithium-ion batteries is 33 wt %. After testing, the performance parameters of the gel are listed in Table 2.

When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 2). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 2-3

(1) Preparation of Gelable System and Solid Electrolyte

Weighing 1.2 g of solid lithium fluorosulfonimide in a reagent bottle, adding 1.5 mL of a electrolyte for conventional lithium batteries (a mixed solution of diethyl carbonate (DEC) and ethylene carbonate (EC) containing 1 mol/L $LiPF_6$, and diethyl carbonate (DEC) and ethylene carbonate (EC) in a volume ratio of 1:1), dissolving the lithium salts completely under magnetic stirring, then adding 5.5 mL of tetrahydropyran to the above mixture, and obtaining a gelable system after sufficiently mixing; letting stand still for a while to form a solid electrolyte. In the solid electrolyte system, the mass fraction of the lithium salts used in lithium-ion batteries is 15 wt %; the mass fraction of the cyclic ether compounds is 67 wt %; and the mass fraction of the electrolytes or their solvents used in lithium-ion batteries is 18 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the transition temperature of the solid electrolyte, the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 2). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 2-4

(1) Preparation of Gelable System and Solid Electrolyte

Weighing 0.4 g of solid lithium hexafluorophosphate and 0.9 g of solid lithium fluorosulfonimide in a reagent bottle, adding 1.0 mL of ethyl methyl carbonate and 1.0 mL of ethylene carbonate, and dissolving the lithium salts completely under magnetic stirring, then adding 3.0 mL of tetrahydropyran and 3.5 mL of 1,3-dioxolane, and obtaining a gelable system after sufficiently mixing; letting stand still for a while to form a solid electrolyte. In the solid electrolyte system, the mass fraction of the lithium salts used in lithium-ion batteries is 13 wt %; the mass fraction of the cyclic ether compounds is 66 wt %; and the mass fraction of the electrolytes or their solvents used in lithium-ion batteries is 21 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the transition temperature of the solid electrolyte, the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 2). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 2-5

(1) Preparation of Gelable System and Solid Electrolyte

Weighing 1.85 g of solid trioxymethylene, 0.6 g of solid lithium aluminate and 0.2 g of solid lithium tetrafluoroborate in a reagent bottle, adding 1.0 mL of propylene carbonate and 0.6 mL of γ-butyrolactone, mixing sufficiently under magnetic stirring until the lithium salts and trioxymethylene dissolve completely, adding 1.85 mL of tetrahydrofuran, and obtaining a gelable system after sufficiently mixing; letting stand still for a while to form a solid electrolyte. In the solid electrolyte system, the mass fraction of the lithium salts used in lithium-ion batteries is 13.1 wt %; the mass fraction of the cyclic ether compounds is 60.7 wt %; and the mass fraction of the electrolytes or their solvents used in lithium-ion batteries is 26.2 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the transition temperature of the solid electrolyte, the solid electrolyte was formed again, indicating that the prepared solid electrolyte had good reversibility.

Figure 32:
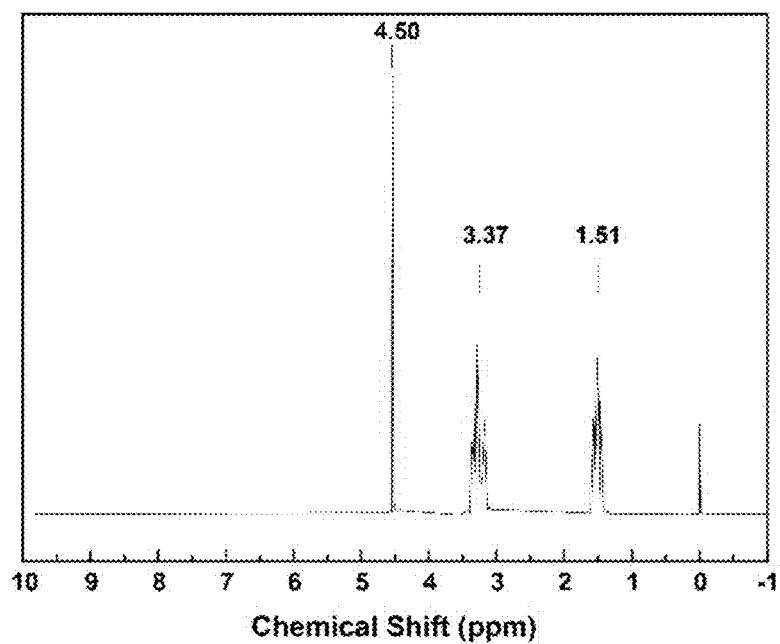
FIG. 32 is an NMR spectrum of the substance purified from the solid electrolyte obtained in Example 2-5.

The solid electrolyte was completely dissolved in a solvent (such as deionized water), and then precipitated in ethanol. The obtained polymer was dissolved in deuterated chloroform, and determined by proton NMR. The test results are present in FIG. 32, shown as follows: the chemical shift of 4.50 ppm is attributed to —O—CH$_2$—O—, which is a characteristic peak of polyoxymethylene, the chemical shift of 1.51 ppm is attributed to the polymer segment —O—CH$_2$—CH$_2$— (two H attached to C in bold), the chemical shift of 3.37 ppm is attributed to the polymer segment —O—CH$_2$—CH$_2$— (two H attached to C in bold), the integral area of the two polymer segments is 1:1, which is the same as the ratio of the two segments in the repeating unit of polytetrahydrofuran, and the characteristic peak area ratio of the two substances is 1:1, which is exactly the feed ratio, indicating that the target polymer has been successfully obtained in the electrolyte system.

(2) Preparation of Batteries

The solid electrolyte prepared above was applied to coin cell batteries, and the electrochemical performance of the coin cell batteries was tested using the LAND batteries test system (the test results are shown in Table 2). Wherein, the method for preparing the coin cell batteries was: wetting positive plates and negative plates sufficiently with the gelable system prepared in the above step (1), meanwhile coating the gelable system prepared in the above step (1) onto a glass plate, peeling off after letting stand still to form a solid electrolyte, placing it between the wetted positive and negative electrodes, packing and compacting, assembling into batteries, and letting stand still until the gelable system become the solid electrolyte.

Example 2-6

(1) Preparation of Gelable System and Gel (Used as a Gel Electrolyte for Batteries)

Weighing 0.8 g of lithium hexafluoroarsenate in a reagent bottle, adding 1.0 mL of ethyl methyl carbonate and 1.0 mL of dimethyl carbonate, dissolving the lithium salts completely by stirring, adding 4.0 mL of 1,4-dioxane to above lithium salts solution, obtaining a gelable system after stirring and sufficiently mixing; letting stand still for a while to form a gel. In the gel system, the mass fraction of the lithium salts used in lithium-ion batteries is 12 wt %; the mass fraction of the cyclic ether compounds is 58 wt %; and the mass fraction of the electrolytes or their solvents used in lithium-ion batteries is 30 wt %. After testing, the performance parameters of the gel are listed in Table 2.

When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 2). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 2-7

(1) Preparation of Gelable System and Solid Electrolyte

Weighing 0.6 g of lithium chloride and 1.0 g of lithium perchlorate in a reagent bottle, adding 1.1 mL of a lithium ion conventional electrolyte, dissolving the lithium salts completely under magnetic stirring, and adding 2.1 mL of 1,4-epoxycyclohexane and 2.1 mL of tetrahydrofuran, obtaining a gelable system after stirring and sufficiently mixing; letting stand still for a while to form a solid electrolyte. In the solid electrolyte system, the mass fraction of the lithium salts used in lithium-ion batteries is 23 wt %; the mass fraction of the cyclic ether compounds is 61 wt %;

and the mass fraction of the electrolytes or their solvents used in lithium-ion batteries is 16 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the transition temperature of the solid electrolyte, the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 2). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 2-8

(1) Preparation of Gelable System and Solid Electrolyte

Weighing 1.0 g of solid trioxymethylene, 0.6 g of solid lithium bis(trifluoromethanesulfonyl)imide and 0.2 g of solid lithium tetrafluoroborate in a reagent bottle, adding 0.8 mL of t-butyl carbonate and 0.8 mL of dimethyl carbonate, mixing sufficiently under magnetic stirring until the lithium salts and trioxymethylene dissolving completely, adding 2.7 mL of tetrahydrofuran, and obtaining a gelable system after sufficiently mixing; letting stand still for a while, to form a solid electrolyte. In the solid electrolyte system, the mass fraction of the lithium salts used in lithium-ion batteries is 13 wt %; the mass fraction of the cyclic ether compounds is 61 wt %; and the mass fraction of the electrolytes or their solvents used in lithium-ion batteries is 26 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the transition temperature of the solid electrolyte, the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 2). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte, then circulating at a high temperature of 60° C.

Comparative Example 2-1

Weighing 1.0 g of lithium bis(trifluoromethanesulfonyl) imide and 1.0 g of lithium hexafluorophosphate in a reagent bottle, adding 4.0 mL of a conventional electrolyte for lithium-ion batteries (dimethyl carbonate (DMC) and ethylene carbonate (EC) in a volume ratio of 1:1 containing 1 M $LiPF_6$), sufficiently stirring and dissolving the lithium salts completely, and letting stand still. In the above system, the mass fraction of the lithium salts used in the lithium-ion battery is 33 wt %; the mass fraction of the cyclic ether compounds is 0 wt %; the mass fraction of the electrolytes or their solvents used in the lithium-ion battery is 67 wt %.

It is found that after standing still for a long time, the fluidity of the solution is very good and can not form a stable gel. It is indicated that in the absence of cyclic ether compounds, if only lithium salts and solvents are mixed, a stable gel cannot be formed.

Figure 6:
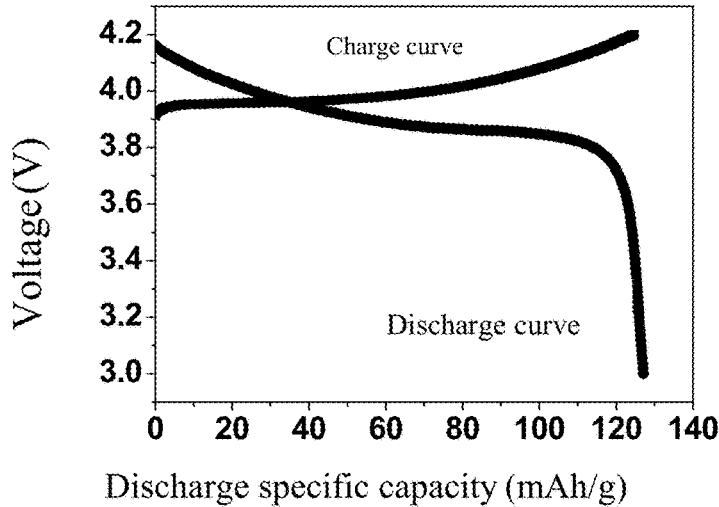
FIG. 6 is a graph showing the initial charge and discharge of the lithium-ion battery assembled with the gel electrolyte obtained in Example 2-1 as the electrolyte.

FIG. 6 is a graph showing the initial charge and discharge of the lithium-ion battery assembled with the gel electrolyte obtained in Example 2-1 as the electrolyte. As shown in the figure, when the gel electrolyte is used as the electrolyte for the lithium-ion battery, the lithium-ion battery can be normally charged and discharged, in which the active material is fully active, thus obtaining a relatively high specific capacity.

Figure 7:
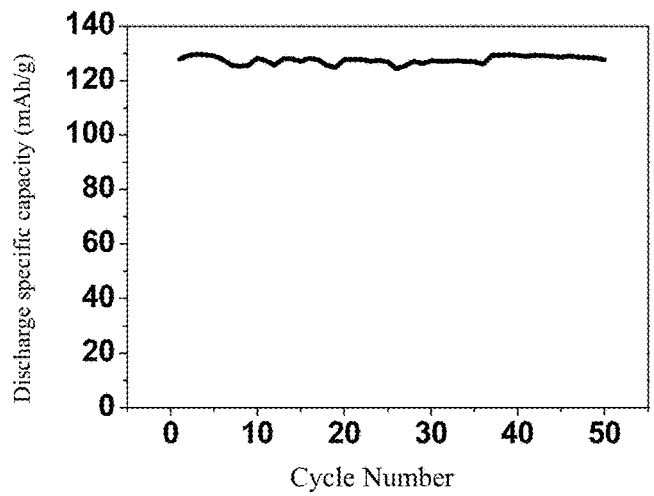
FIG. 7 is a graph showing the cycling performance of the lithium-ion battery assembled with the gel electrolyte obtained in Example 2-1 as the electrolyte.

FIG. 7 is a graph showing the cycling performance of the lithium-ion battery assembled with the gel electrolyte obtained in Example 2-1 as the electrolyte. As shown in the figure, the gel as the electrolyte for the lithium-ion battery exhibits a stable cycling performance, and the specific capacity remains basically unchanged.

Figure 8:
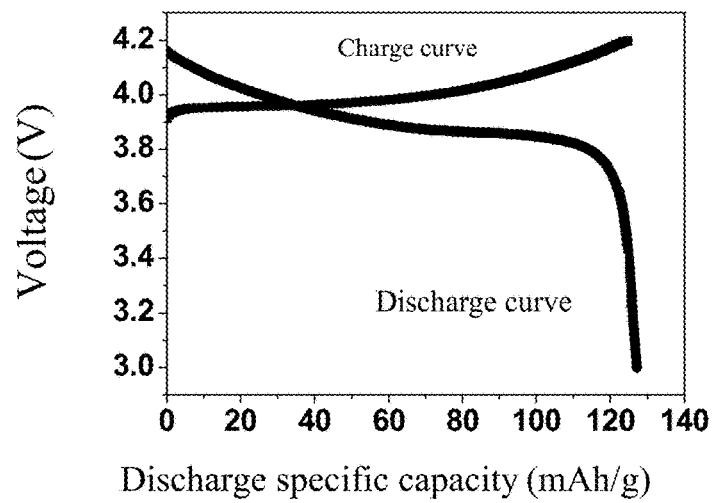
FIG. 8 is a graph showing the initial charge and discharge of the lithium-ion battery assembled with the solid electrolyte obtained in Example 2-4 as the electrolyte.

FIG. 8 is a graph showing the initial charge and discharge of the lithium-ion battery assembled with the solid electrolyte obtained in Example 2-4 as the electrolyte. As shown in the figure, when the solid electrolyte is used as the electrolyte for the lithium-ion battery, the lithium-ion battery can be normally charged and discharged, in which the active material is fully active, thus obtaining a relatively high specific capacity.

Figure 9:
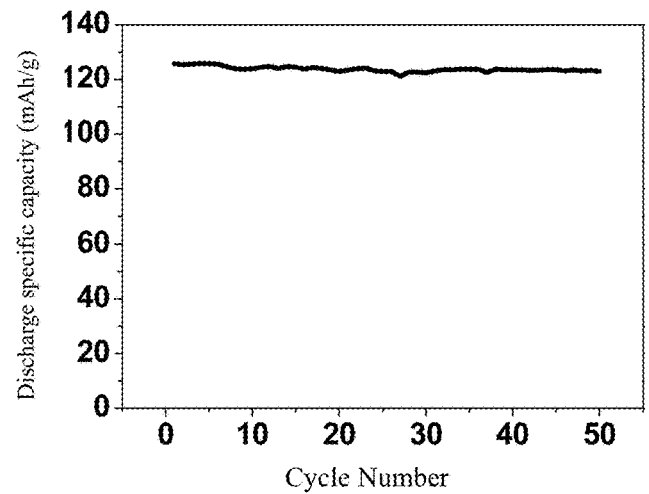
FIG. 9 is a graph showing the cycling performance of the lithium-ion battery assembled with the solid electrolyte obtained in Example 2-4 as the electrolyte.

FIG. 9 is a graph showing the cycling performance of the lithium-ion battery assembled with the solid electrolyte obtained in Example 2-4 as the electrolyte. As shown in the figure, the solid electrolyte as the electrolyte for the lithium-ion battery exhibits a stable cycling performance, and the specific capacity remains basically unchanged.

Figure 29:
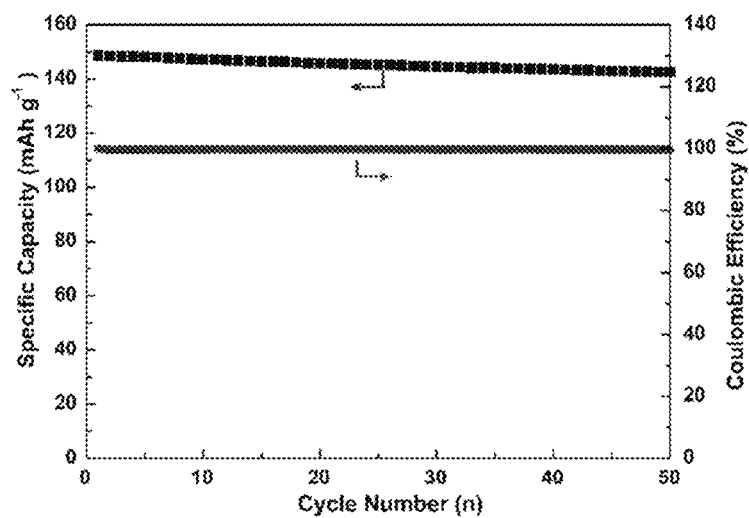
FIG. 29 a graph showing the cycling performance of the lithium iron phosphate battery assembled with the solid electrolyte obtained in Example 2-8 as the electrolyte.

FIG. 29 is a graph showing the cycling performance of the lithium iron phosphate battery assembled with the solid electrolyte obtained in Example 2-8 as the electrolyte. As shown in the figure, the initial discharge specific capacity of the solid electrolyte is 148.7 $mAh·g^{-1}$ at a high temperature of 60° C., and after 50 cycles, the discharge specific capacity is 142.9 $mAh·g^{-1}$, which show that it exhibits good performance under high temperature.

TABLE 2

Performance parameters of gel electrolytes and/or solid electrolytes and prepared batteries of Examples 2-1 to 2-8, Comparative Example 2-1

| Example | (a)/% | (b)/% | (c)/% | Formation state | Formation Temperature/°C | Formation time/h | Transition temperature/°C | Conductivity/ $S \cdot cm^{-1}$ | Battery performance/ $mAh \cdot g^{-1}$ Initial specific capacity | Battery performance/ $mAh \cdot g^{-1}$ Residual specific capacity after 50 cycles |
|---|---|---|---|---|---|---|---|---|---|---|
| 2-1 | 23 | 38 | 39 | gel electrolyte | room temperature | 5 | 75 | $5.71 \times 10^{-3}$ | 124 | 126 |
| 2-2 | 19 | 48 | 33 | gel electrolyte | room temperature | 7 | 65 | $1.02 \times 10^{-2}$ | 125 | 128 |
| 2-3 | 15 | 67 | 18 | solid electrolyte | room temperature | 12 | 105 | $2.44 \times 10^{-5}$ | 114 | 118 |
| 2-4 | 13 | 66 | 21 | solid electrolyte | room temperature | 8 | 95 | $7.23 \times 10^{-5}$ | 119 | 121 |
| 2-5 | 13.1 | 60.7 | 26.2 | solid electrolyte | room temperature | 18 | 70 | $4.12 \times 10^{-4}$ | 124 | 129 |
| 2-6 | 12 | 58 | 30 | gel electrolyte | room temperature | 15 | 72 | $6.21 \times 10^{-4}$ | 122 | 126 |
| 2-7 | 23 | 61 | 16 | solid electrolyte | room temperature | 20 | 116 | $1.12 \times 10^{-5}$ | 117 | 120 |
| 2-8 | 13 | 61 | 26 | solid electrolyte | room temperature | 14 | 78 | $3.15 \times 10^{-4}$ | 148.7 | 142.9 |
| C2-1 | 33 | 0 | 67 | — | room temperature | — | — | — | — | — |

Wherein, component (a) are lithium salts used in lithium-ion batteries; component (b) are cyclic ether compounds; component (c) are electrolytes or thrie solvents used in lithium-ion batteries; C2-1 is Comparative Example 2-1

Example 3-1

(1) Preparation of Gelable System and Gel (Used as a Gel Electrolyte for Batteries)

Weighing 0.8 g of solid lithium hexafluoroarsenate and 0.4 g of solid lithium bis(trifluoromethanesulfonyl)imide (LiTFSI) in a reagent bottle, adding 3.2 mL of ethylene glycol dimethyl ether (DME), dissolving lithium hexafluoroarsenate and lithium bis(trifluoromethanesulfonyl)imide completely after stirring well, adding 4.7 mL of 2-chloromethyl propylene oxide, and sufficiently mixing under magnetic stirring to obtain a gelable system; letting stand still for a while to form a gel. In the gel system, the mass fraction of the lithium salts is 13 wt %; the mass fraction of the cyclic ether compounds is 52 wt %; and the mass fraction of the electrolytes or their solvents used in lithium-sulfur batteries is 35 wt %. After testing, the performance parameters of the gel are listed in Table 3. When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 3-2

(1) Preparation of Gelable System and Gel (Used as a Gel Electrolyte for Batteries)

Weighing 1.0 g of solid lithium trifluoromethanesulfonate and 0.2 g of solid lithium perchlorate in a reagent bottle, adding 2.0 mL of a conventional electrolyte for lithium-sulfur batteries (1 M lithium bis(trifluoromethanesulfonyl) imide (LiTFSI), wherein the volume ratio of 1,4-dioxolane and ethylene glycol dimethyl ether is 1:1), dissolving lithium perchlorate and lithium trifluoromethanesulfonate completely under magnetic stirring, adding 4.0 mL of 1,4-epoxycyclohexane, and obtaining a gelable system after sufficiently mixing; letting stand still for a while to form a gel. In the gel system, the mass fraction of the lithium salts is 20 wt %; the mass fraction of the cyclic ether compounds is 56 wt %; and the mass fraction of the electrolytes or their solvents used in lithium-sulfur batteries is 24 wt %. After testing, the performance parameters of the gel are listed in Table 3. When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 3-3

(1) Preparation of Gelable System and Solid Electrolyte

Weighing 1.0 g of lithium fluorosulfonimide, 0.5 g of lithium hexafluorophosphate and 0.2 g of lithium chloride in a reagent bottle, adding 1 mL of tetraethylene glycol dimethyl ether containing 1 M lithium bis(trifluoromethanesulfonyl)imide (LiTFSI) and 2 mL of triethylene glycol dimethyl ether, dissolving the lithium salts completely under magnetic stirring, adding 8.0 mL of tetrahydrofuran, and obtaining a gelable system after sufficiently mixing; letting stand still for a while to form a solid electrolyte. In the solid electrolyte system, the mass fraction of the lithium salts is 15 wt %; the mass fraction of the cyclic ether compounds is 68 wt %; and the mass fraction of the electrolytes or their solvents used in lithium-sulfur batteries is 17 wt %. After testing, the performance parameters of the solid electrolyte are listed in Table 3. When the prepared solid electrolyte was heated above the transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the transition temperature of the solid electrolyte, the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 3-4

(1) Preparation of Gelable System and Solid Electrolyte

Weighing 0.75 g of lithium chloroaluminate and 0.1 g of lithium bis(fluorosulfonyl)imide in a reagent bottle, adding 1.2 mL of triethylene glycol dimethyl ether, dissolving lithium chloroaluminate and lithium bis(fluorosulfonyl)imide completely under magnetic stirring, adding 2.5 mL of tetrahydropyran and 1.2 mL of 1,4-dioxane, and obtaining a gelable system after sufficiently mixing; letting stand still for a while to form a solid electrolyte. In the solid electrolyte system, the mass fraction of the lithium salts is 15 wt %; the mass fraction of the cyclic ether compounds is 64 wt %; and the mass fraction of the electrolytes or their solvents used in lithium-sulfur batteries is 21 wt %.

After testing, the performance parameters of the solid electrolyte are listed in Table 3. When the prepared solid electrolyte was heated above the transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the transition temperature of the solid electrolyte, the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 3-5

(1) Preparation of Gelable System and Gel (Used as a Gel Electrolyte for Batteries)

Weighing 1.55 g of solid lithium tetrafluoroborate and 0.45 g of solid lithium bis(trifluoromethanesulfonyl)imide in a reagent bottle, adding 2.0 mL each of tetraethylene glycol dimethyl ether and ethylene glycol dimethyl ether, dissolving lithium tetrafluoroborate and lithium bis(trifluoromethanesulfonyl)imide completely under magnetic stirring, adding 6.0 mL of 3-methyltetrahydrofuran, and obtaining a gelable system after sufficiently mixing; letting stand still for a while to form a gel. In the gel system, the mass fraction of the lithium salts is 17 wt %; the mass fraction of the cyclic ether compounds is 50 wt %; and the mass fraction of the electrolytes or their solvents used in lithium-sulfur batteries is 33 wt %. After testing, the performance parameters of the gel are listed in Table 3. When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 3-6

(1) Preparation of Gelable System and Gel (Used as a Gel Electrolyte for Batteries)

Weighing 0.5 g of lithium bis(trifluoromethanesulfonyl)imide and 1.0 g of lithium tetrafluoroborate in a reagent bottle, adding 2.0 mL of a conventional electrolyte for lithium-sulfur batteries, dissolving the lithium salts completely under magnetic stirring, and obtaining a solution A. Weighing 4.0 g of trioxymethylene, adding 2.0 mL of ethylene glycol dimethyl ether, dissolving trioxymethylene completely under magnetic stirring, and obtaining a mixed solution B. Mixing the mixed solution A and B obtained above sufficiently, and obtaining a gelable system; letting stand still for a while to form a gel. In the gel system, the mass fraction of the lithium salts is 16 wt %; the mass fraction of the cyclic ether compounds is 42 wt %; and the mass fraction of the electrolytes or their solvents used in lithium-sulfur batteries is 42 wt %. After testing, the performance parameters of the gel are listed in Table 3. When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 3-7

(1) Preparation of Gelable System and Gel (Used as a Gel Electrolyte for Batteries)

Weighing 0.5 g of lithium bis(fluorosulfonyl)imide and 2.0 g of lithium tetrafluoroborate in a reagent bottle, adding 2.0 mL of a conventional electrolyte for lithium-sulfur batteries, dissolving the lithium salts completely under magnetic stirring, and obtaining a solution A. Weighing 8.5 g of 18-crown-6, adding 1.5 mL of ethylene glycol dimethyl ether and 3.5 mL of tetraethylene glycol dimethyl ether, and dissolving 18-crown-6 completely under magnetic stirring, and obtaining a mixed solution B. Mixing the mixed solution A and B obtained above sufficiently, and obtaining a gelable system; letting stand still for a while to form a gel. In the gel system, the mass fraction of the lithium salts is 14 wt %; the mass fraction of the cyclic ether compounds is 48 wt %; and the mass fraction of the electrolytes or their solvents used in lithium-sulfur batteries is 38 wt %. After testing, the performance parameters of the gel are listed in Table 3. When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 3-8

(1) Preparation of Gelable System and Gel (Used as a Gel Electrolyte for Batteries)

Weighing 1.22 g of solid lithium hexafluorophosphate and 0.78 g of solid lithium perchlorate in a reagent bottle, adding 3.0 mL each of anisole and ethylene glycol dimethyl ether, dissolving lithium hexafluorophosphate and lithium perchlorate completely under magnetic stirring, adding 4.0 mL of 3-methyltetrahydrofuran and 2 mL of 1,3-dioxolane, and obtaining a gelable system after sufficiently mixing; letting stand still for a while to form a gel. In the gel system, the mass fraction of the lithium salts is 14 wt %; the mass fraction of the cyclic ether compounds is 43 wt %; and the mass fraction of the electrolytes or their solvents used in lithium-sulfur batteries is 33 wt %. After testing, the performance parameters of the gel are listed in Table 3. When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 3). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Comparative Example 3-1

Weighing 2.0 g of solid lithium bis(trifluoromethanesulfonyl)imide (LiTFSI) in a reagent bottle, adding 3.0 mL of tetraethylene glycol dimethyl ether, stirring and dissolving the lithium salts completely under magnetic stirring, and letting stand still. In the above system, the mass fraction of the lithium salts is 40 wt %; the mass fraction of the cyclic ether compounds is 0 wt %; the mass fraction of the electrolytes or their solvents used in the lithium-sulfur batteries is 60 wt %.

It is found to form neither a gel nor a solid electrolyte after standing still for a long time, indicating that it is necessary to add cyclic ether compounds.

TABLE 3

Performance parameters of gel electrolytes or solid electrolytes and prepared batteries of Examples 3-1 to 3-8, Comparative example 3-1

| Example | (a)/% | (b)/% | (c)/% | Formation state | Formation Temperature/°C. | Formation time/h | Transition temperature/°C. | Conductivity/S·cm$^{-1}$ | Battery performance/mAh·g$^{-1}$ Initial specific capacity | Residual specific capacity after 50 cycles |
|---|---|---|---|---|---|---|---|---|---|---|
| 3-1 | 13 | 52 | 35 | gel electrolyte | room temperature | 12 | 55 | $9.06 \times 10^{-3}$ | 1424 | 745 |
| 3-2 | 20 | 56 | 24 | gel electrolyte | room temperature | 8 | 76 | $3.52 \times 10^{-5}$ | 1198 | 723 |
| 3-3 | 15 | 68 | 17 | solid electrolyte | room temperature | 5 | 106 | $1.21 \times 10^{-6}$ | 1102 | 707 |
| 3-4 | 15 | 64 | 21 | solid electrolyte | room temperature | 24 | 85 | $4.17 \times 10^{-6}$ | 1221 | 720 |
| 3-5 | 17 | 50 | 33 | gel electrolyte | room temperature | 6 | 72 | $5.02 \times 10^{-4}$ | 1312 | 733 |
| 3-6 | 16 | 42 | 42 | gel electrolyte | room temperature | 15 | 48 | $7.14 \times 10^{-3}$ | 1143 | 739 |
| 3-7 | 14 | 48 | 38 | gel electrolyte | room temperature | 10 | 78 | $8.23 \times 10^{-4}$ | 1281 | 734 |
| 3-8 | 14 | 43 | 43 | gel electrolyte | room temperature | 16 | 65 | $2.71 \times 10^{-3}$ | 1300 | 805 |
| Comparative Example 3-1 | 40 | — | 60 | — | — | — | — | — | — | — |

Wherein, (a) are lithium salts; (b) are cyclic ether compounds; (c) are electrolytes or their solvents used in lithium-sulfur batteries.

Figure 10:
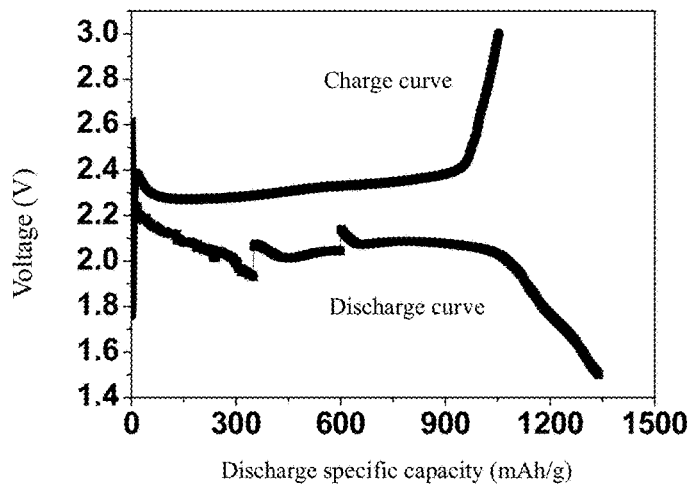
FIG. 10 is a graph showing the initial charge and discharge of the lithium-sulfur battery assembled with the gel electrolyte obtained in Example 3-1 as the electrolyte.

FIG. 10 is a graph showing the initial charge and discharge of the lithium-sulfur battery assembled with the gel electrolyte obtained in Example 3-1 as the electrolyte. As shown in the figure, when the gel electrolyte is used as the electrolyte for the lithium-sulfur battery, the active material in the battery can play a normal role, and the battery can be normally charged and discharged.

Figure 11:
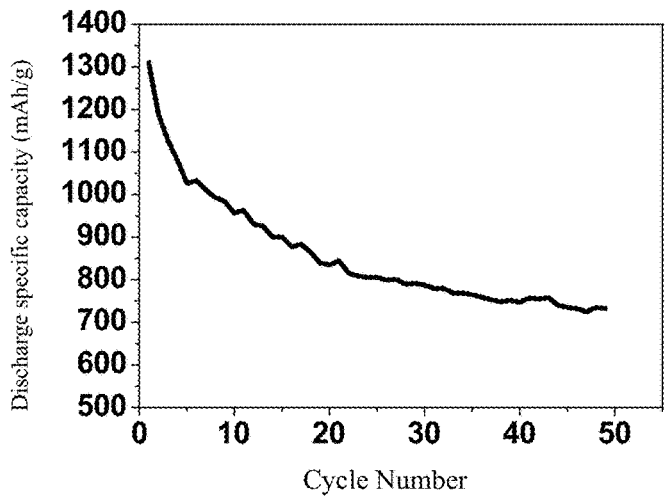
FIG. 11 is a graph showing the cycling performance of the lithium-sulfur battery assembled with the gel electrolyte obtained in Example 3-1 as the electrolyte.

FIG. 11 is a graph showing the cycling performance of the lithium-sulfur battery assembled with the gel electrolyte obtained in Example 3-1 as the electrolyte. As shown in the figure, when the gel electrolyte is used as the electrolyte for a lithium-sulfur battery, the lithium-sulfur battery can significantly alleviate the "shuttling effect", thereby increasing the utilization efficiency of the active material and further improving the cycling performance of the battery.

Figure 30:
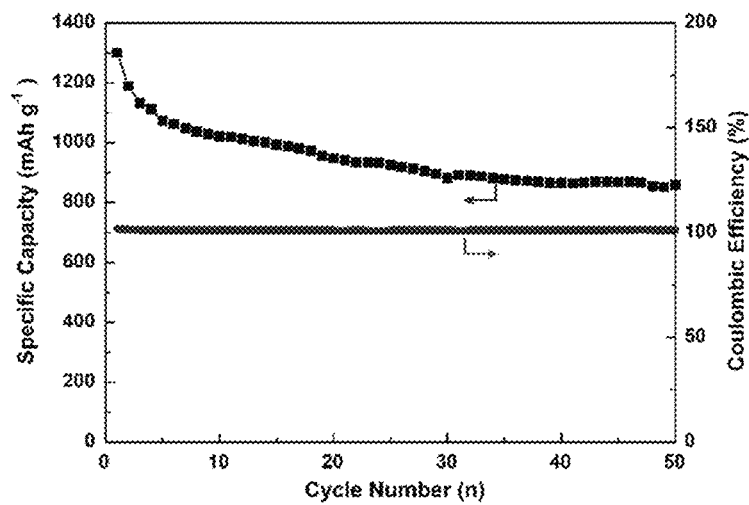
FIG. 30 a graph showing the cycling performance of the lithium-sulfur battery assembled with the gel electrolyte obtained in Example 3-8 as the electrolyte.

FIG. 30 is a graph showing the cycling performance of the lithium-sulfur battery assembled with the gel electrolyte obtained in Example 3-8 as the electrolyte. As shown in the figure, when the gel electrolyte is used as the electrolyte for a lithium-sulfur battery, it can obviously hinder polysulfide ion diffusion, increase the utilization efficiency of the active material, alleviate the capacity fading and improve the cycling stability of the battery.

Example 4-1

(1) Preparation of Gelable System and Gel (Used as a Gel Electrolyte for Batteries)

Weighing 0.06 g of silica in a reagent bottle, adding 2.6 mL of tetrahydrofuran, sufficiently and uniformly mixing under magnetic stirring, and obtaining a mixed solution A. Weighing another 0.8 g of lithium tetrafluoroborate in a reagent bottle, adding 2.6 mL of dimethyl carbonate, stirring until the lithium salts are completely dissolved, and obtaining a mixed solution B. Mixing the solution A and B obtained above sufficiently to obtain a mixed solution, and obtaining a gelable system; letting stand still for a while to form a gel. In the gel system, the mass fraction of the lithium salts is 13 wt %; the mass fraction of the cyclic ether compounds is 43 wt %; the mass fraction of the inorganic nanoparticles is 1 wt %; and the mass fraction of the other solvents and/or electrolytes is 43 wt %. After testing, the formation time of the gel is 20 hours, the formation temperature of the gel is room temperature, the transition temperature of the gel is 55° C., and the conductivity of the gel is $1.78 \times 10^{-4}$ S/cm.

When the prepared gel was heated above the transition temperature of the gel, the gel began to become viscous. When the reagent bottle was inverted, the downward flow of the gel was observed, indicating that the temperature reached the transition temperature of the gel, and when the temperature dropped below the transition temperature of the gel, the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 5). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Examples 4-2 to 4-7 and Comparative Example 4-1

(1) Preparation of Gelable System and Gel (Used as a Gel Electrolyte for Batteries)

The preparation method of the gel was the same as in Example 4-1, except that the selection and amount of each component in the gel system were different; the specific components and amounts are listed in Table 4.

(2) Preparation of Batteries

The gel prepared above used as a gel electrolyte was applied to coin cell batteries, and the electrochemical performance of the coin cell batteries was tested using the LAND batteries test system (the test results are shown in Table 5). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 4-8

(1) Preparation of Gelable System and Solid Electrolyte

Weighing 0.06 g of alumina in a reagent bottle, adding 4.5 mL of 1,3-dioxolane, sufficiently and uniformly mixing under magnetic stirring, and obtaining a mixed solution A. Weighing another 0.4 g of lithium fluorosulfonimide and 0.6 g of lithium perchlorate in a reagent bottle, adding 1.2 mL of a conventional electrolyte for lithium-sulfur batteries, stirring until the lithium salts are completely dissolved, and obtaining a mixed solution B. Mixing the solution A and B obtained above sufficiently to obtain a mixed solution, and obtaining a gelable system; letting stand still for a while to form a solid electrolyte.

In the gel system, the mass fraction of the lithium salts is 15 wt %; the mass fraction of the cyclic ether compounds is 66.3 wt %; the mass fraction of the inorganic nanoparticles is 0.7 wt %; and the mass fraction of the other solvents and/or electrolytes is 18 wt %. After testing, the formation time of the solid electrolyte is 12 hours, the formation temperature of the solid electrolyte is room temperature, the transition temperature of the solid electrolyte is 96° C., and the conductivity of the solid electrolyte is $2.38 \times 10^{-5}$ S/cm.

When the prepared solid electrolyte was heated above the gel transition temperature of the solid electrolyte, the solid electrolyte began to become viscous. When the reagent bottle was inverted, the downward flow of the solid electrolyte was observed, indicating that the temperature reached the transition temperature of the solid electrolyte, and when the temperature dropped below the gel transition temperature of the solid electrolyte, the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 6). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Examples 4-9 to 4-14 and Comparative Example 4-2

(1) Preparation of Gelable System and Solid Electrolyte

The preparation method of the solid electrolyte was the same as in Example 4-8, except that the selection and amount of each component in the solid electrolyte system were different; the specific components and amounts are listed in Table 4.

(2) Preparation of Batteries

The solid electrolyte prepared above was applied to coin cell batteries, and the electrochemical performance of the coin cell batteries was tested using the LAND batteries test system (the test results are shown in Table 6). Wherein, the method for preparing the coin cell batteries was: placing a separator between the positive and negative electrodes, filling the gelable system prepared in step (1) in the space between the three parts, packing and compacting, assembling into CR-2032 coin cell batteries, and letting stand still until the gelable system become the solid electrolyte.

TABLE 4

Composition and content of each component of gel electrolytes or solid electrolytes in Examples 4-1 to 4-14 and Comparative Examples 4-1 to 4-2

| Example | Lithium salt Component | Content % | Cyclic ether compound Component | Content % | Inorganic nanoparticle Component | Content % | other solvent and/or electrolyte Component | Content % |
|---|---|---|---|---|---|---|---|---|
| 4-1 | lithium tetrafluoroborate | 13 | tetrahydrofuran | 43 | silica | 1 | dimethyl carbonate | 43 |
| 4-2 | lithium tetrafluoroborate | 13 | tetrahydrofuran | 52 | silica | 1 | ethyl methyl carbonate | 34 |
| 4-3 | lithium hexafluoroarsenate | 19 | tetrahydrofuran | 40 | silica | 1 | dimethyl carbonate/ethylene carbonate | 40 |
| 4-4 | lithium perchlorate | 14 | tetrahydrofuran | 58 | silica | 1 | ethylene glycol dimethyl ether | 27 |
| 4-5 | lithium trifluoromethanesulfonate/ lithium bis(fluorosulfonyl)imide | 15 | tetrahydrofuran | 32 | zinc oxide | 5 | triethylene glycol dimethyl ether/1,1', 2,2'-tetrafluoroethyl-2,2',3,3'-tetrafluoropropylene ether | 48 |
| 4-6 | lithium hexafluoroarsenate | 16 | 1,4-epoxycyclohexane/1,3-dioxolane | 25 | nano calcium carbonate | 0.5 | propylene carbonate | 58.5 |
| 4-7 | lithium hexafluorophosphate/ lithium chloride | 32 | 1,4-epoxycyclohexane/1,3-dioxolane | 58 | nano calcium carbonate | 10 | — | — |

TABLE 4-continued

Composition and content of each component of gel electrolytes or solid electrolytes in Examples 4-1 to 4-14 and Comparative Examples 4-1 to 4-2

| Example | Lithium salt Component | Content % | Cyclic ether compound Component | Content % | Inorganic nanoparticle Component | Content % | other solvent and/or electrolyte Component | Content % |
|---|---|---|---|---|---|---|---|---|
| 4-8 | lithium trifluoro-methane-sulfonate/lithium fluorosulfonimide | 16 | 1,3-dioxolane | 83 | titanium dioxide | 1 | conventional electrolyte for lithium-sulfur batteries | — |
| 4-9 | lithium fluorosulfon-imide/lithium perchlorate | 25 | 1,4-dioxane | 74 | alumina | 1 | — | — |
| 4-10 | lithium perchlorate/lithium bis(trifluoro-methane-sulfonyl) imide | 16 | 3-methyltetra-hydrofuran | 67 | alumina | 1 | conventional electrolyte for lithium-sulfur batteries | 16 |
| 4-11 | lithium fluorosulfon-imide/lithium perchlorate | 19 | 3-methyltetra-hydrofuran/1,3-dioxolane | 61.5 | ferric oxide/alumina | 0.5 | conventional electrolyte for lithium-ion batteries | 19 |
| 4-12 | lithium trifluoro-methane-sulfonate/lithium chloroaluminate | 13 | 1,3-dioxolane/1,4-dioxane | 77 | cerium oxide/titanium dioxide | 0.5 | conventional electrolyte for lithium-ion batteries | 9.5 |
| 4-13 | lithium perchlorate/lithium perfluorobutane-sulfonate | 13 | tetrahydrofuran | 63 | Montmorillonite | 1 | tetraethylene glycol dimethyl ether | 23 |
| 4-14 | lithium perchlorate/lithium chloride | 13 | trioxymethylene | 62 | nano barium sulfate | 3 | tetraethylene glycol dimethyl ether/ethylene glycol dimethyl ether | 22 |
| C4-1 | lithium fluorosulfonimide/lithium hexafluorophosphate | 16 | 1,4-epoxycyclohexane/1,3-dioxolane | 25 | nano calcium carbonate | — | propylene carbonate | 59 |
| C4-2 | lithium trifluoromethanesulfonate | 16 | 1,3-dioxolane | 67 | titanium dioxide | — | conventional electrolyte for lithium-ion batteries | 17 |

Wherein, the conventional electrolyte for lithium-sulfur batteries was selected from a mixed solution of 1,3-dioxolane (DOL) and ethylene glycol dimethyl ether (DME) containing 1M lithium bis(trifluoromethanesulfonyl)imide (LiTFSI), wherein the volume ratio of 1,3-dioxolane (DOL) and ethylene glycol dimethyl ether (DME) was 1:1; the conventional electrolyte used in lithium-ion batteries was selected from a mixed solution of ethylene carbonate (EC) and dimethyl carbonate (DMC) containing 1M lithium hexafluorophosphate (LiPF$_6$), wherein the volume ratio of ethylene carbonate (EC) to dimethyl carbonate (DMC) was 1:1; C4-1 is Comparative example 4-1; C4-2 is Comparative example 4-2.

TABLE 5

Performance parameters of gels and prepared batteries in Examples 4-1 to 4-7 and Comparative Example 4-1

| Example | Formation temperature/ °C. | Formation time/h | Transition temperature/°C. | Conductivity/ S·cm$^{-1}$ | Application | Battery performance/ mAh·g$^{-1}$ Initial specific capacity | Residual specific capacity after 50 cycles |
|---|---|---|---|---|---|---|---|
| 4-1 | room temperature | 20 | 65 | $1.02 \times 10^{-2}$ | lithium-ion battery | 132 | 135 |
| 4-2 | room temperature | 12 | 78 | $6.26 \times 10^{-3}$ | lithium-ion battery | 130 | 131 |
| 4-3 | room temperature | 6 | 82 | $4.21 \times 10^{-4}$ | lithium-ion battery | 125 | 127 |
| 4-4 | room temperature | 8 | 68 | $3.72 \times 10^{-4}$ | lithium-sulfur battery | 1392 | 754 |
| 4-5 | room temperature | 36 | 45 | $1.76 \times 10^{-2}$ | lithium-sulfur battery | 1538 | 768 |

TABLE 5-continued

Performance parameters of gels and prepared batteries in Examples 4-1 to 4-7 and Comparative Example 4-1

| Example | Formation temperature/ °C. | Formation time/h | Transition temperature/°C. | Conductivity/ $S \cdot cm^{-1}$ | Application | Initial specific capacity | Residual specific capacity after 50 cycles |
|---|---|---|---|---|---|---|---|
| 4-6 | room temperature | 12 | 75 | $2.26 \times 10^{-4}$ | lithium-ion battery | 128 | 129 |
| 4-7 | room temperature | 7 | 105 | $2.11 \times 10^{-5}$ | lithium-ion battery | 117 | 122 |
| Comparative Example 4-1 | room temperature | 10 | 90 | $8.56 \times 10^{-5}$ | lithium-ion battery | 122 | 126 |

TABLE 6

Performance parameters of solid electrolytes and prepared batteries in Examples 4-8 to 4-14 and Comparative Example 4-2

| Example | Formation temperature/°C. | Formation time/h | Transition temperature/°C. | Conductivity/ $S \cdot cm^{-1}$ | Application | Initial specific capacity | Residual specific capacity after 50 cycles |
|---|---|---|---|---|---|---|---|
| 4-8 | room temperature | 12 | 96 | $2.38 \times 10^{-5}$ | lithium-sulfur battery | 1241 | 742 |
| 4-9 | room temperature | 18 | 90 | $4.17 \times 10^{-5}$ | lithium-ion battery | 132 | 133 |
| 4-10 | room temperature | 20 | 72 | $1.93 \times 10^{-4}$ | lithium-sulfur battery | 1145 | 756 |
| 4-11 | room temperature | 8 | 115 | $1.25 \times 10^{-5}$ | lithium-ion battery | 125 | 125 |
| 4-12 | room temperature | 14 | 130 | $4.03 \times 10^{-6}$ | lithium-ion battery | 118 | 119 |
| 4-13 | room temperature | 10 | 145 | $1.66 \times 10^{-6}$ | lithium-sulfur battery | 1065 | 742 |
| 4-14 | room temperature | 11 | 102 | $3.48 \times 10^{-5}$ | lithium-sulfur battery | 1162 | 749 |
| Comparative Example 4-2 | room temperature | 7 | 81 | $2.17 \times 10^{-4}$ | lithium-sulfur battery | 1232 | 752 |

Figure 12:
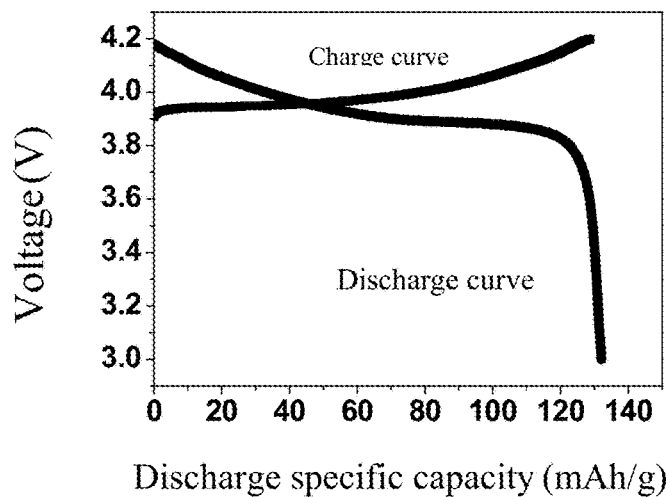
FIG. 12 is a graph showing the initial charge and discharge of the lithium-ion battery assembled with the gel electrolyte obtained in Example 4-1 as the electrolyte.

FIG. 12 is a graph showing the initial charge and discharge of the lithium-ion battery assembled with the gel electrolyte obtained in Example 4-1 as the electrolyte. As shown in the figure, when the gel electrolyte was used as the electrolyte for the lithium-ion battery, the lithium-ion battery could be normally charged and discharged, in which the active material was fully active, thus obtaining a relatively high specific capacity.

Figure 13:
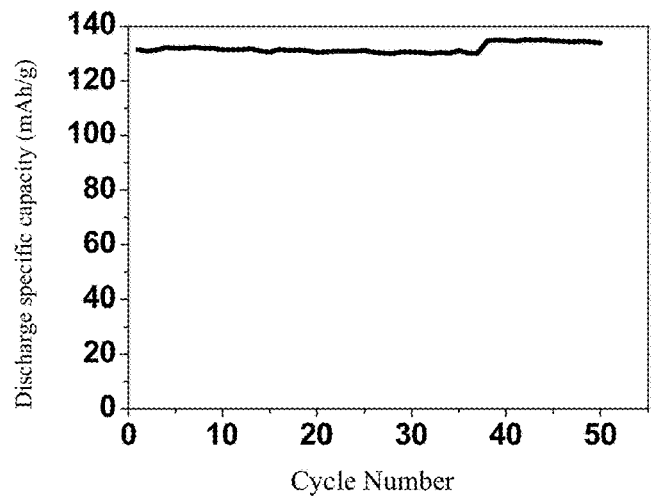
FIG. 13 is a graph showing the cycling performance of the lithium-ion battery assembled with the gel electrolyte obtained in Example 4-1 as the electrolyte.

FIG. 13 is a graph showing the cycling performance of the lithium-ion battery assembled with the gel electrolyte obtained in Example 4-1 as the electrolyte. As shown in the figure, the gel as the electrolyte for a lithium-ion battery exhibited a stable cycling performance, and the specific capacity remained basically unchanged.

Figure 14:
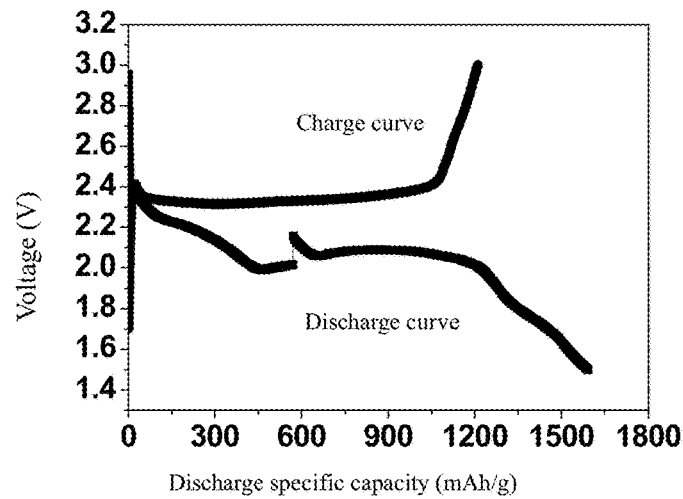
FIG. 14 is a graph showing the initial charge and discharge of the lithium-sulfur battery assembled with the gel electrolyte obtained in Example 4-5 as the electrolyte.

FIG. 14 is a graph showing the initial charge and discharge of the lithium-sulfur battery assembled with the gel electrolyte obtained in Example 4-5 as the electrolyte. As shown in the figure, when the gel electrolyte was used as the electrolyte for the lithium-sulfur battery, the lithium-sulfur battery could be normally charged and discharged, in which the active material was fully active, thus obtaining a relatively high specific capacity.

Figure 15:
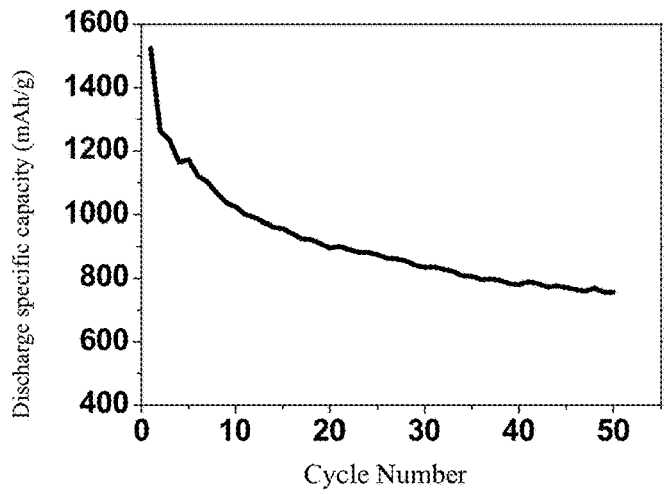
FIG. 15 is a graph showing the cycling performance of the lithium-sulfur battery assembled with the gel electrolyte obtained in Example 4-5 as the electrolyte.

FIG. 15 is a graph showing the cycling performance of the lithium-sulfur battery assembled with the gel electrolyte obtained in Example 4-5 as the electrolyte. As shown in the figure, when the gel electrolyte was used as the electrolyte for a lithium-sulfur battery, the lithium-sulfur battery could effectively alleviate the "shuttling effect", thereby increasing the utilization efficiency of the active material, improving the cycling performance of the battery, and exhibiting excellent cycling performance.

Compared with Comparative Examples 4-1 and 4-2, the addition of inorganic nanoparticles could effectively increase the electrical conductivity of the gel or solid electrolyte, which exhibits superior electrochemical performance.

Example 5-1

(1) Synthesis of Polyester

Weighing 8.0 g of butenedioic acid, 12.0 g of succinic acid and 60.0 g of polyethylene glycol-200 in a three-necked flask, heating in an oil bath until the temperature reached 140° C., keeping at the constant temperature for 0.5 hour, raising the temperature by 20° C. every half hour until 220° C. was reached, keeping at the constant temperature for 2 hours, then adding a catalyst (0.16 g tetrabutyl titanate and 0.16 g inhibitor p-hydroxyphenol), reacting for 1 h, then reacting for 2 h under reduced pressure, stopping heating, cooling down to obtain a crude product, adding 50.0 mL of dichloromethane, refluxing under stirring and dissolving at 50° C. for 18 hours, precipitating in petroleum ether, and drying in a vacuum oven at 50° C. for 24 hours to obtain polyester A which was stored in a glove box.

(2) Preparation of Gelable System and Gel (Used as a Gel Electrolyte for Batteries)

Weighing 1.9 mL of 3-methyltetrahydrofuran and 1.0 g of polyester A, stirring and mix to be a uniformly mixed solution, then adding 0.4 g of lithium perchlorate, stirring for 0.5 hour to dissolve lithium perchlorate in the above liquid completely, and obtain a gelable system; continually stirring for 2 hours, and then letting stand still for 14 hours to obtain a gel. In the gel system, the mass fraction of the lithium salts is 12 wt %; the mass fraction of the cyclic ether compounds is 58 wt %; and the mass fraction of the polyester additives is 30 wt %.

After testing, the performance parameters of the gel are shown in Table 8. It can be seen from Table 8 that the formation time of the gel prepared by Examples 5-1 is 10 hours, the transition temperature of the gel is 60° C., and the conductivity of the gel is $2.1 \times 10^{-3}$ S/cm.

When the prepared gel was heated above 60° C., the gel began to become viscous. When the reagent bottle was inverted, the downward flow of the gel was observed, indicating that the temperature reached the transition temperature of the gel, and when the temperature dropped below 60° C., the gel was formed again, indicating that the prepared gel had good reversibility.

(3) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the gel electrolyte.

Example 5-2

(1) Synthesis of Polyester

Weighing 10.0 g of malonic acid, 10.0 g of succinic acid, 10.0 g of 1,2-propanediol, 25.0 g of polyethylene glycol-200 in a three-necked flask, heating in an oil bath until the temperature reached 110° C., keeping at the constant temperature for 1 hour, raising the temperature by 25° C. every half hour until 240° C. was reached, keeping at the constant temperature for 3 hours, then add 0.16 g of a catalyst (tetrabutyl titanate), reacting for 1 h, stopping heating, cooling down to obtain a related product, then adding 50.0 mL of dichloromethane, refluxing under stirring and dissolving at room temperature for 12 hours, precipitating in petroleum ether, and drying in a vacuum oven at 60° C. for 12 hours to obtain polyester B which was stored in a glove box.

(2) Preparation of Gelable System and Gel (Used as a Gel Electrolyte)

Weighing 0.96 mL of polyester B, 2.2 mL of 1,4-epoxycyclohexane, adding 0.53 mL of a conventional electrolyte for lithium-ion batteries, stirring under magnetic stirring to mix the three ones and obtain a clear and transparent solution, then adding 0.7 g of lithium tetrafluoroborate, stirring for 2 hours to dissolve lithium tetrafluoroborate in the above mixed solution completely, and obtain a gelable system; continually stir for 2 hours, and then letting stand still for 9 hours to obtain a colorless gel.

In the gel system, the mass fraction of the lithium salts is 16 wt %; the mass fraction of the cyclic ether compounds is 50 wt %; the mass fraction of the other solvents and/or electrolytes is 12 wt %; and the mass fraction of the polyester additives is 22 wt %.

After testing, the performance parameters of the gel are shown in Table 8. It can be seen from Table 8 that the formation time of the gel prepared by Examples 5-2 is 9 hours, the transition temperature of the gel is 58° C., and the conductivity of the gel is $1.3 \times 10^{-2}$ S/cm.

When the prepared gel was heated above 58° C., the gel began to become viscous. When the reagent bottle was inverted, the downward flow of the gel was observed, indicating that the temperature reached the transition temperature of the gel, and when the temperature dropped below 58° C., the gel was formed again, indicating that the prepared gel had good reversibility.

(3) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the gel.

Example 5-3

(1) Synthesis of Polyester

Weighing 20.0 g of malonic acid, 20.0 g of succinic acid, 94.0 g of polyethylene glycol-400 in a three-necked flask, heating in an oil bath until the temperature reached 120° C., keeping at the constant temperature for 0.5 hour, raising the temperature by 30° C. every 25 min until 210° C. was reached, keeping at the constant temperature for 3 hours, then adding 0.32 g of a catalyst (tetrabutyl titanate), reacting for 0.5 hour, then vacuumizing for 2 hours, stopping heating, and cooling down to obtain a related product, then adding 40.0 mL of trichloromethane, refluxing and heating at 45° C. for 6 hours, adding dropwise to methanol and precipitating, and drying in a vacuum oven at 60° C. for 12 hours to obtain polyester C which was stored in a glove box.

(2) Preparation of Gelable System and Gel (Used as a Gel Electrolyte)

Weighing 0.83 mL of polyester C, 1.8 mL of 1,4-epoxycyclohexane, 0.07 g of silica, 0.44 mL of a conventional electrolyte for lithium batteries, stirring to mix the four ones and obtain a clear and transparent solution, then adding 0.87 g of lithium hexafluorophosphate, stirring for 2 hours to dissolve lithium hexafluorophosphate in the above mixed solution completely, and obtain a gelable system; continually stirring for 2 hours, and then letting stand still for 8 hours to obtain a colorless gel. In the gel system, the mass fraction of the lithium salts is 22 wt %; the mass fraction of the cyclic ether compounds is 45 wt %; the mass fraction of the polyester additives is 21 wt %; the mass fraction of the other solvents and/or electrolytes is 11 wt %; and the mass fraction of silica is 1 wt %.

After testing, the performance parameters of the gel are shown in Table 8. It can be seen from Table 8 that the formation time of the gel prepared by Examples 5-3 is 8 hours, the transition temperature of the gel is 60° C., and the conductivity of the gel is $8.8 \times 10^{-3}$ S/cm.

When the prepared gel was heated above 60° C., the gel began to become viscous. When the reagent bottle was inverted, the downward flow of the gel was observed, indicating that the temperature reached the transition temperature of the gel, and when the temperature dropped below 60° C., the gel was formed again, indicating that the prepared gel had good reversibility.

(3) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the gel electrolyte.

Example 5-4

(1) Synthesis of Polyester

Weighing 15.0 g of glutaric acid, 10.0 g of butenedioic acid, 20.0 g of polyethylene glycol-400, 10.0 g of 1,4-butanediol in a three-necked flask, heating in an oil bath until the temperature reached 140° C., keeping at the constant temperature for 1.5 hours, raise the temperature by 20° C. every 20 min until 220° C. was reached, keeping at the constant temperature for 2 hours, then adding a catalyst (0.2 g tetrabutyl titanate and 0.2 g inhibitor p-hydroxyphenol), reacting for 50 min, then vacuumizing for 1 hour, and cooling down to obtain a crude product, then adding 50.0 mL of threechloromethane, stirring at room temperature for 24 hours, precipitating in ethanol, and drying in a vacuum oven at 60° C. for 24 hours to obtain polyester D which was stored in a glove box.

(2) Preparation of Gelable System and Solid Electrolyte

Weighing 1.0 mL of polyester D, 4.67 mL of tetrahydrofuran, stirring to mix the two ones and obtain a clear and transparent solution, then adding 1.0 g of lithium fluorosulfonimide after homogeneously mixing, stirring for 1 hour to dissolve lithium fluorosulfonimide in the above mixed solution completely, and obtain a gelable system; continually stirring for 2 hours, and then letting stand still for 10 hours to obtain a solid electrolyte. In the solid electrolyte system, the mass fraction of the lithium salts is 15 wt %; the mass fraction of the cyclic ether compounds is 70 wt %; and the mass fraction of the polyester additives is 15 wt %.

After testing, the performance parameters of the solid electrolyte are shown in Table 8. It can be seen from Table 8 that the formation time of the solid electrolyte prepared by Examples 5-4 is 10 hours, the transition temperature of the solid electrolyte is 85° C., and the conductivity of the solid electrolyte is $2.5 \times 10^{-4}$ S/cm. When the prepared solid electrolyte was heated above 85° C., the solid electrolyte began to become viscous. When the reagent bottle was inverted, the downward flow of the solid electrolyte was observed, indicating that the temperature reached the transition temperature of the solid electrolyte, and when the temperature dropped below 85° C., the solid electrolyte was formed again, indicating that the prepared solid electrolyte had good reversibility.

(3) Preparation of Batteries

The solid electrolyte prepared above was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the solid electrolyte.

Example 5-5

(1) Synthesis of Polyester

Weighing 20.0 g of adipic acid, 40.0 g of polyethylene glycol-600 in a three-necked flask, heating in an oil bath until the temperature reached 150° C., keeping at the constant temperature for 1 hour, raising the temperature by 15° C. every 20 min until 210° C. was reached, keeping at the constant temperature for 2 hours, then adding 0.16 g of a catalyst (tetrabutyl titanate), reacting for 30 min, then vacuumizing for 3 hours, and cooling down to obtain a crude product, then adding 40.0 mL of threechloromethane, stirring at 50° C. for 15 hours, precipitating in ethanol, and drying in a vacuum oven at 50° C. for 24 hours to obtain polyester E which was stored in a glove box.

(2) Preparation of Gelable System and Gel (Used as a Gel Electrolyte)

Weighing 0.42 mL of polyester E, 0.86 mL of tetrahydropyran, 0.22 mL of a conventional electrolyte for lithium-ion batteries, stirring to mix the three ones and obtain a clear and transparent solution, then adding 0.3 g of lithium hexafluorophosphate and 0.2 g of lithium bis(trifluoromethanesulfonyl)imide after homogeneously mixing, stirring for 1 hour to dissolve lithium hexafluorophosphate and lithium bis(trifluoromethanesulfonyl)imide in the above mixed solution completely, and obtain a gelable system; continually stirring for 2 hours, and then letting stand still for 9 hours to obtain a colorless gel, which was inverted and did not flow. In the gel system, the mass fraction of the lithium salts is 25 wt %; the mass fraction of the cyclic ether compounds is 43 wt %; the mass fraction of the other solvents and/or electrolytes is 11 wt %; the mass fraction of the polyester additives is 21 wt %.

After testing, the performance parameters of the gel are shown in Table 8. It can be seen from Table 8 that the formation time of the gel prepared by Examples 5-5 is 9 hours, the transition temperature of the gel is 56° C., and the conductivity of the gel is $3.3 \times 10^{-2}$ S/cm.

When the prepared gel was heated above 56° C., the gel began to become viscous. When the reagent bottle was inverted, the downward flow of the gel was observed, indicating that the temperature reached the transition temperature of the gel, and when the temperature dropped below 56° C., the gel was formed again, indicating that the prepared gel had good reversibility.

(3) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the gel electrolyte.

Example 5-6

(1) Synthesis of Polyester

Weighing 15.0 g of azelaic acid, 15.0 g of butenedioic acid, 30.0 g of polyethylene glycol-200 in a three-necked flask, heating in an oil bath until the temperature reached 150° C. in a nitrogen atmosphere, keeping at the constant temperature for 0.5 hour, raising the temperature by 15° C. every 15 min until 225° C. was reached, keeping at the constant temperature for 1 hour, then adding a catalyst (0.24 g tetrabutyl titanate and 0.24 g inhibitor p-hydroxyphenol), reacting for 1 hour, reducing pressure for 2 hour, and cooling down to obtain a crude product, then adding 40.0 mL of dichloromethane, stirring at 45° C. for 10 hours, precipitating in methanol, and drying in a vacuum oven at 44° C. for 24 hours to obtain polyester F which was stored in a glove box.

(2) Preparation of Gelable System and Gel (Used as a Gel Electrolyte)

Weighing 1.7 mL of polyester F, 0.8 g of trioxymethylene and 3.0 mL of 1,3-dioxolane, 1.1 mL of a conventional electrolyte for lithium batteries, 0.24 g of silica, stirring to mix the four ones and obtain a homogeneous solution, then adding 1.3 g of lithium hexafluorophosphate, stirring for 2 hours to dissolve lithium hexafluorophosphate in the above mixed solution completely, and obtain a gelable system; continually stirring for 2 hours, and then letting stand still for 6 hours to obtain a colorless gel, which was inverted and did not flow.

In the gel system, the mass fraction of the lithium salts is 16 wt %; the mass fraction of the cyclic ether compounds is 47 wt %; the mass fraction of the polyester additives is 21 wt %; the mass fraction of the other solvents and/or electrolytes is 13 wt %; the mass fraction of the inorganic nanoparticle is 3 wt %.

After testing, the performance parameters of the gel are shown in Table 8. It can be seen from Table 8 that the formation time of the gel prepared by Examples 5-6 is 10 hours, the transition temperature of the gel is 56° C., and the conductivity of the gel is $9.9 \times 10^{-3}$ S/cm.

When the prepared gel was heated above 56° C., the gel began to become viscous. When the reagent bottle was inverted, the downward flow of the gel was observed, indicating that the temperature reached the transition temperature of the gel, and when the temperature dropped below 56° C., the gel was formed again, indicating that the prepared gel had good reversibility.

(3) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the gel electrolyte.

Example 5-7

(1) Synthesis of Polyester

Weighing 30.0 g of azelaic acid, 15.0 g of 1,3-propanediol, 30.0 g of polyethylene glycol-200 in a three-necked flask, heating in an oil bath until the temperature reached 130° C. in a nitrogen atmosphere, keeping at the constant temperature for 0.5 hour, raising the temperature by 20° C. every 25 min until 210° C. was reached, keeping at the constant temperature for 1 hour, then adding 0.24 g of a catalyst (tetrabutyl titanate), reacting for 0.5 hour, then reacting for 1 hour under reduced pressure, and cooling down to obtain a crude product, then adding 50.0 mL of threechloromathane, stirring at 50° C. for 12 hours, precipitating in ethanol, and drying in a vacuum oven at 55° C. for 24 hours to obtain polyester G which was stored in a glove box.

(2) Preparation of Gelable System and Gel (Used as a Gel Electrolyte)

Weighing 4.6 mL of tetrahydropyran in a reagent bottle, adding 2.2 mL polyester G, homogeneously mixing under magnetic stirring, then adding 1.2 g of solid lithium perfluorobutanesulfonate in the above mixed solution, and obtaining a gelable system; continually stirring for 2 hours, and then letting stand still for 9 hours to form a gel.

In the gel system, the mass fraction of the lithium salts is 15 wt %; the mass fraction of the cyclic ether compounds is 58 wt %; the mass fraction of the polyester additives is 27 wt %.

After testing, the performance parameters of the gel are shown in Table 8. It can be seen from Table 8 that the formation time of the gel prepared by Examples 5-7 is 9 hours, the transition temperature of the gel is 66° C., and the conductivity of the gel is $6.7 \times 10^{-3}$ S/cm.

When the prepared gel was heated above 66° C., the gel began to become viscous. When the reagent bottle was inverted, the downward flow of the gel was observed, indicating that the temperature reached the transition temperature of the gel, and when the temperature dropped below 66° C., the gel was formed again, indicating that the prepared gel had good reversibility.

(3) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the gel electrolyte.

Example 5-8

(1) Synthesis of Polyester

Weighing 20.0 g of succinic acid, 15.0 g of glutaric acid, 20.0 g of polyethylene glycol-200, 15.0 g of 1,4-butanediol in a three-necked flask, heating in an oil bath until the temperature reached 145° C. in a nitrogen atmosphere, keeping at the constant temperature for 1 hour, raising the temperature by 20° C. every 25 min until 210° C. was reached, then adding 0.28 g of a catalyst (tetrabutyl titanate), reacting for 0.5 hour, then reacting for 1 hour under reduced pressure, and cooling down to obtain a crude product, then adding 50.0 mL of threechloromathane, stirring at 50° C. for 12 hours, precipitating in methanol, and drying in a vacuum oven at 55° C. for 24 hours to obtain polyester H which was stored in a glove box.

(2) Preparation of Gelable System and Solid Electrolyte

Weighing 0.9 mL of polyester H in a reagent bottle, adding 7.0 mL of tetrahydrofuran and 0.6 mL of a conventional electrolyte for lithium-sulfur batteries, uniformly mixing under stirring, then adding 1.5 g of solid lithium perfluorobutanesulfonate in the above mixed solution, and obtaining a gelable system; continually magnetically stirring for 2 hours, and letting stand still for 9 hours to form a solid electrolyte.

In the solid electrolyte system, the mass fraction of the lithium salts is 15 wt %; the mass fraction of the cyclic ether compounds is 70 wt %; and the mass fraction of the polyester additives is 9 wt %; the mass fraction of the other solvents and/or electrolytes is 6 wt %.

After testing, the performance parameters of the solid electrolyte are shown in Table 8. It can be seen from Table 8 that the formation time of the solid electrolyte prepared by Examples 5-8 is 9 hours, the transition temperature of the solid electrolyte is 93° C., and the conductivity of the solid electrolyte is $1.01 \times 10^{-4}$ S/cm. When the prepared solid electrolyte was heated above 93° C., the solid electrolyte began to become viscous. When the reagent bottle was inverted, the downward flow of the solid electrolyte was observed, indicating that the temperature reached the transition temperature of the solid electrolyte, and when the temperature dropped below 93° C., the solid electrolyte was formed again, indicating that the prepared solid electrolyte had good reversibility.

(3) Preparation of Batteries

The solid electrolyte prepared above was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the solid electrolyte.

Comparative Example 5-1

(1) Preparation of Gelable System and Solid Electrolyte

The preparation method of a solid electrolyte was the same as in Example 5-1, except that in the gelable system, polyester A was not added and a solid electrolyte was obtained. In the solid electrolyte system, the mass fraction of the lithium salts is 17 wt %; the mass fraction of the cyclic ether compounds is 83 wt %. After testing, the performance parameters of the solid electrolyte are shown in Table 8. It can be seen from Table 8 that the formation time of the solid electrolyte prepared by Comparative Example 5-1 is 12 hours, the transition temperature of the solid electrolyte is 96° C., and the conductivity of the solid electrolyte is $2.0 \times 10^{-5}$ S/cm. It showed that the addition of the polyester additives, causing the system convert from the solid electrolyte state to the gel state, increased the formation time of the gels, reduced the transition temperature of the gels, and improved the electrical conductivity of the gels.

(2) Preparation of Batteries

The solid electrolyte prepared above was applied to coin cell batteries, and the electrochemical performance of the coin cell batteries was tested using the LAND batteries test system, and it was found that the battery assembled by the solid electrolyte had no capacity. Wherein, the method for preparing the coin cell batteries was: placing a separator between positive electrodes and negative electrodes, filling the gelable system prepared in the step (2) in the space between the three parts, packing and compacting, assembling into CR-2032 coin cell batteries, and letting stand still until the gelable system become the solid electrolyte.

Comparative Example 5-2

(1) Preparation of Gelable System and Gel (Used as Gel Electrolyte)

The preparation method of a gel was the same as in Example 5-5, except that in the gelable system, polyester E was not added.

In the gel system, the mass fraction of the lithium salts is 22 wt %; the mass fraction of the cyclic ether compounds is 54 wt %; the mass fraction of the other solvents and/or electrolytes is 24 wt %.

After testing, the performance parameters of the gel are shown in Table 8. It can be seen from Table 8 that the formation time of the gel prepared by Comparative Example 5-2 is 7 hours, the transition temperature of the gel is 65° C., and the conductivity of the gel is $3.4 \times 10^{-3}$ S/cm. It showed that the addition of the polyester additives extended the formation time of the gels, reduced the transition temperature of the gels, and improved the electrical conductivity of the gels.

(2) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Comparative Example 5-3

(1) Preparation of Gelable System and Gel (Used as Gel Electrolyte)

The preparation method of a gel was the same as in Example 5-3, except that in the gelable system, polyester C was not added.

In the gel system, the mass fraction of the lithium salts is 28 wt %; the mass fraction of the cyclic ether compounds is 57 wt %; the mass fraction of the other solvents and/or electrolytes is 14 wt %; the mass fraction of the inorganic nanoparticle is 1 wt %.

After testing, the performance parameters of the gel are shown in Table 8. It can be seen from Table 8 that the formation time of the gel prepared by Comparative Example 5-3 is 6 hours, the transition temperature of the gel is 69° C., and the conductivity of the gel is $1.0 \times 10^{-3}$ S/cm. It showed that the addition of the polyester additives extended the formation time of the gels, reduced the transition temperature of the gels, and improved the electrical conductivity of the gels.

(2) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Comparative Example 5-4

(1) Preparation of Gelable System and Gel (Used as Gel Electrolyte)

The preparation method of a gel and batteries was the same as in Example 5-6, except that in the gelable system, polyester F was not added.

In the gel system, the mass fraction of the lithium salts is 20 wt %; the mass fraction of the cyclic ether compounds is 60 wt %; the mass fraction of the other solvents and/or electrolytes is 16 wt %; the mass fraction of the inorganic nanoparticle is 4 wt %.

After testing, the performance parameters of the gel are shown in Table 8. It can be seen from Table 8 that the formation time of the gel prepared by Comparative Example 5-4 is 8 hours, the transition temperature of the gel is 75° C., and the conductivity of the gel is $1.0 \times 10^{-4}$ S/cm. It showed that the addition of the polyester additives extended the formation time of the gels, reduced the transition temperature of the gels, and improved the electrical conductivity of the gels.

(2) Preparation of Batteries

The gel prepared above used as a gel electrolyte was applied to coin cell batteries, and the electrochemical performance of the coin cell batteries was tested using the LAND batteries test system (the test results are shown in Table 8). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

TABLE 7

Composition and content of each component of gel electrolytes or solid electrolytes in Examples 5-1 to 5-8 and Comparative Examples 5-1 to 5-4

|  | (a) Lithium salt/% | (b) Cyclic ether compound/% | (c) Additive/% | (d) Other solvent and/or electrolyte/% | (e) Inorganic nanoparticle/% |
|---|---|---|---|---|---|
| Example 5-1 | 12 | 58 | 30 | — | — |
| Example 5-2 | 16 | 50 | 22 | 12 | — |
| Example 5-3 | 22 | 45 | 21 | 11 | 1 |
| Example 5-4 | 15 | 70 | 15 | — | — |
| Example 5-5 | 25 | 43 | 21 | 11 | — |
| Example 5-6 | 16 | 47 | 21 | 13 | 3 |
| Example 5-7 | 15 | 58 | 27 | — | — |
| Example 5-8 | 15 | 70 | 9 | 6 | — |
| Comparative Example 5-1 | 17 | 83 | — | — | — |
| Comparative Example 5-2 | 22 | 54 | — | 24 | — |
| Comparative Example 5-3 | 28 | 57 | — | 14 | 1 |
| Comparative Example 5-4 | 20 | 60 | — | 16 | 4 |

TABLE 8

Performance parameters of gel electrolytes and/or solid electrolytes and prepared batteries in Examples 5-1 to 5-8 and Comparative Examples 5-1 to 5-4

| Example | Formation state | Formation Temperature/° C. | Formation time/h | Transition temperature/° C. | Conductivity S/cm | Battery type | Initial specific capacity | Residual specific capacity after 50 cycles |
|---|---|---|---|---|---|---|---|---|
| 5-1 | gel electrolyte | room temperature | 10 | 60 | $2.1 \times 10^{-3}$ | lithium-ion battery | 127 | 124 |
| 5-2 | gel electrolyte | room temperature | 9 | 58 | $1.3 \times 10^{-2}$ | lithium-ion battery | 132 | 129 |
| 5-3 | gel electrolyte | room temperature | 8 | 60 | $8.8 \times 10^{-3}$ | lithium-ion battery | 128 | 125 |
| 5-4 | solid electrolyte | room temperature | 10 | 85 | $2.5 \times 10^{-4}$ | lithium-ion battery | 122 | 120 |
| 5-5 | gel electrolyte | room temperature | 9 | 56 | $3.3 \times 10^{-2}$ | lithium-ion battery | 133 | 129 |
| 5-6 | gel electrolyte | room temperature | 10 | 56 | $9.9 \times 10^{-3}$ | lithium-ion battery | 129 | 127 |
| 5-7 | gel electrolyte | room temperature | 9 | 66 | $6.7 \times 10^{-3}$ | lithium-ion battery | 124 | 122 |
| 5-8 | solid electrolyte | room temperature | 9 | 93 | $1.01 \times 10^{-4}$ | lithium-sulfur battery | 1080 | 740 |

Battery performance/mAh · g$^{-1}$

TABLE 8-continued

Performance parameters of gel electrolytes and/or solid electrolytes and
prepared batteries in Examples 5-1 to 5-8 and Comparative Examples 5-1 to 5-4

| | | | | | | | Battery performance/mAh·g$^{-1}$ | |
|---|---|---|---|---|---|---|---|---|
| Example | Formation state | Formation Temperature/° C. | Formation time/h | Transition temperature/° C. | Conductivity S/cm | Battery type | Initial specific capacity | Residual specific capacity after 50 cycles |
| Comparative Example5-1 | solid electrolyte | room temperature | 12 | 96 | 2.0 × 10$^{-5}$ | — | — | — |
| Comparative Example5-2 | gel electrolyte | room temperature | 7 | 65 | 3.4 × 10$^{-3}$ | lithium-ion battery | 127 | 124 |
| Comparative Example5-3 | gel electrolyte | room temperature | 6 | 69 | 1.0 × 10$^{-3}$ | lithium-ion battery | 121 | 119 |
| Comparative Example5-4 | gel electrolyte | room temperature | 8 | 75 | 1.0 × 10$^{-4}$ | lithium-ion battery | 120 | 118 |

Figure 16:
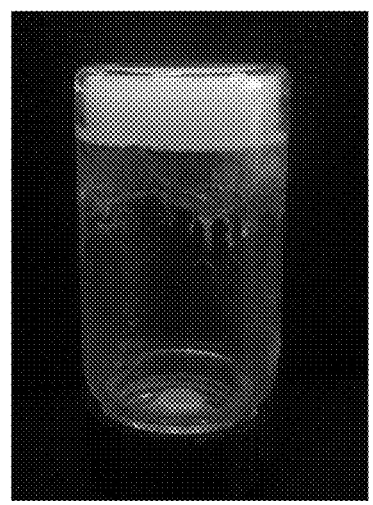
FIG. 16 is an optical photograph of the solid electrolyte of Example 5-8.

FIG. 16 is an optical photograph of the solid electrolyte of Example 5-8. As shown in the figure, the solid electrolyte obtained in Example 5-8 could not flow naturally, had no fluidity, exhibited excellent liquid retention rate and electrical conductivity, and chemical stability.

Figure 17:
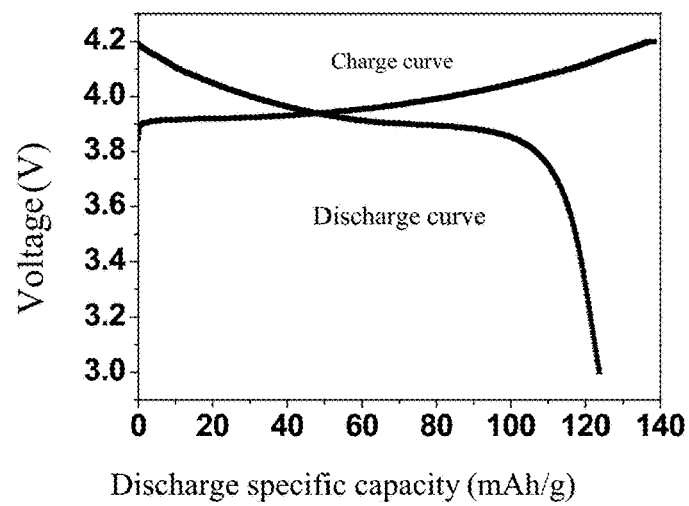
FIG. 17 is a graph showing the initial charge and discharge of the lithium-ion battery assembled with the gel electrolyte obtained in Example 5-1 as the electrolyte.

FIG. 17 is a graph showing the initial charge and discharge of the lithium-ion battery assembled with the gel electrolyte obtained in Example 5-1 as the electrolyte. As shown in the figure, when the gel electrolyte was used as the electrolyte for the lithium-ion battery, the lithium-ion battery could be normally charged and discharged, in which the active material was fully active, thus obtaining a relatively high specific capacity.

Figure 18:
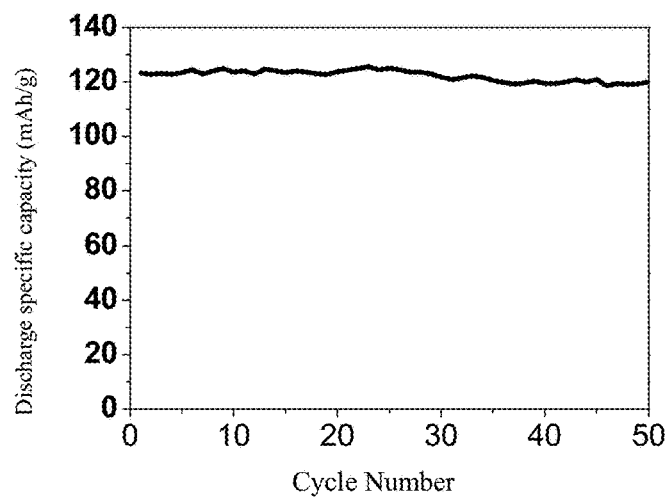
FIG. 18 is a graph showing the cycling performance of the lithium-ion battery assembled with the gel electrolyte obtained in Example 5-1 as the electrolyte.

FIG. 18 is a graph showing the cycling performance of the lithium-ion battery assembled with the gel electrolyte obtained in Example 5-1 as the electrolyte. As shown in the figure, the gel as the electrolyte for a lithium-ion battery exhibited a stable cycling performance, and the specific capacity remained basically unchanged.

Figure 19:
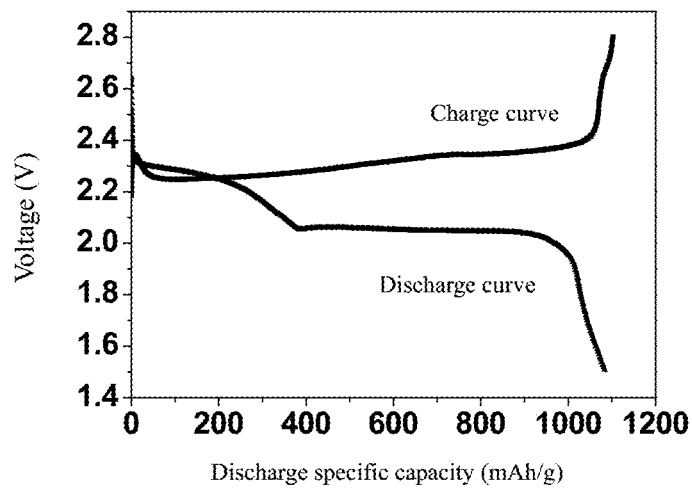
FIG. 19 is a graph showing the initial charge and discharge of the lithium-sulfur battery assembled with the solid electrolyte obtained in Example 5-8 as the electrolyte.

FIG. 19 is a graph showing the initial charge and discharge of the lithium-sulfur battery assembled with the solid electrolyte obtained in Example 5-8 as the electrolyte. As shown in the figure, when the solid electrolyte was used as the electrolyte for the lithium-sulfur battery, the lithium-sulfur battery could be normally charged and discharged, in which the active material was fully active, thus obtaining a relatively high specific capacity.

Figure 20:
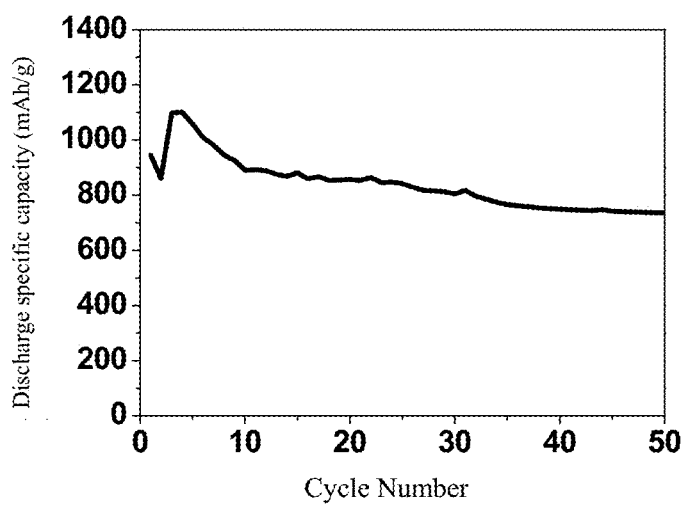
FIG. 20 is a graph showing the cycling performance of the lithium-sulfur battery assembled with the solid electrolyte obtained in Example 5-8 as the electrolyte.

FIG. 20 is a graph showing the cycling performance of the lithium-sulfur battery assembled with the solid electrolyte obtained in Example 5-8 as the electrolyte. As shown in the figure, the solid electrolyte as the electrolyte for a lithium-sulfur battery exhibited a stable cycling performance, and the specific capacity decreased slowly, effectively suppressed the capacity fading caused by shuttle effect.

Example 6-1

(1) Preparation of Gelable System and Gel (Used as a Gel Electrolyte for Batteries)

Weighing 0.7 g of solid lithium perfluorobutanesulfonate in a reagent bottle, adding 3.0 mL of ethylene glycol methyl ethyl ether and 2.0 mL of ethylene glycol diethyl ether (water removed by using molecular sieves before use), under magnetic stirring, preparing a lithium perfluorobutanesulfonate/ethylene glycol methyl ethyl ether+ethylene glycol diethyl ether solution containing 12 wt % lithium salts, continually stirring for a while and obtaining a gelable system; letting stand still for a while to form a gel. In the gel system, the mass fraction of the lithium salts is 12 wt %; the mass fraction of the straight-chain ether compounds is 88 wt %. The test results showed that the formation time of the gel is 24 h; the formation temperature of the gel is room temperature, the transition temperature of the gel is 67° C., and the conductivity of the gel is 4.97×10$^{-4}$ S/cm.

When the prepared gel was heated above 67° C., the gel began to become viscous. When the reagent bottle was inverted, the downward flow of the gel was observed, indicating that the temperature has reached the transition temperature of the gel, and when the temperature dropped below 67° C., the gel was formed again, indicating that the prepared gel had good reversibility.

Example 6-2

(1) Preparation of Gelable System and Solid Electrolyte

Weighing 0.45 g of lithium hexafluorophosphate (LiPF$_6$) and 0.45 g of solid lithium perchlorate (LiClO$_4$) in a reagent bottle, adding 3.6 mL of ethylene glycol dimethyl ether (water removed by using molecular sieves before use), under magnetic stirring, preparing a LiPF$_6$+LiClO$_4$/ethylene glycol methyl ethyl ether solution containing 20 wt % lithium salts, continually stirring and obtaining a gelable system; letting stand still for a while to form a solid electrolyte.

In the solid electrolyte system, the mass fraction of the lithium salts is 20 wt %; the mass fraction of the straight-chain ether compounds is 80 wt %. The test results showed that the formation time of the solid electrolyte is 12 h; the formation temperature of the solid electrolyte is room temperature, the transition temperature of the solid electrolyte is 84° C., and the conductivity of the solid electrolyte is 3.31×10$^{-6}$ S/cm.

When the prepared solid electrolyte was heated above 84° C., the solid electrolyte began to become viscous. When the reagent bottle was inverted, the downward flow of the solid electrolyte was observed, indicating that the temperature has reached the transition temperature of the solid electrolyte, and when the temperature dropped below 84° C., the solid electrolyte was formed again, indicating that the prepared solid electrolyte had good reversibility.

Example 6-3

(1) Preparation of Gelable System and Gel (Used as a Gel Electrolyte for Batteries)

Weighing 0.4 g of solid lithium perchlorate and 0.2 g of solid lithium hexafluoroarsenate in a reagent bottle, adding 1.0 mL of a conventional electrolyte for lithium-ion batteries (a mixed solution of dimethyl carbonate (DMC) and ethylene carbonate (EC) in a volume ratio of 1:1 containing 1 mol/L $LiPF_6$), dissolving the lithium salts completely under magnetic stirring, adding 1.5 mL of 1,4-butanediol dimethyl ether in the above mixed solution, and obtaining a gelable system after sufficiently mixing; letting stand still for a while to form a gel.

In the gel system, the mass fraction of the lithium salts is 19 wt %; the mass fraction of the straight-chain ether compounds is 48 wt %; the mass fraction of the other solvents and/or electrolytes is 33 wt %. After testing, the performance parameters of the gel are shown in Table 9.

When the prepared gel was heated above 65° C., the gel began to become viscous. When the reagent bottle was inverted, the downward flow of the gel was observed, indicating that the temperature has reached the transition temperature of the gel, and when the temperature dropped below 65° C., the gel was formed again, indicating that the prepared gel had good reversibility.

(2) Preparation of Batteries

The gel prepared above was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 6-4

(1) Preparation of Gelable System and Solid Electrolyte

Weighing 1.2 g of solid lithium tetrafluoroborate in a reagent bottle, adding 1.5 mL of the mixed ester solvent (mixture solution of diethyl carbonate (DEC) and ethylene carbonate (EC) in a volume ratio of 1:1), dissolving the lithium salts completely under magnetic stirring, adding 5.5 mL of ethylene glycol dimethyl ether in the above mixed solution, and obtaining a gelable system after sufficiently mixing; letting stand still for a while to form a solid electrolyte.

In the solid electrolyte system, the mass fraction of the lithium salts is 15 wt %; the mass fraction of the straight-chain ether compounds is 67 wt %; the mass fraction of the other solvents and/or electrolytes is 18 wt %. After testing, the performance parameters of the solid electrolyte are shown in Table 9.

When the prepared solid electrolyte was heated above 100° C., the solid electrolyte began to become viscous. When the reagent bottle was inverted, the downward flow of the solid electrolyte was observed, indicating that the temperature has reached the transition temperature of the solid electrolyte, and when the temperature dropped below 100° C., the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 6-5

(1) Preparation of Gelable System and Solid Electrolyte

Weighing 0.6 g of solid lithium fluorosulfonimide and 0.6 g of solid lithium perchlorate in a reagent bottle, adding 2.0 mL of a conventional electrolyte for lithium-sulfur batteries (1M lithium bis(trifluoromethanesulfonyl)imide (LiTFSI), wherein the volume ratio of 1,3-dioxolane to ethylene glycol dimethyl ether was 1:1), dissolving lithium perchlorate and lithium fluorosulfonimide completely under magnetic stirring, adding 4.0 mL of ethylene glycol dimethyl ether, and obtaining a gelable system after sufficiently mixing; letting stand still for a while to form a solid electrolyte.

In the solid electrolyte system, the mass fraction of the lithium salts is 20 wt %; the mass fraction of the straight-chain ether compounds is 56 wt %; the mass fraction of the other solvents and/or electrolytes is 24 wt %. After testing, the performance parameters of the solid electrolyte are shown in Table 9.

When the prepared solid electrolyte was heated above 76° C., the solid electrolyte began to become viscous. When the reagent bottle was inverted, the downward flow of the solid electrolyte was observed, indicating that the temperature has reached the transition temperature of the solid electrolyte, and when the temperature dropped below 76° C., the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 6-6

(1) Preparation of Gelable System and Solid Electrolyte

Weighing 0.35 g of lithium chloroaluminate and 0.5 g of lithium perchlorate in a reagent bottle, adding 1.2 mL of a conventional electrolyte for lithium-sulfur batteries (1M LiTFSI-DOL/DME=1/1), dissolving lithium chloroaluminate and lithium perchlorate completely under magnetic stirring, adding 2.5 mL of ethylene glycol dimethyl ether and 1.2 mL of ethylene glycol methyl ethyl ether, and obtaining a gelable system after sufficiently mixing; letting stand still for a while to form a solid electrolyte.

In the gel system, the mass fraction of the lithium salts is 15 wt %; the mass fraction of the straight-chain ether compounds is 64 wt %; the mass fraction of the other solvents and/or electrolytes is 21 wt %. After testing, the performance parameters of the solid electrolyte are shown in Table 9.

When the prepared solid electrolyte was heated above 87° C., the solid electrolyte began to become viscous. When the reagent bottle was inverted, the downward flow of the solid electrolyte was observed, indicating that the temperature has reached the transition temperature of the solid electrolyte, and when the temperature dropped below 87° C., the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 6-7

(1) Preparation of Gelable System and Gel (Used as a Gel Electrolyte for Batteries)

Weighing 0.06 g of aluminum oxide in a reagent bottle, adding 2.6 mL of ethylene glycol dimethyl ether, sufficiently and uniformly mixing under magnetic stirring, and obtaining a mixed solution A. Weighing another 0.8 g of lithium hexafluoroarsenate in a reagent bottle, adding 2.6 mL of a conventional electrolyte for lithium-ion batteries (DMC:EC=1:1, containing 1 M $LiPF_6$), stirring until the lithium salts are completely dissolved, and obtaining a mixed solution B. Mixing the solution A and B obtained above sufficiently to obtain a mixed solution, and obtaining a gelable system; letting stand still for a while to form a gel.

In the gel system, the mass fraction of the lithium salts is 13 wt %; the mass fraction of the straight-chain ether compounds is 43 wt %; the mass fraction of the inorganic nanoparticles is 1 wt %; the mass fraction of the other solvents and/or electrolytes is 43 wt %. The test results showed that the formation time of the gel is 24 h; the formation temperature of the gel is room temperature, the transition temperature of the gel is 50° C., and the conductivity of the gel is $1.38 \times 10^{-2}$ S/cm.

When the prepared gel was heated above 50° C., the gel began to become viscous. When the reagent bottle was inverted, the downward flow of the gel was observed, indicating that the temperature has reached the transition temperature of the gel, and when the temperature dropped below 50° C., the gel was formed again, indicating that the prepared gel had good reversibility.

(2) Preparation of Batteries

The gel prepared above used to be gel electrolyte was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 6-8

(1) Preparation of Gelable System and Solid Electrolyte

Weighing 0.05 g of silica in a reagent bottle, adding 4.5 mL of ethylene glycol methyl ethyl ether, sufficiently and uniformly mixing under magnetic stirring, and obtaining a mixed solution A. Weighing another 0.4 g of lithium bis (trifluoromethanesulfonyl)imide and 0.6 g of lithium perchlorate in the reagent bottle, adding 1.2 mL of a conventional electrolyte for lithium-sulfur batteries, stirring until the lithium salts are completely dissolved, and obtaining a mixed solution B. Mixing the solution A and B obtained above sufficiently to obtain a mixed solution, and obtaining a gelable system; letting stand still for a while to form a solid electrolyte.

In the gel system, the mass fraction of the lithium salts is 15 wt %; the mass fraction of the straight-chain ether compounds is 66.3 wt %; the mass fraction of the inorganic nanoparticles is 0.7 wt %; the mass fraction of the other solvents and/or electrolytes is 18 wt %. The test results showed that the formation time of the solid electrolyte is 14 h; the formation temperature of the solid electrolyte is room temperature, the transition temperature of the solid electrolyte is 98° C., and the conductivity of the solid electrolyte is $2.06 \times 10^{-5}$ S/cm.

When the prepared solid electrolyte was heated above 98° C., the solid electrolyte began to become viscous. When the reagent bottle was inverted, the downward flow of the solid electrolyte was observed, indicating that the temperature has reached the transition temperature of the solid electrolyte, and when the temperature dropped below 98° C., the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

Example 6-9

(1) Preparation of Gelable System and Gel (Used as a Gel Electrolyte for Batteries)

Weighing 0.08 g of titanium dioxide in a reagent bottle, adding 1.5 mL of anisole and 1.5 mL of ethylene glycol dimethyl ether, sufficiently and uniformly mixing under magnetic stirring, and obtaining a mixed solution A. Weighing another 0.2 g of lithium hexafluoroarsenate and 0.6 g of lithium hexafluorophosphate in the reagent bottle, adding 3.2 mL of a conventional electrolyte for lithium-ion batteries (DMC:EC=1:1, containing 1 M $LiPF_6$), stirring until the lithium salts are completely dissolved, and obtaining a mixed solution B. Mixing the solution A and B obtained above sufficiently to obtain a mixed solution, and obtaining a gelable system; letting stand still for a while to form a gel.

In the gel system, the mass fraction of the lithium salts is 11 wt %; the mass fraction of the straight-chain ether compounds is 42 wt %; the mass fraction of the inorganic nanoparticles is 1.1 wt %; the mass fraction of the other solvents and/or electrolytes is 45.9 wt %. The test results showed that the formation time of the gel is 26 h; the formation temperature of the gel is room temperature, the transition temperature of the gel is 50° C., and the conductivity of the gel is $1.49 \times 10^{-2}$ S/cm.

When the prepared gel was heated above 45° C., the gel began to become viscous. When the reagent bottle was inverted, the downward flow of the gel was observed, indicating that the temperature has reached the transition temperature of the gel, and when the temperature dropped below 45° C., the gel was formed again, indicating that the prepared gel had good reversibility.

(2) Preparation of Batteries

The gel prepared above used as a gel electrolyte was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the gel electrolyte.

Example 6-10

(1) Preparation of Gelable System and Solid Electrolyte

Weighing 0.08 g of silicon nitride in a reagent bottle, adding 4.0 mL of diphenyl ether, sufficiently and uniformly mixing under magnetic stirring, and obtaining a mixed solution A. Weighing another 0.5 g of lithium bis(trifluoromethanesulfonyl)imide and 0.5 g of lithium tetrafluoroborate in the reagent bottle, adding 1.2 mL of dimethyl carbonate, stirring until the lithium salts are completely dissolved, and obtaining a mixed solution B. Mixing the solution A and B obtained above sufficiently, and obtaining a gelable system; letting stand still for a while to form a solid electrolyte.

In the gel system, the mass fraction of the lithium salts is 16 wt %; the mass fraction of the straight-chain ether compounds is 63.6 wt %; the mass fraction of the inorganic nanoparticles is 1.3 wt %; the mass fraction of the other solvents and/or electrolytes is 19.1 wt %.

The test results showed that the formation time of the solid electrolyte is 15 h; the formation temperature of the solid electrolyte is room temperature, the transition temperature of the solid electrolyte is 95° C., and the conductivity of the solid electrolyte is $3.67 \times 10^{-5}$ S/cm.

When the prepared solid electrolyte was heated above 95° C., the solid electrolyte began to become viscous. When the reagent bottle was inverted, the downward flow of the solid electrolyte was observed, indicating that the temperature has reached the transition temperature of the solid electrolyte, and when the temperature dropped below 95° C., the solid electrolyte was formed again, indicating that the prepared solid electrolyte had good reversibility.

(2) Preparation of Batteries

The solid electrolyte prepared above was applied to coin cell batteries, and the electrochemical performance of the coin cell batteries was tested using the LAND batteries test system (the test results are shown in Table 9). Wherein, the method for preparing the coin cell batteries was: placing a separator between positive electrodes and negative electrodes, filling the gelable system prepared in the step (1) in the space between the three parts, packing and compacting, assembling into CR-2032 coin cell batteries, and letting stand still until the gelable system become the solid electrolyte.

TABLE 9

Performance parameters of gel electrolytes and/or solid electrolytes and prepared batteries in Examples 6-1 to 6-10

| Example | (a)/% | (b)/% | (c)/% | (d)/% | Formation state | Formation Temperature/° C. | Formation time/h | Transition temperature/° C. | Application | Conductivity/S · cm$^{-1}$ | Initial specific capacity | Residual specific capacity after 50 cycles |
|---|---|---|---|---|---|---|---|---|---|---|---|---|
| 6-1 | 12 | 88 | — | — | gel electrolyte | room temperature | 24 | 67 | — | $4.96 \times 10^{-4}$ | — | — |
| 6-2 | 20 | 80 | — | — | solid electrolyte | room temperature | 12 | 84 | — | $3.31 \times 10^{-6}$ | — | — |
| 6-3 | 19 | 48 | 38 | — | gel electrolyte | room temperature | 12 | 65 | lithium-ion battery | $2.44 \times 10^{-5}$ | 124 | 126 |
| 6-4 | 15 | 67 | 18 | — | solid electrolyte | room temperature | 8 | 100 | lithium-ion battery | $6.95 \times 10^{-5}$ | 119 | 121 |
| 6-5 | 20 | 56 | 24 | — | solid electrolyte | room temperature | 16 | 76 | lithium-sulfur battery | $4.52 \times 10^{-5}$ | 1224 | 751 |
| 6-6 | 15 | 64 | 21 | — | solid electrolyte | room temperature | 15 | 87 | lithium-sulfur battery | $4.37 \times 10^{-6}$ | 1021 | 736 |
| 6-7 | 13 | 43 | 43 | 1 | gel electrolyte | room temperature | 24 | 50 | lithium-ion battery | $1.38 \times 10^{-2}$ | 127 | 130 |
| 6-8 | 15 | 66.3 | 18 | 0.7 | solid electrolyte | room temperature | 14 | 98 | lithium-sulfur battery | $2.06 \times 10^{-5}$ | 1097 | 733 |
| 6-9 | 11 | 42 | 45.9 | 1.1 | gel electrolyte | room temperature | 26 | 45 | lithium-sulfur battery | $1.49 \times 10^{-2}$ | 1066 | 782 |
| 6-10 | 16 | 63.6 | 19.1 | 1.3 | solid electrolyte | room temperature | 15 | 95 | lithium-ion battery | $3.67 \times 10^{-5}$ | 124 | 127 |

Wherein, component (a) are lithium salts; component (b) are straight-chain ether compounds; component (c) are another solvents or electrolytes; component (d) are inorganic nanoparticles.

Figure 21:
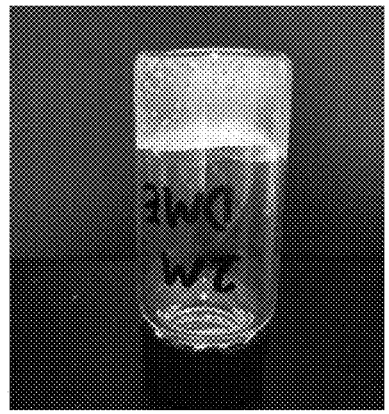
FIG. 21 is an optical photograph of the solid electrolyte of Example 6-2.

FIG. 21 is an optical photograph of the solid electrolyte of Example 6-2. As shown in the figure, the solid electrolyte could not flow naturally under the action of gravity, the color was relatively transparent, and the physical and chemical properties were stable.

Figure 22:
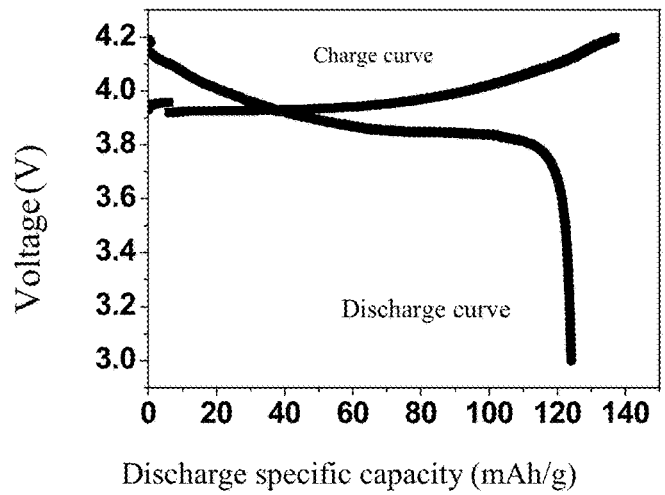
FIG. 22 is a graph showing the initial charge and discharge of the lithium-ion battery assembled with the gel electrolyte obtained in Example 6-3 as the electrolyte.

FIG. 22 is a graph showing the initial charge and discharge of the lithium-ion battery assembled with the gel electrolyte obtained in Example 6-3 as the electrolyte. As shown in the figure, when the gel electrolyte was used as the electrolyte for the lithium-ion battery, the lithium-ion battery could be normally charged and discharged, in which the active material was fully active, thus obtaining a relatively high specific capacity.

Figure 23:
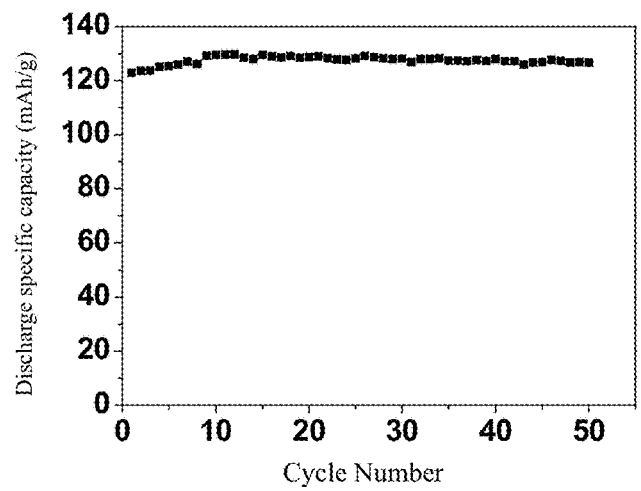
FIG. 23 is a graph showing the cycling performance of the lithium-ion battery assembled with the gel electrolyte obtained in Example 6-3 as the electrolyte.

FIG. 23 is a graph showing the cycling performance of the lithium-ion battery assembled with the gel electrolyte obtained in Example 6-3 as the electrolyte. As shown in the figure, the gel as the electrolyte for a lithium-ion battery exhibited a stable cycling performance, and the specific capacity remained basically unchanged.

Figure 24:
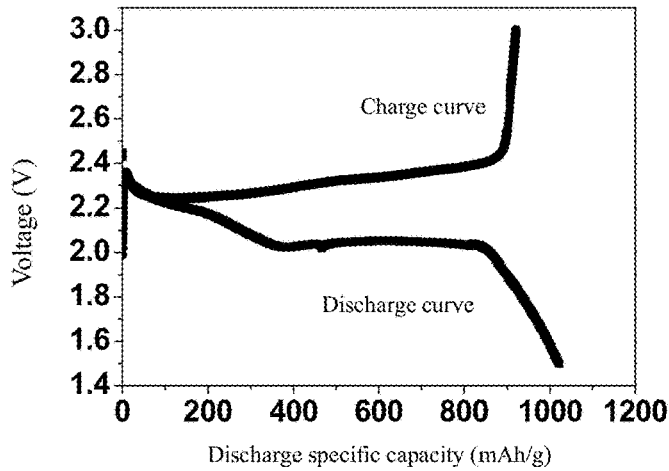
FIG. 24 is a graph showing the initial charge and discharge of the lithium-sulfur battery assembled with the solid electrolyte obtained in Example 6-6 as the electrolyte.

FIG. 24 is a graph showing the initial charge and discharge of the lithium-sulfur battery assembled with the solid electrolyte obtained in Example 6-6 as the electrolyte. As shown in the figure, when the gel electrolyte was used as the electrolyte for the lithium-sulfur battery, the lithium-sulfur battery could be normally charged and discharged, in which the active material was fully active, thus obtaining a relatively high specific capacity.

Figure 25:
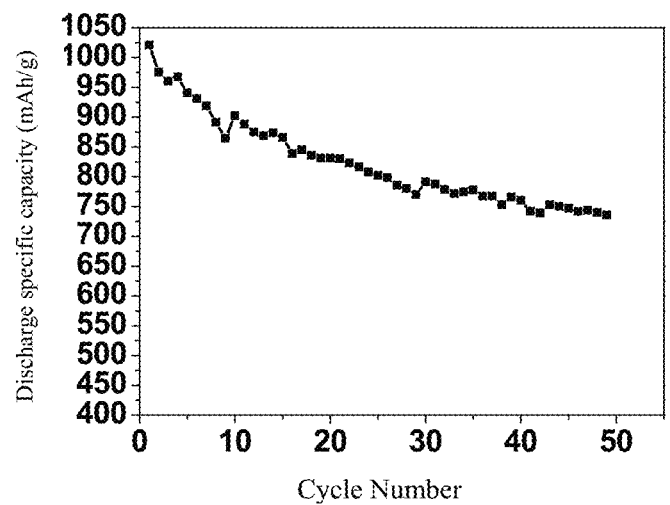
FIG. 25 is a graph showing the cycling performance of the lithium-sulfur battery assembled with the solid electrolyte obtained in Example 6-6 as the electrolyte.

FIG. 25 is a graph showing the cycling performance of the lithium-sulfur battery assembled with the solid electrolyte obtained in Example 6-6 as the electrolyte. As shown in the figure, when the solid electrolyte was used as the electrolyte for a lithium-sulfur battery, the lithium-sulfur battery could effectively alleviate the "shuttling effect", thereby increasing the utilization efficiency of the active material, improving the cycling performance of the battery, and exhibiting excellent cycling performance.

The embodiments of the present invention have been described above. However, the present invention is not limited to the above embodiments. Any modification made within the spirit and scope of the present invention, equivalent substitution, improvement, etc., should be included within the scope of the present invention.

The invention claimed is:
1. An electrolyte produced by gelation of a gelable system, wherein the gelable system comprises:
 a lithium salt;
 an ether compound comprising at least one cyclic ether compound and optionally a straight-chain ether compound; and
 a polyester obtained by polycondensation of a polybasic acid or an acid anhydride with a polyhydric alcohol, wherein:
 the polybasic acid is substituted or unsubstituted, selected from the group consisting oxalic acid, malonic acid, succinic acid, butenedioic acid, glutaric acid, adipic acid, pimelic acid, suberic acid, sebacic acid, azelaic acid, and tricarballylic acid, and the substituents are one or more selected from the group consisting of alkyl, cycloalkyl, aryl, hydroxy, amino, ester, halogen, acyl, aldehyde, thiol, alkoxy, and mixtures thereof,
 the acid anhydride is substituted or unsubstituted, selected from the group consisting of oxalic anhydride, malonic anhydride, succinic anhydride, maleic anhydride, glutaric anhydride, adipic anhydride, pimelic anhydride, sebacic anhydride, azelaic anhydride, hexahydrophthalic anhydride, and mixtures thereof, and the substituents are independently selected from the group consisting of alkyl, cycloalkyl, aryl, hydroxy, amino, ester, halogen, acyl, aldehyde, thiol, alkoxy, and mixtures thereof;

wherein:

the electrolyte is a gel electrolyte, and, on a basis of mass fraction in the gelable system, the lithium salt is greater than or equal to 2 wt % and less than or equal to 20 wt %, and the at least one cyclic ether compound is more than or equal to 80 wt % and less than or equal to 98 wt %, and an optional gelable polymer and/or a gelable prepolymer is less than 1 wt % when present, or the electrolyte is a solid electrolyte, and, on the basis of mass fraction in the gelable system, the lithium salt is greater than or equal to 20 wt % and less than or equal to 50 wt %, the at least one cyclic ether compound is more than or equal to 50 wt % and less than or equal to 80 wt %, and the optional gelable polymer and/or gelable prepolymer is 1 wt % when present, and the at least one cyclic ether compound is selected from the group consisting of

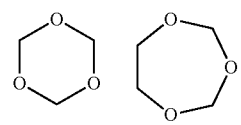

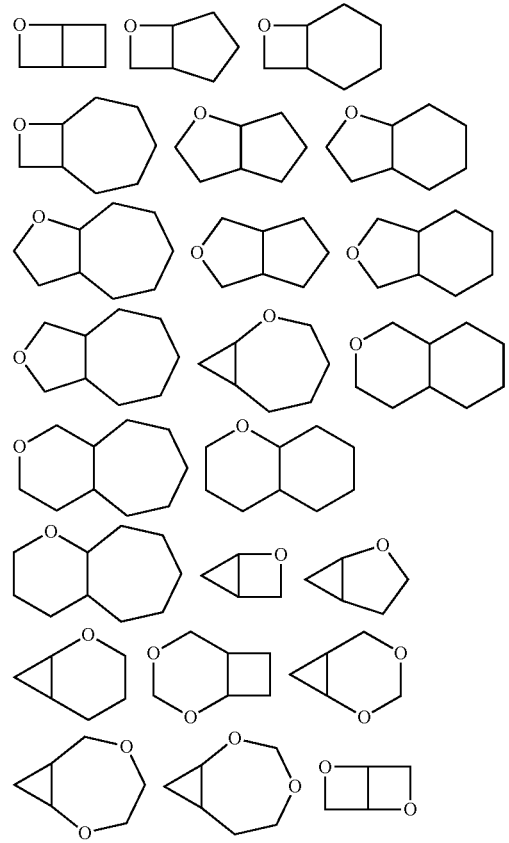

81
-continued
82
-continued
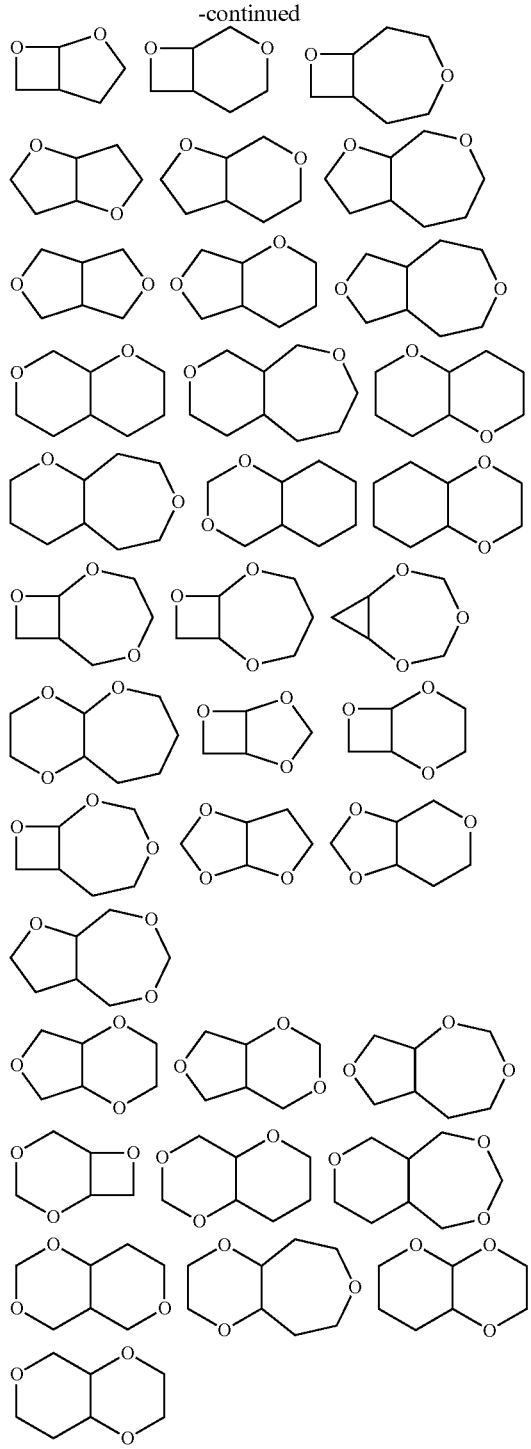
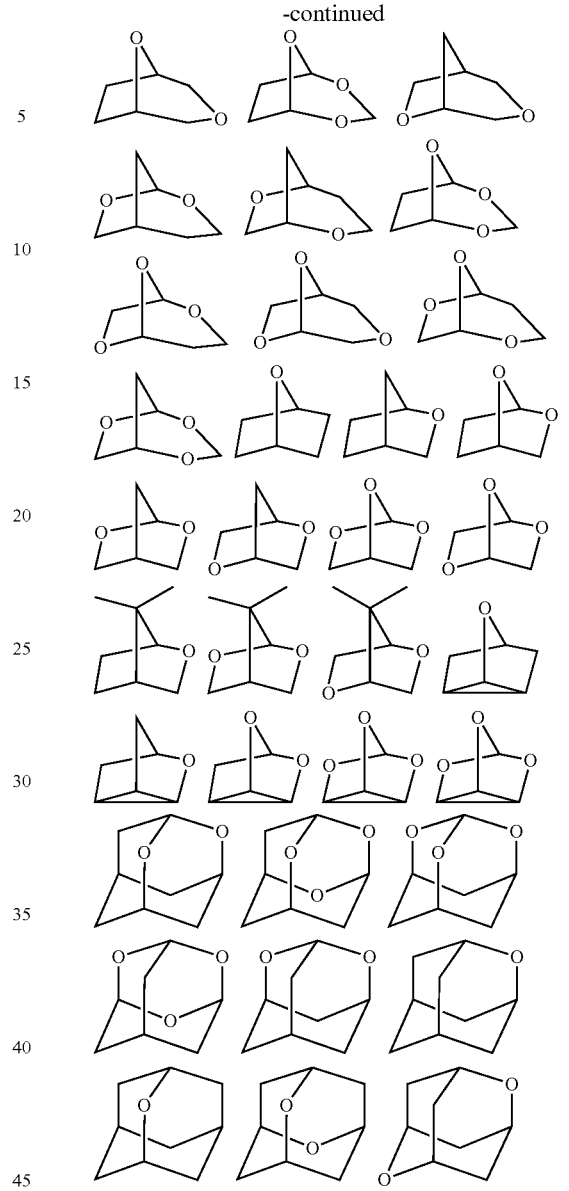
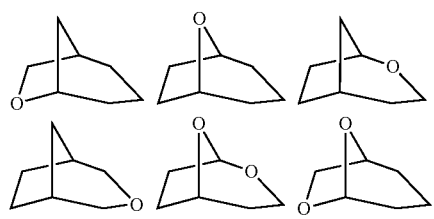
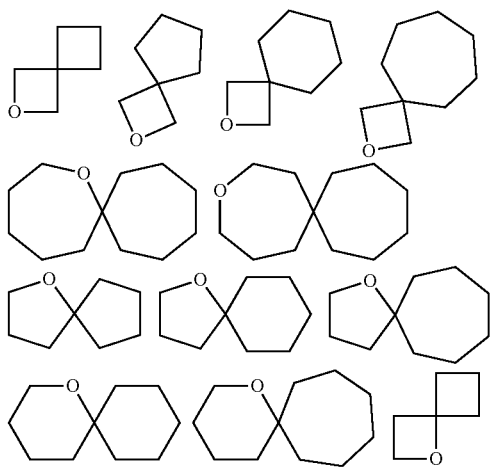

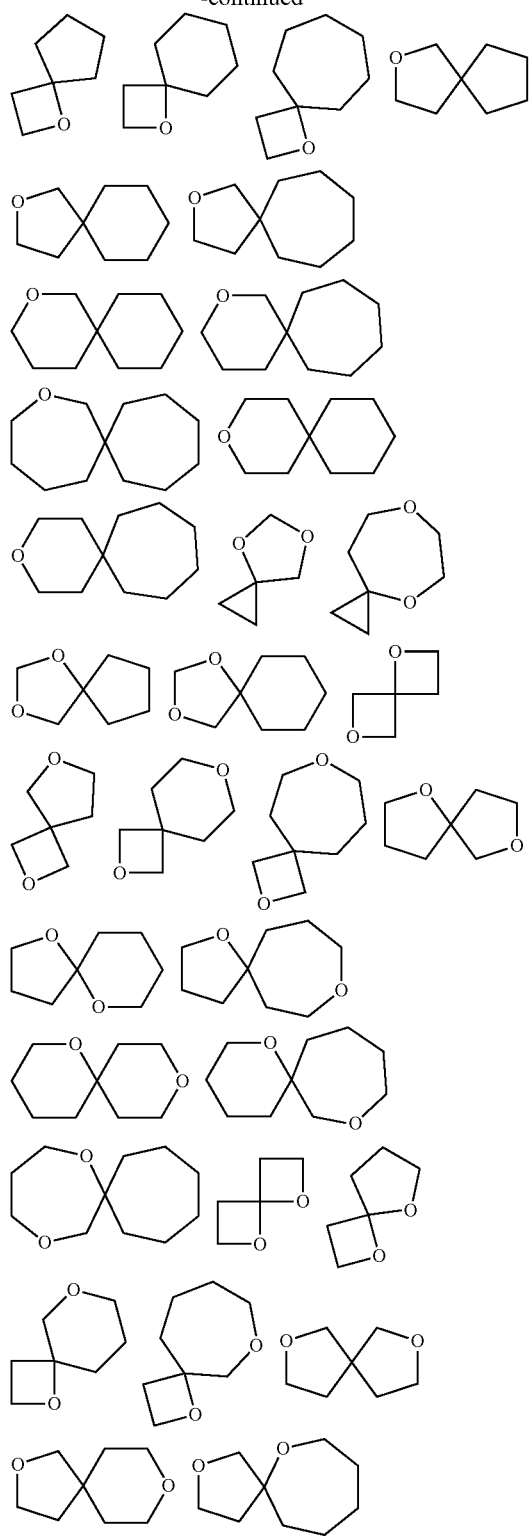
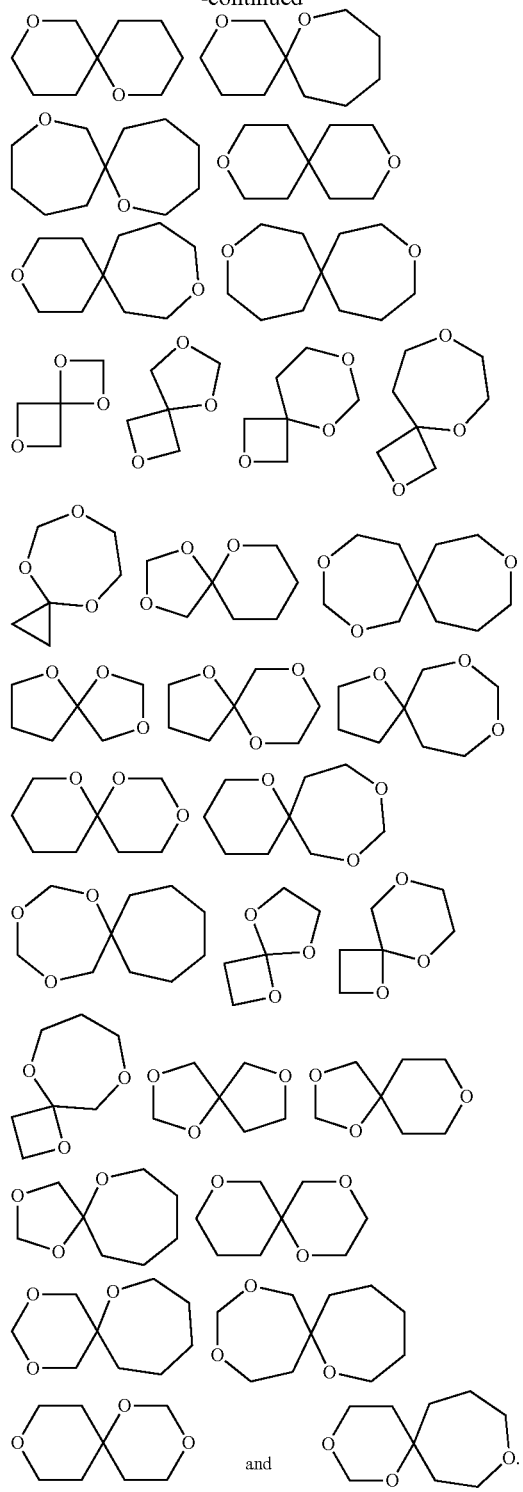
and
* * * * *